(12) United States Patent
Nakano

(10) Patent No.: US 6,211,597 B1
(45) Date of Patent: Apr. 3, 2001

(54) MOTOR/GENERATOR WITH MULTIPLE ROTORS

(75) Inventor: Masaki Nakano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/275,788

(22) Filed: Mar. 25, 1999

(30) Foreign Application Priority Data

Mar. 25, 1998 (JP) .................................................. 10-077465

(51) Int. Cl.$^7$ ...................................................... H02K 1/22
(52) U.S. Cl. ........................ 310/266; 310/114; 310/254; 310/261; 310/266
(58) Field of Search .................................. 310/114, 156, 310/261, 266

(56) References Cited

U.S. PATENT DOCUMENTS

| 4,731,554 | * | 3/1988 | Hall et al. ........................... 310/67 R |
| 5,117,141 | * | 5/1992 | Hawsey et al. ....................... 310/114 |
| 5,554,903 | * | 9/1996 | Takara ................................... 310/266 |
| 5,783,894 | * | 7/1998 | Wither ................................... 310/266 |
| 5,864,198 | * | 1/1999 | Pinkerton ............................. 310/266 |

FOREIGN PATENT DOCUMENTS

| 8-340663 | 12/1996 | (JP) ...................................... 310/266 |

* cited by examiner

*Primary Examiner*—Elvin Enad
(74) *Attorney, Agent, or Firm*—Foley & Lardner

(57) ABSTRACT

Two rotors (3,4) and one stator (2) are arranged coaxially. A common coil unit (6) for individually driving two rotors (3, 4) is provided in a stator (2), and a composite current of an alternating current for driving the first rotor (3) and an alternating current for driving the second rotor (4) is supplied to coil units (6). First salient poles (7B, 7C, 21C, 21D, 21E) facing the first rotor (3), and second salient poles (7D, 21F) facing the second rotor (4), are provided. By setting the number of these salient poles equal to the magnetic pole number ratio of the first rotor (3) and second rotor (4), the number of salient poles is reduced.

6 Claims, 15 Drawing Sheets

RELATION AT $t = 0$

RELATION AT t = 0

RELATION AT t = 0

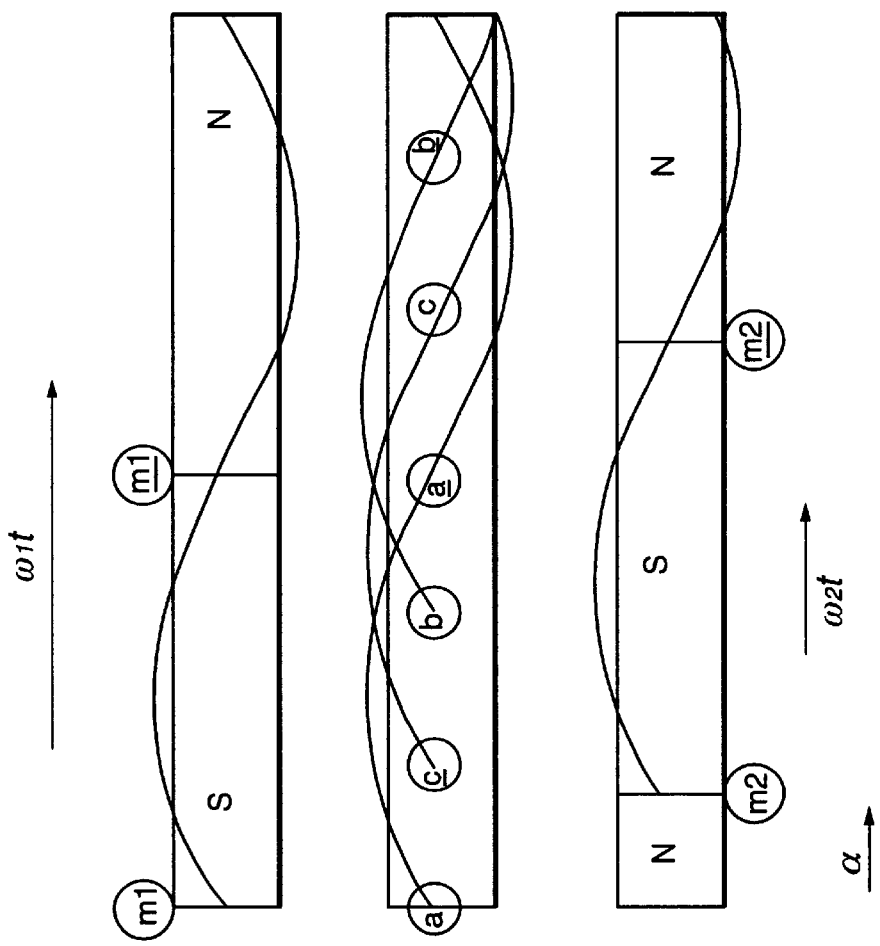

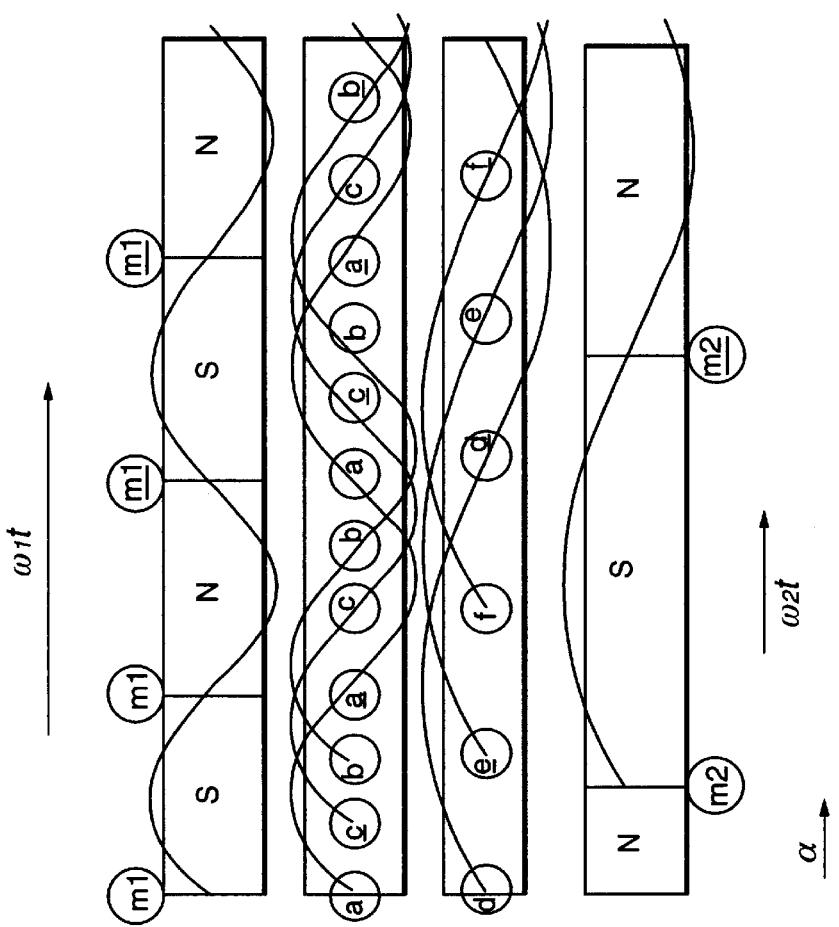
FIG. 10A  $B_1 = B_{m1} \cdot \sin(2\omega_1 t - 2\theta)$
FIG. 10B  $B_{c1}$
FIG. 10C  $B_{c2}$
FIG. 10D  $B_2 = B_{m2} \cdot \sin(\omega_2 t + \alpha - \theta)$ RELATION AT t = 0

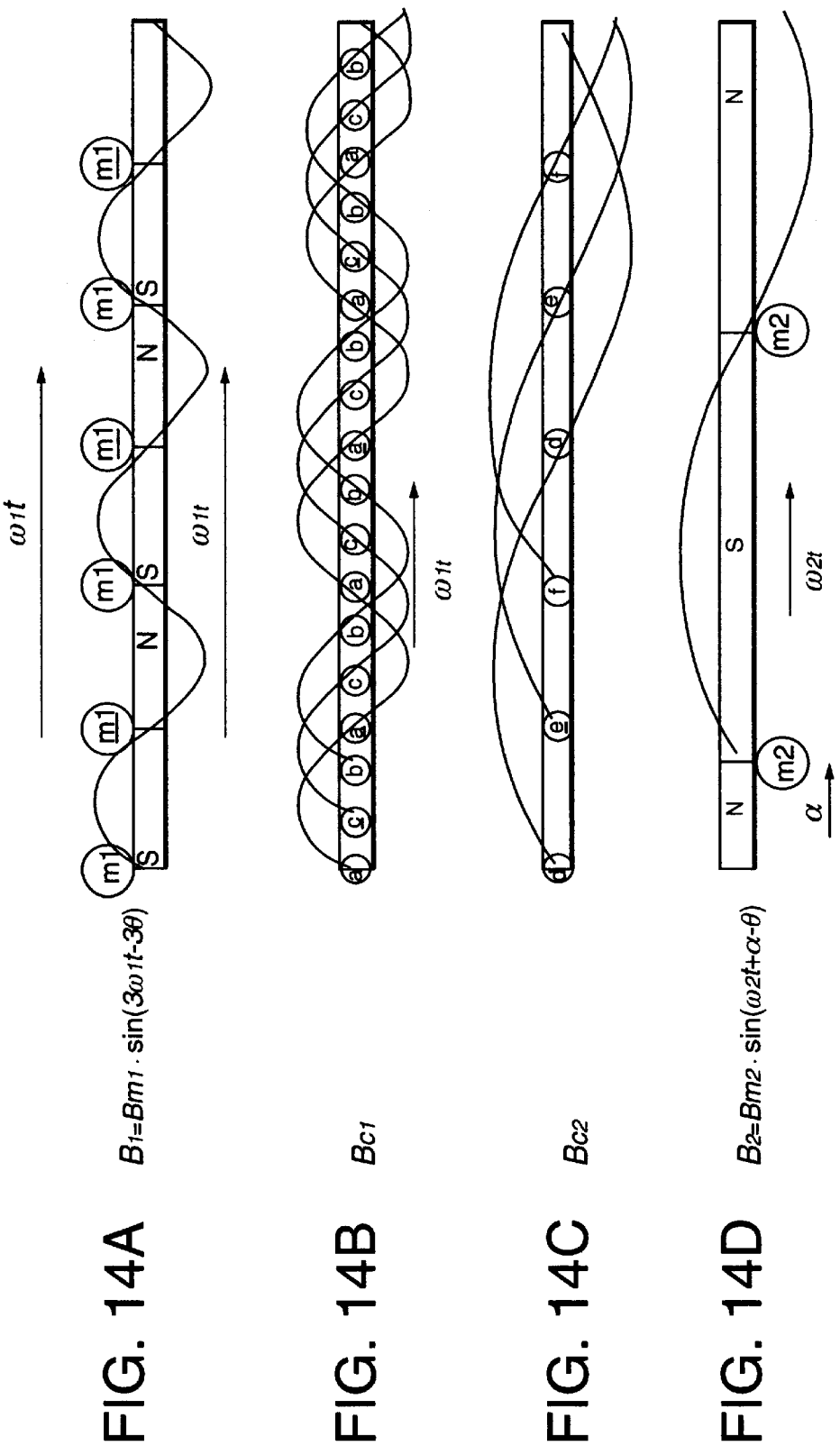

STAGE A

STAGE B

MOTOR/GENERATOR WITH MULTIPLE ROTORS

FIELD OF THE INVENTION

This invention relates to the structure of a motor/generator.

BACKGROUND OF THE INVENTION

Tokkai Hei 8-340663 published by the Japanese Patent Office in 1996 discloses a motor/generator comprising two rotors and one stator coaxially arranged in three layers wherein one of the rotors is driven as a motor and the other is driven as a generator.

In this motor/generator, two, sets of coils are installed in the stator for providing a magnetic field for respective rotors, and two sets of inverters, i.e., current controllers, are provided for controlling respective sets of coils.

SUMMARY OF THE INVENTION

However, in the case of this motor/generator, since two series of coils and inverters are required, there is a problem in that current losses such as copper loss and switching loss, are large.

It is therefore an object of this invention to reduce current losses of such a three-layered motor/generator as described in the prior art.

It is another object of this invention to simplify the construction and reduce the number of parts of such a motor/generator.

In order to achieve the above objects, this invention provides a motor/generator, comprising a first rotor comprising plural magnetic poles and supported free to rotate, a second rotor comprising plural magnetic poles and supported free to rotate coaxially with the first rotor, a stator fixed co-axially with the first rotor, and a coil unit comprising plural coils disposed at equal angular intervals on the stator.

The coil unit is arranged so as to form plural rotating magnetic fields of equal number to the number of magnetic poles of the first rotor according to a first alternating current and to form plural rotating magnetic fields of equal number to the number of magnetic poles of the second rotor according to a second alternating current.

The coil unit comprises first salient poles facing the first rotor and second salient poles facing the second rotor, wherein the ratio of the first salient poles and second salient poles is set equal to the ratio of a magnetic pole number of the first rotor and a magnetic pole number of the second rotor.

The motor/generator further comprises an electrical circuit for supplying a composite electrical current comprising the first alternating current and the second alternating current to the coil unit.

The details as well as other features and advantages of this invention are set forth in the remainder of the specification and are shown in the accompanying drawings.

BRIEF DESCRIPTION OF THE DRAWINGS

FIGS. 8A–8C are diagrams showing a variation of magnetic flux density in the motor/generator of FIG. 7.

FIGS. 10A–10D are diagrams showing a variation of magnetic flux density in the motor/generator of FIG. 9.

FIGS. 14A–14D are diagrams showing a variation of magnetic flux density in the motor/generator of FIG. 13.

DESCRIPTION OF THE PREFERRED EMBODIMENTS

Figure 1:
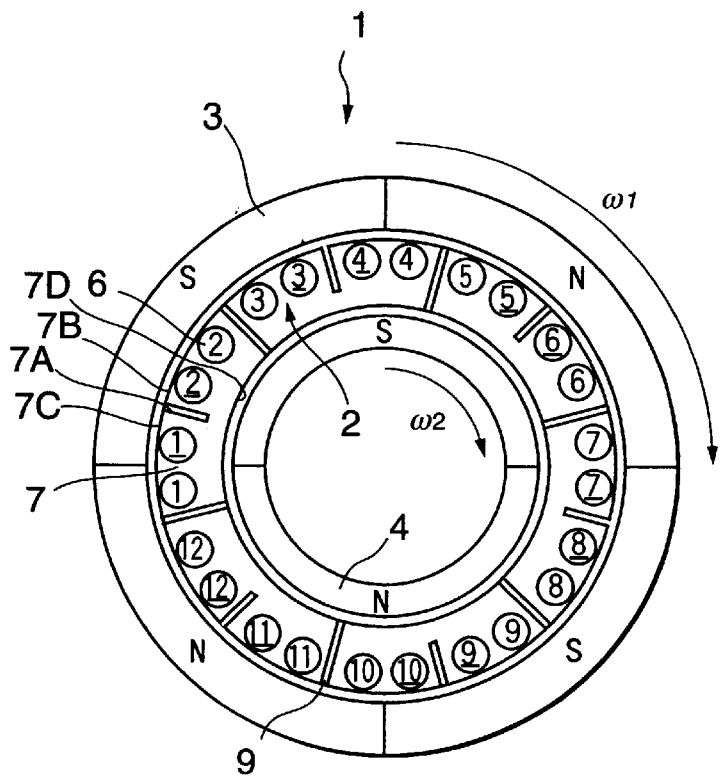
FIG. 1 is a schematic cross-sectional view of a motor/generator according to this invention.

Referring to FIG. 1 of the drawings, a motor/generator 1 has a three-layer construction comprising a cylindrical stator 2 and rotors 3, 4 arranged with a predetermined clearance outside and inside the stator 2.

Figure 3:
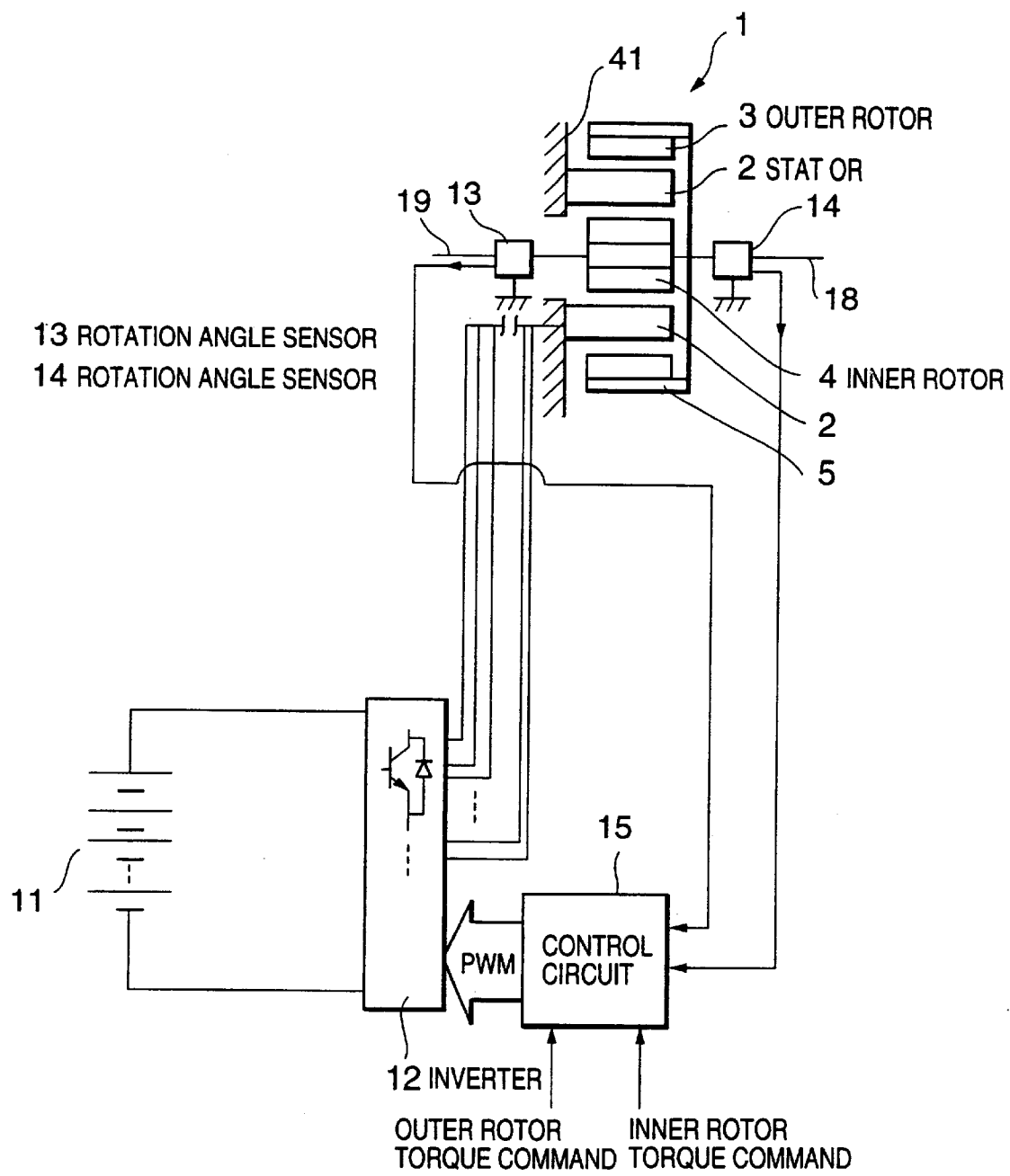
FIG. 3 is a schematic diagram of a control circuit according to this invention.

The stator 2, outer rotor 3 and inner rotor 4 are arranged coaxially. The stator 2 is fixed to a casing 41 of the motor/generator 1 as shown in FIG. 3. The outer rotor 3 is fixed to a frame 5, and the frame 5 rotates relative to the casing 41 via an axis 18. The inner rotor 4 rotates relative to the casing 41 via an axis 19.

The inner rotor 4 comprises permanent magnets having N poles and S poles respectively arranged on each of two semicircles, as shown in FIG. 1.

The outer rotor 3 comprises permanent magnets having a pole number two times that of the rotor 4 with two S poles and N poles alternately arranged at 90 degree intervals.

According to this arrangement, the permanent magnets of the outer rotor 3 do not exert a rotation force on the permanent magnets of the inner rotor 4, nor vice-versa, due to the following reason.

In the state shown in FIG. 1, assume that the S poles of the inner rotor 4 exert a rotation force in a clockwise direction on the N poles and S poles in the upper part of the drawing of the outer rotor 3. At that time, the permanent magnet N poles and S poles in the lower part of the outer rotor 3 tend to rotate in an anticlockwise direction due to the magnetic force of the N poles of the inner rotor. Therefore a rotation force acting on the N poles and S poles in upper part of drawing is offset by a rotation force acting on the N poles and S poles in the lower part of the drawing, so a rotation force does not act between the outer rotor 3 and inner rotor 4. In other words, both the outer rotor 3 and inner rotor 4 rotate only due to the magnetic force received from the stator 2.

The stator 2 comprises twelve coils 6 wound around six cores 7. The cores 7 are arranged at equal intervals in a circumferential direction across gaps 9. To reduce the total number of the cores 7, each of the cores 7 is split into two parts by slits 7A, and two of the coils 6 are wound on one of the cores 7. These slits 7A have openings on the outer circumference of the stator 2.

As a result, two salient poles 7B, 7C are formed facing the outer rotor 3 on the outer circumference of each core 7, and one salient pole 7D is formed facing the inner rotor 4 on the inner circumference of each core 7. In total, twelve salient poles are formed on the outer circumference side, and six salient poles are formed on the inner circumference side of the whole stator 2. In other words, the total number of salient poles on the outer circumference side is equal to the total number of coils, while the total number of salient poles on the inner circumference side is a half of the total number of coils.

For the sake of convenience, the numbers shown in FIG. 1 are assigned to these twelve coils 6. To distinguish them from part numbers, the symbol # is attached before a number as in the coil #6 to indicate a coil number.

Currents $I_1$–$I_{12}$ are passed into these twelve coils #1–#12.

First, a three phase alternating current is passed into three sets of coils to generate a rotational magnetic field relative to the inner rotor 4. Specifically, a current is passed through the coils #1, #2, #7 and #8 so as to form a virtual coil around a virtual axis which intersects perpendicularly with the rotating axis of the rotor 3 (4). For this purpose, a current Id is passed through the coils #1 and #2 in the reverse direction to the coils #7 and #8 which are situated on the opposite side of the rotation axis of the rotor 3 (4) as center. This is done by directing half a current Id through the coil #7 from the coil #1 and directing the other half of the current Id to the coil #8 from the coil #2. As the coils #1 and #2 are adjacent to each other and the coils #7 and #8 are also adjacent to each other, due to this current supply, the same situation occurs as when the current Id flows through the virtual coil mentioned above, and consequently, an N and a S pole are formed at the two ends of a virtual axis.

Similarly, the coils #3, #4, #9, #10 form one set, and a current Ie flows through these coils as if they formed one virtual coil around another virtual axis rotated by 120 degrees from the aforesaid virtual axis.

Further, the remaining coils #5, #6, #11, #12 form one virtual coil around another virtual axis rotated by 120 degrees, and a current If flows through these coils.

Hence, three virtual coils are formed with winding axes which differ by 120 degrees, and an N pole and S pole region are formed every 180 degrees as in the case of the inner rotor 3. A three-phase alternating current is supplied to these sets of coils, and the resultant virtual coil progressively varies its polarity according to the phase of the current. As a result, two pole rotating magnetic fields are formed enclosing the inner rotor.

In this embodiment, the flow of the current is represented in the form [#1, #2]=[#$\underline{7}$, #$\underline{8}$], [#$\underline{3}$, #$\underline{4}$]=[#9, #10], [#5, #6]=[#$\underline{11}$, #$\underline{12}$].

A coil with an underlined number means that a current is passed in the reverse direction of a coil with a number which is not underlined.

Next, a three-phase current is passed into three sets of coils by the following combination so as to generate a magnetic field relative to the outer rotor 3.

[1]=[$\underline{4}$]=[7]=[$\underline{10}$], [2]=[$\underline{5}$]=[8]=[$\underline{11}$], [3]=[$\underline{6}$]=[9]=[$\underline{12}$]

In other words, a current Ia is passed to coil #4 from coil #1, and a current Ia is made to flow to coil #10 from coil #7. Considering a line connecting an intermediate point between coil #1 and #4 and an intermediate point between coil #7 and #10 in FIG. 1 as a virtual axis, a virtual coil is formed comprising coil #1 and #4 and a virtual coil is formed comprising coil #7 and #10 around the axis due to the current Ia.

As the flow of current of these virtual coils is in opposite directions, an N pole is formed for example at the two ends of the virtual axis and an S pole is formed near the rotation axis of the rotor 3 (4) in the two sets of virtual coils. Considering this on the periphery relative to the outer rotor 3, it is equivalent to forming N poles and S poles alternately at 90 degrees intervals.

Similarly, for coils #2, #5, #8 and #10, a current Ib is passed. Similarly, for coils #3, #6, #11 and #12, a current Ic is passed. Due to this, four-pole rotating magnetic fields are formed relative to the outer rotor 3.

To satisfy the above conditions, the following currents $I_1$–$I_{12}$ should be passed through the twelve coils 6.

$I_1 = \frac{1}{2} \cdot Id + Ia$
$I_2 = \frac{1}{2} \cdot Id + Ic$
$I_3 = \frac{1}{2} \cdot If + Ib$
$I_4 = \frac{1}{2} \cdot If + Ia$
$I_5 = \frac{1}{2} \cdot Ie + Ic$
$I_6 = \frac{1}{2} \cdot Ie + Ib$
$I_7 = \frac{1}{2} \cdot Id + Ia$
$I_8 = \frac{1}{2} \cdot Id + Ic$
$I_9 = \frac{1}{2} \cdot If + Ib$
$I_{10} = \frac{1}{2} \cdot If + Ia$
$I_{11} = \frac{1}{2} \cdot Ie + Ic$
$I_{12} = \frac{1}{2} \cdot Ie + Ib$ A current in the reverse direction is shown by underlining added to the current symbol.

Figure 2:
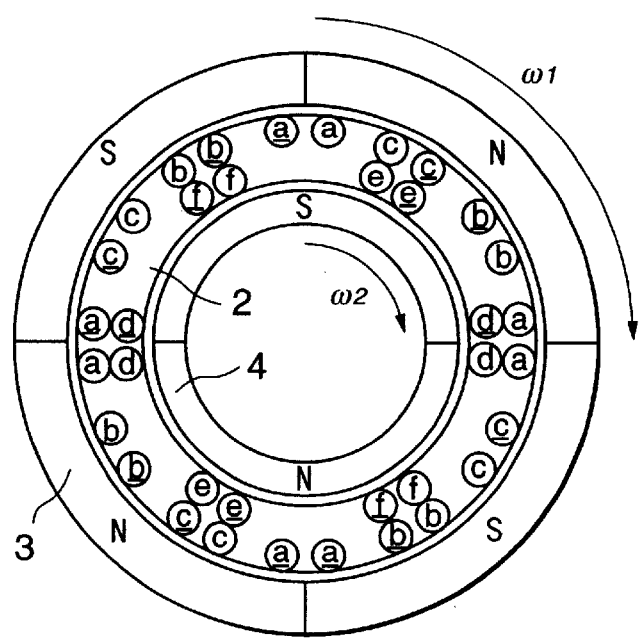
FIG. 2 is a schematic cross-sectional view of a motor/generator comprising coils arranged on the inner circumference and outer circumference of a stator, assumed for the purpose of describing a composite current according to this invention.

Nest referring to FIG. 2, the determination of the currents will be described. FIG. 2 is provided for the purpose of comparison with the motor/generator in FIG. 1. In the motor/generator in FIG. 2, specific coils d, f, e are provided for rotating the inner rotor 4 and specific coils a, c, b are provided for rotating the outer rotor 3.

In other words inner coil d, f, e form rotating magnetic fields relative to the inner rotor 4 and outer coil a, c, b form rotating magnetic fields relative to the outer rotor 3.

To combine these two groups of coils into the one group shown in FIG. 1, of the inner coils in FIG. 2, half of the current passed into the coil d is taken up by each of the coils a and c which are in the vicinity of the coil d, half of the current passed into the coil f is taken up by each of the coils a and c which are in the vicinity of the coil f, and half of the current passed into the coil e is taken up by each of the coils c and b which are in the vicinity of the coil e. The equations for the currents $I_1$–$I_{12}$ mentioned above are mathematical expressions of this concept. However, the currents may be set by other methods described hereafter.

When this current setting is applied, two rotating magnetic fields can be formed simultaneously, i.e., rotating magnetic fields relative to the inner rotor 4 and rotating magnetic fields relative to the outer rotor 3, despite the use of one set of coils. Also, the rotating magnetic fields which the stator 2 forms relative to the outer rotor 3 do not give a rotational torque to the permanent magnets of the inner rotor 4, and the rotating magnetic fields which the stator 2 forms relative to the inner rotor 4 do not give a rotational torque to the permanent magnets of the outer rotor 3. This point is verified by theoretical analysis described later.

The frequency of the currents Id, If, Ie is set based on a target rotation speed of the inner rotor 4 and that of the currents Ia, Ic, Ib is set based on a target rotation speed of the outer rotor 3.

Control of the motor/generator 1 is performed by a controller shown in FIG. 3.

Figure 4:
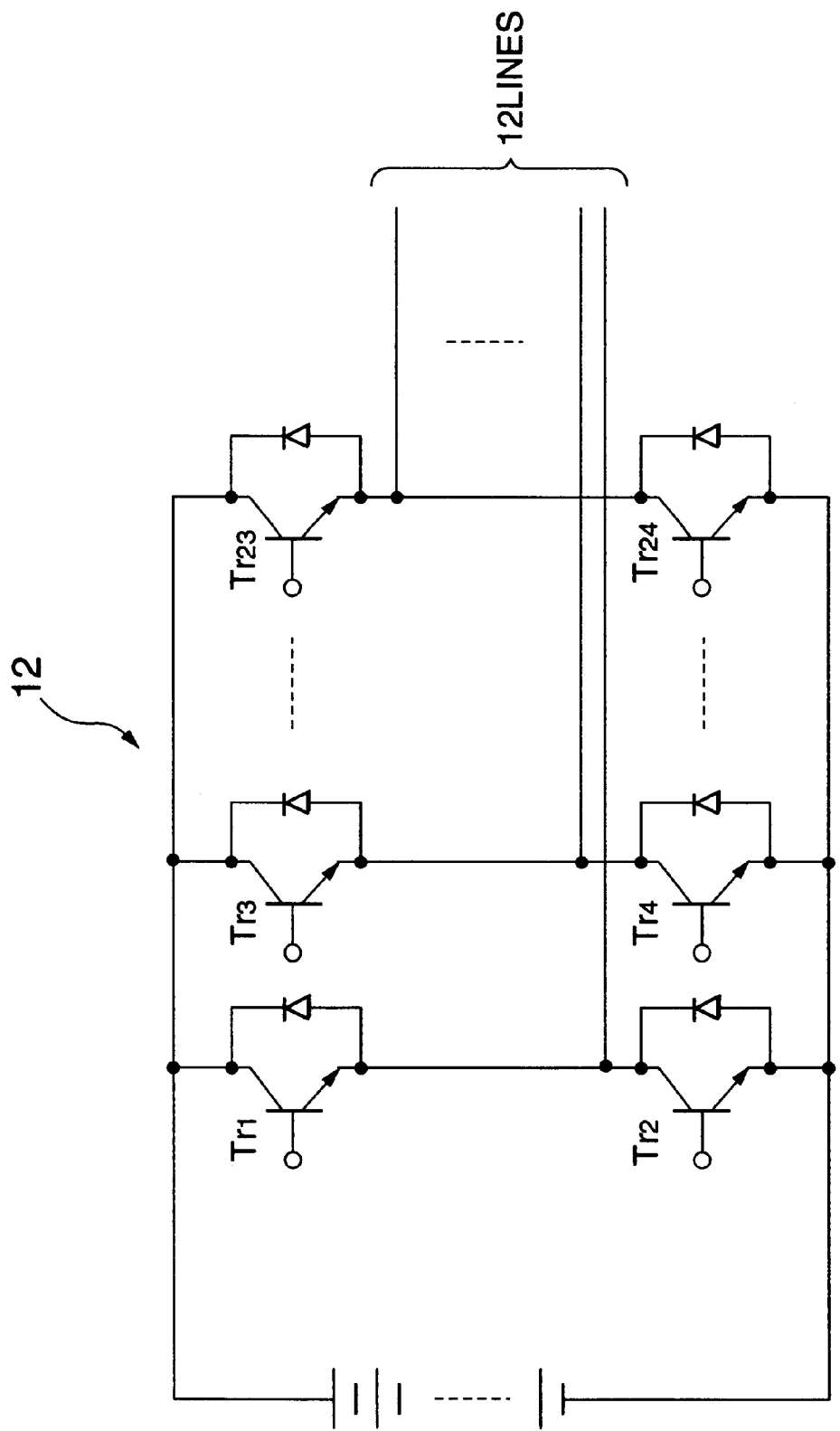
FIG. 4 is a circuit diagram of an inverter according to this invention.

The controller comprises an inverter 12 to convert the direct current of a battery power source 11 into alternating currents in order to supply the stator 2 with the currents $I_1$–$I_{12}$. This inverter 12 is a twelve-phase inverter comprising twenty four transistors $Tr_1$–$Tr_{24}$ and the same number of diodes as shown in FIG. 4. This inverter 12 may be obtained by modifying an ordinary three-phase inverter to have twelve phases.

An ON/OFF signal supplied to each gate of the inverter 12, i.e., base of the transistors, is a pulse width modulation (PWM) signal.

Rotation angle sensors 14 and 13 to detect the phase of the rotors 3 and 4 are installed, and signals from these sensors 13 and 14 are input into a control circuit 15.

The PWM signal is generated in the control circuit 15 based on positive or negative torque command values input to the control circuit 15 specifying the desired torque to be exerted on the outer rotor 3 and inner rotor 4.

In this way, in this motor/generator, two rotors 3 and 4 and one stator 2 are arranged coaxially in three layers, a series of coils 6 is provided in the stator 2, and currents are passed to these coils 6 so as to generate rotating magnetic fields inside and outside which are equal in number to the number of magnetic poles of the rotors 3 and 4.

Therefore, when one of the rotors 3 and 4 is driven as a motor and the other is driven as a generator, a current differential between the motor drive force and the generator drive force may passed into the coils 6. It is not necessary to provide specific coils for the rotors 3 and 4 separately as in the aforesaid prior art. Hence, current losses are largely reduced.

Further, as the rotation of two rotors 3 and 4 can be controlled by a single inverter 12, the cost of the inverter can be reduced, and as the power switching transistor capacitance of the inverter is reduced, switching efficiency improves.

In this way, of the salient poles formed on the outer circumference and inner circumference of the stator 2, the total number of inner salient poles 7D is arranged to be a half of the total number of coils 6, so the number of the cores 7 can be reduced relative to the number of coils, and the number of components of the stator 2 can be reduced.

Figure 5:
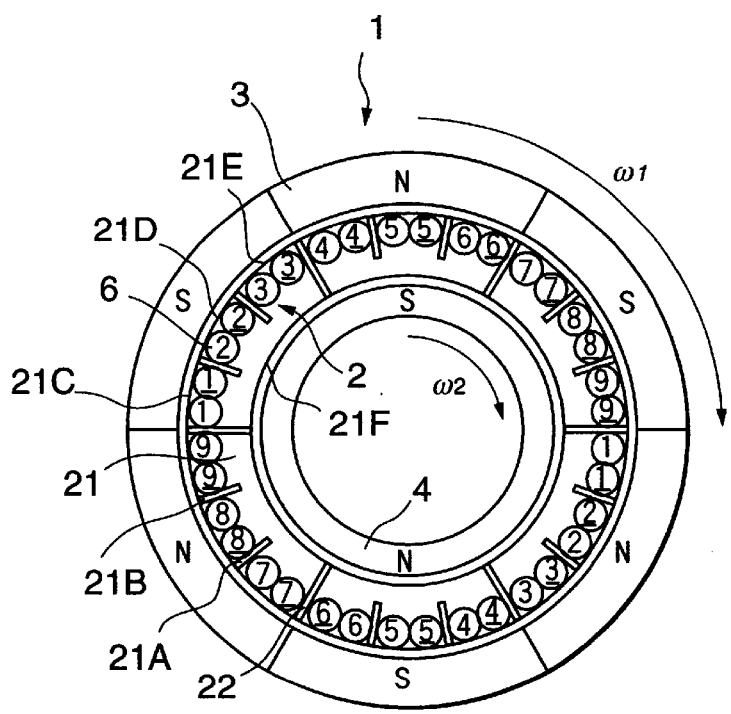
FIG. 5 is a schematic cross-sectional view of a motor/generator according to a second embodiment of this invention.

Next, a second embodiment of the invention will be described referring to FIG. 5.

According to this embodiment, the outer rotor 3 comprises six magnetic poles and eighteen of the coils 6 are used for the stator 2. In the aforesaid first embodiment, the magnetic pole number ratio of the outer rotor 3 and inner rotor 4 was 2:1, but in this embodiment, the magnetic pole number ratio is 3:1. In other words, S and N poles alternate every 60 degree in the outer rotor 3.

In the stator 2, one core 21 is used for three coils. The stator 2 comprises six of the cores 21 arranged at an equal interval with a predetermined gap 22 on the circumference. In each core 21, two slits 21A and 21B which open toward the outer circumference are provided so as to split the core into three parts.

Due to this, the core 21 comprises three salient poles 21C, 21D, 21E on the outer circumference and one salient pole 21F on the inner circumference. Overall, there are eighteen salient poles on the outer circumference and six salient poles on the inner circumference. In other words, the total number of salient poles on the outer circumference is equal to the number of coils 6, and the number of salient poles on the inner circumference side is one third of the total number of coils 6. In this embodiment also, the construction of the stator 2 may be simplified by reducing the number of salient poles.

However when the magnetic pole number ratio is 3:1, unlike the case where the magnetic pole number ratio is 2:1, the permanent magnets of the inner rotor 4 are affected by the rotating magnetic fields formed by the stator 2 relative to the outer rotor 3, and a fluctuation occurs in the rotational torque of the inner rotor 4. The permanent magnets of the outer rotor 3 do not receive a rotational torque from the rotating magnetic fields formed by the stator 2 relative to the inner rotor 4, so the rotational torque of the outer rotor 3 is free from fluctuation.

From theoretical analysis described later, this torque fluctuation is a function of the phase difference (omega1–omega2) of the outer rotor 3 and inner rotor 4. Therefore, this torque fluctuation can be canceled by previously applying an amplitude modulation to the alternating current which generates the rotating magnetic fields relative to the outer rotor 3.

As a result, in this embodiment also, the outer rotor 3 and inner rotor 4 may basically be driven independently by a composite current as in the case when the magnetic pole number ratio is 2:1.

Further, in this embodiment, an eighteen-phase alternating current is passed through eighteen of the coils 6. However, as the phase of the alternating current is actually reversed over half a semicircle, it is sufficient if the inverter 12 has a function to produce nine-phase alternating current. In other words, the same current is passed in the reverse direction through coils #1 and #10, and the same current is passed in the reverse direction through coils #2 and #11, coils #3 and #12, coils #4 and #13, coils #5 and #14, coils #6 and #15, coils #7 and #16, coils #8 and #17, and coils #9 and #18.

Due to this, as the inverter 12 can be constructed from eighteen transistors and eighteen diodes, the number of transistors and diodes can be reduced in comparison to the aforesaid first embodiment.

Figure 6:
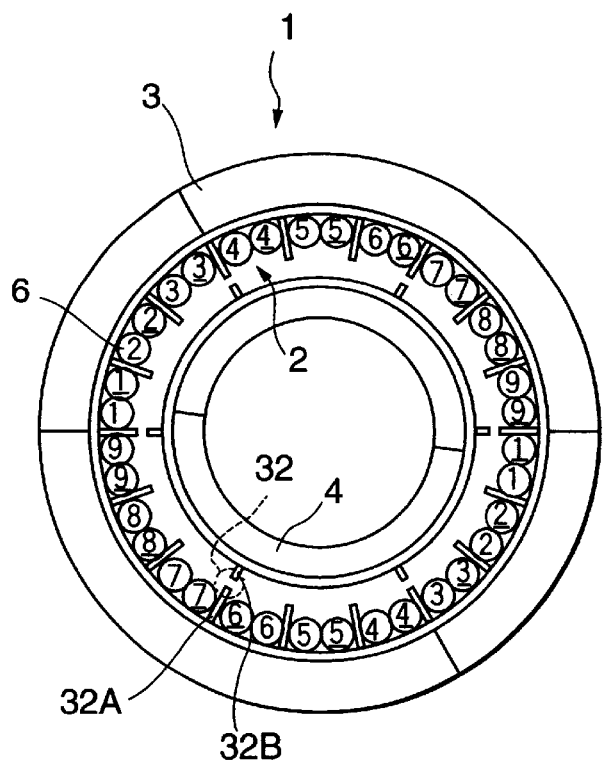
FIG. 6 is is similar to FIG. 5, but showing a third embodiment of this invention.

Next, a third embodiment of the invention will be described referring to FIG. 6.

This embodiment integrates six of the cores 21 of the aforesaid second embodiment as a core 31 by providing a large resistor 32 of high magnetic reluctance instead of the gap 22 of the aforesaid second embodiment.

The large resistor 32 comprises slits 32A and 32B which are respectively provided on the outer circumference and inner circumference of the stator 2. In this embodiment, eighteen salient poles are formed on the outer circumference of the stator 2, and six salient poles are formed on the inner circumference as in the aforesaid second embodiment.

Due to this, the number of parts and number of assembly steps of the stator 2 are decreased more than in the aforesaid second embodiment.

The above-mentioned embodiment describe cases where the magnetic pole number ratio was 2:1 or 3:1, but it can be shown from theoretical analysis that the outer rotor 3 and inner rotor 4 can be driven using one type of the coils 6 whatever the magnetic pole number ratio may be.

Next, the theoretical analysis of the driving forces acting on the rotors will be performed with respect to the magnetic pole number ratios.

(1) N(2p-2p) Type

First, describing the notation N(2p-2p), 2p on the left represents the number of magnetic poles of the permanent magnets of the outer rotor 3, and 2p on the right represents the number of magnetic poles of the permanent magnets of the inner rotor 4. Accordingly, the magnetic pole number ratio N(2p-2p) means a motor/generator wherein the magnetic polymer ratio of the outer rotor 3 and inner rotor 4 is 1:1.

N is a positive integer. If N is 1, the magnetic pole number of both the outer rotor 3 and inner rotor 4 is two, and if N is 2, the magnetic pole number of both the outer rotor 3 and inner rotor 4 is four.

Figure 7:
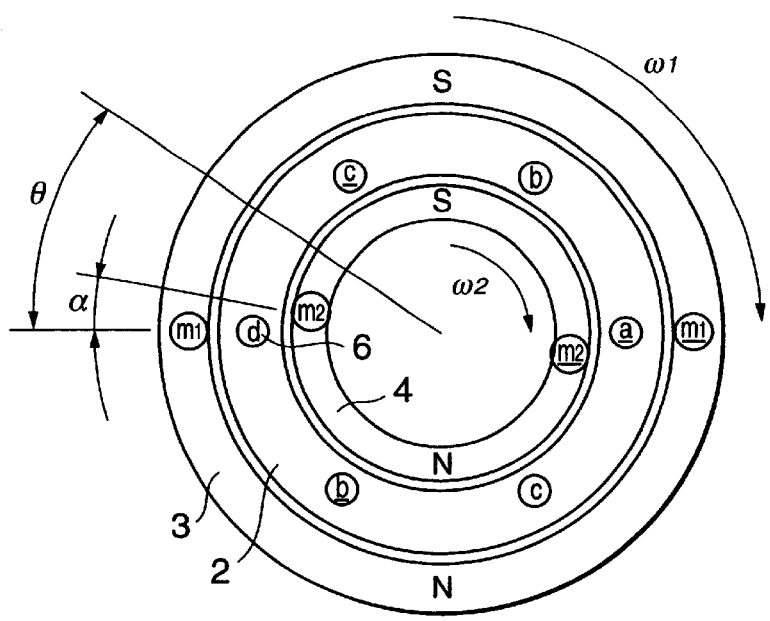
FIG. 7 is a schematic cross-sectional view of a motor/generator having a magnetic pole number ratio of 1:1 set as a model for performing a theoretical analysis of magnetic flux and rotation torque.

FIG. 7 shows the case of a motor/generator wherein N is 1.

(1-1) Basic Formulae

In FIG. 7, if the permanent magnets of the outer rotor 3 (hereafter abbreviated as outer magnets) $m_1$ and the permanent magnets of the inner rotor 4 (hereafter abbreviated as inner magnets) $m_2$ are replaced by equivalent coils, the magnetic flux densities $B_1$, $B_2$ of the permanent magnets may be represented by the following equations (1) and (2).

$$B_1 = Bm_1 \cdot \sin(\omega_1 \cdot t - \theta) = \mu \cdot Im_1 \cdot \sin(\omega_1 \cdot t - \theta) \quad (1)$$

$$B_2 = Bm_2 \cdot \sin(\omega_2 \cdot t + \alpha - \theta) = \mu \cdot Im_2 \cdot \sin(\omega_2 \cdot t + \alpha - \theta) \quad (2)$$

where, $Bm_1$, $Bm_2$=magnetic flux amplitudes, $\mu$=magnetic permeability, $Im_1$=equivalent direct current of outer magnets, $Im_2$=equivalent direct current of inner magnets, $\omega_1$=rotational angular velocity of outer magnets, $\omega_2$=rotational angular velocity of inner magnets, $\alpha$=phase difference of outer and inner magnets (when t=0), and t=elapsed time from time when phase of outer magnets and stator coil coincided.

If the current passed through the stator is a three-phase alternating current, the magnetic flux density Bc due to the stator coil is expressed by the following equation (3).

$$Bc = \mu \cdot n \cdot \left\{ Ica(t) \cdot \sin\theta + Icb(t) \cdot \sin\left(\theta - \frac{2\pi}{3}\right) + Icc(t) \cdot \sin\left(\theta - \frac{4\pi}{3}\right) \right\} \quad (3)$$

where, n=coil constant.

In equation (3), Ica(t), Icb(t), Icc(t) are currents which are different in phase by 120 degrees.

The variation of the aforesaid magnetic flux densities $B_1$, $B_2$ and Bc is shown in FIGS. 8A–8C. The magnetic flux density changes as a sine-wave, and a total magnetic flux density B at an angle $\theta$ is expressed by the following equation (4).

$$B = B_1 + B_2 + Bc \quad (4)$$

$$= \mu \cdot Im_1 \cdot \sin(\omega_1 \cdot t - \theta) + \mu \cdot Im_2 \cdot \sin(\omega_2 \cdot t + \alpha - \theta) + \mu \cdot n \cdot$$

$$\left\{ Ica(t) \cdot \sin\theta + Icb(t) \cdot \sin\left(\theta - \frac{2\pi}{3}\right) + Icc(t) \cdot \sin\left(\theta - \frac{4\pi}{3}\right) \right\}$$

Here, let the torque acting on the outer rotor 3 be $\tau_1$. If the force which acts on a semicircle of the outer rotor 3 is $f_1$, the force which then acts the other semicircle is also $f_1$. Accordingly, the force acting on the whole circumference is $2f_1$, and the torque $\tau_1$ may be expressed by the following equation.

$$\tau_1 = 2f_1 \cdot r_1$$

where, $r_1$=distance to outer magnets from center shaft of outer rotor.

Here, the force $f_1$ is a drive force which occurs when a direct current $Im_1$ is generated in a magnetic field of magnetic flux density B. From the above equation, it is seen that there is a directly proportional relation between the torque $\tau_1$ and the drive force $f_1$. As an equivalent direct current is formed for each semicircle, $f_1$ is given by the following equation.

$$f_1 = Im_1 \cdot B$$

where, $\theta = \omega_1 \cdot t_o$.

From this equation and equation (4), $f_1$ may be expressed by the following equation (5).

$$f_1 = Im_1 \cdot \left[ [\mu \cdot Im_2 \cdot \sin(\omega_2 \cdot t + \alpha - \omega_1 \cdot t) + \mu \cdot n \cdot \right. \quad (5)$$

$$\left\{ Ica(t) \cdot \sin(\omega_1 \cdot t) + Icb(t) \cdot \sin\left(\omega_1 \cdot t - \frac{2\pi}{3}\right) + \right.$$

$$\left. \left. Icc(t) \cdot \sin\left(\omega_1 \cdot t - \frac{4\pi}{3}\right) \right\} \right]$$

Similarly, if the force acting on the semicircle of the inner rotor 4 is $f_2$, the force acting on the whole rotor is $2f_2$, so the torque $\tau_2$ acting on the inner magnets $m_2$ may be expressed by the following equation.

$$\tau_2 = 2f_2 \cdot r_2$$

where, $r_2$=distance from center axis of inner rotor 4 to the inner magnets $m_2$.

Here, the force $f_2$ is the drive force due to an equivalent direct current $Im_2$ in a magnetic field of magnetic flux density B. As an equivalent direct current is formed for each semicircle, $f_2$ is given by the following equation.

$$f_2 = Im_2 \cdot B$$

where, $\theta = \omega_2 \cdot t + \alpha$.

From this equation and equation (4), $f_2$ may be expressed by the following equation (6)

$$f_2 = Im_2 \cdot \left[\mu \cdot Im_1 \cdot \sin(\omega_1 \cdot t - \omega_2 \cdot t - \alpha) + \mu \cdot n \cdot \right. \quad (6)$$

$$\left\{Ica(t) \cdot \sin(\omega_2 \cdot t + \alpha) + Icb(t) \cdot \sin\left(\omega_2 \cdot t + \alpha - \frac{2\pi}{3}\right) + \right.$$

$$\left.\left. Icc(t) \cdot \sin\left(\omega_2 \cdot t + \alpha - \frac{4\pi}{3}\right)\right\}\right]$$

(1-2) When External Rotating Magnetic Fields are Applied

In order to pass currents in the coils a, b, c each of which has a phase difference of β with respect to the rotating outer magnets $m_1$, alternating currents Ica(t), Icb(t), Icc(t) in equation (3) are set by the following equations (7A)–(7C).

$$IIca(t) = Ic \cdot \cos(\omega_1 \cdot t - \beta) \quad (7A)$$

$$Icb(t) = Ic \cdot \cos\left(\omega_1 \cdot t - \beta - \frac{2\pi}{3}\right) \quad (7B)$$

$$Icc(t) = Ic \cdot \cos\left(\omega_1 \cdot t - \beta - \frac{4\pi}{3}\right) \quad (7C)$$

where,

Ic=amplitude of alternating currents, and

β=phase difference.

The drive force $f_1$, $f_2$ is calculated by substituting equations (7A)–(7C) in equations (5)–(6).

$$f_1 = Im_1 \cdot \{\mu \cdot Im_2 \cdot \sin(\omega_2 \cdot t + \alpha - \omega_1 \cdot t)\} + \mu \cdot n \cdot Ic \cdot$$

$$\left\{\cos(\omega_1 \cdot t - \beta) \cdot \sin(\omega_1 \cdot t) + \right.$$

$$\cos\left(\omega_1 \cdot t - \beta - \frac{2\pi}{3}\right) \cdot \sin\left(\omega_1 \cdot t - \frac{2\pi}{3}\right) +$$

$$\left.\cos\left(\omega_1 \cdot t - \beta - \frac{4\pi}{3}\right) \cdot \sin\left(\omega_1 \cdot t - \frac{4\pi}{3}\right)\right\}$$

Here, the above equation may be rewritten using the formula $\cos(a+b)=\frac{1}{2}\cdot\{\sin(2a+b)-\sin(b)\}$.

$$f_1 = Im_1 \cdot \left[\mu \cdot Im_2 \cdot \sin(\omega_2 \cdot t + \alpha - \omega_1 \cdot t) + \mu \cdot n \cdot Ic \cdot \right. \quad (8)$$

$$\left[\frac{1}{2} \cdot \{\sin(2\omega_1 \cdot t - \beta) + \sin\beta\} + \right.$$

$$\frac{1}{2} \cdot \left[\sin\left\{2\left(\omega_1 \cdot t - \frac{2\pi}{3}\right) - \beta\right\} + \sin\beta\right] +$$

$$\left.\left.\frac{1}{2} \cdot \left[\sin\left\{2\left(\omega_1 \cdot t - \frac{4\pi}{3}\right) - \beta\right\} + \sin\beta\right]\right]\right]$$

$$= Im_1 \cdot \left[\mu \cdot Im_2 \cdot \sin(\omega_2 \cdot t + \alpha - \omega_1 \cdot t) + \frac{1}{2} \cdot \mu \cdot n \cdot Ic \cdot \right.$$

$$\left[3\sin\beta + \sin\left\{2\left(\omega_1 \cdot t - \frac{2\pi}{3}\right) - \beta\right\} + \right.$$

$$\left.\left. \sin\left\{2\left(\omega_1 \cdot t - \frac{4\pi}{3}\right) - \beta\right\}\right]\right]$$

$$= Im_1 \cdot \left[\mu \cdot Im_2 \cdot \sin(\omega_2 \cdot t + \alpha - \omega_1 \cdot t) + \frac{1}{2} \cdot \mu \cdot n \cdot Ic \cdot \right.$$

$$\left.\left\{3\sin\beta + \sin\left(2\omega_1 \cdot t - \frac{4\pi}{3} - \beta\right) + \sin\left(2\omega_1 \cdot t - \frac{8\pi}{3} - \beta\right)\right\}\right]$$

$$= Im_1 \cdot \left[\mu \cdot Im_2 \cdot \sin(\omega_2 \cdot t + \alpha - \omega_1 \cdot t) + \frac{1}{2} \cdot \mu \cdot n \cdot Ic \cdot \right.$$

$$\left\{3\sin\beta + \sin\left(2\omega_1 \cdot t - \beta - \frac{2\pi}{3}\right) + \sin\left(2\omega_1 \cdot t - \beta - \frac{4\pi}{3}\right)\right\}\right]$$

$$= -Im_1 \cdot \left[\mu \cdot Im_2 \cdot \sin\{(\omega_2 - \omega_1) \cdot t - \alpha\} - \frac{3}{2} \cdot \mu \cdot n \cdot Ic \cdot \sin\beta\right]$$

Equation (8) has a form wherein the first term which is a torque fluctuation amount due to the effect of the magnetic field of the inner agnets is added to the second term which is a constant torque.

Also, $f_2$ may be rewritten by the following equation.

$$f_2 = Im_2 \cdot B$$

$$= Im_2 \cdot \left[\mu \cdot Im_1 \cdot \sin(\omega_1 \cdot t - \omega_2 \cdot t - \alpha) + \mu \cdot n \cdot Ic \cdot \right.$$

$$\left\{\cos(\omega_1 \cdot t - \beta) \cdot \sin(\omega_2 \cdot t + \alpha) + \right.$$

$$\cos\left(\omega_1 \cdot t - \frac{2\pi}{3} - \beta\right) \cdot \sin\left(\omega_2 \cdot t - \frac{2\pi}{3} + \alpha\right) +$$

$$\left.\left.\cos\left(\omega_1 \cdot t - \frac{4\pi}{3} - \beta\right) \cdot \sin\left(\omega_2 \cdot t - \frac{4\pi}{3} + \alpha\right)\right\}\right]$$

Here, the above equation may be rewritten using the formula $\cos(a)\cdot\sin(b)=\frac{1}{2}\cdot\{\sin(a+b)-\sin(a-b)\}$.

$$f_2 = Im_2 \cdot \left[\mu \cdot Im_1 \cdot \sin(\omega_1 \cdot t - \omega_2 \cdot t - \alpha) + \mu \cdot n \cdot Ic \cdot \frac{1}{2} \cdot \right. \quad (9)$$

$$\left\{\sin(\omega_1 \cdot t - \beta + \omega_2 \cdot t + \alpha) - \sin(\omega_1 \cdot t - \beta - \omega_2 \cdot t - \alpha) + \right.$$

$$\sin\left(\omega_1 \cdot t - \frac{2\pi}{3} - \beta + \omega_2 \cdot t - \frac{2\pi}{3} + \alpha\right) -$$

$$\sin\left(\omega_1 \cdot t - \frac{2\pi}{3} - \beta - \omega_2 \cdot t + \frac{2\pi}{3} - \alpha\right) +$$

$$\sin\left(\omega_1 \cdot t - \frac{4\pi}{3} - \beta + \omega_2 \cdot t - \frac{4\pi}{3} + \alpha\right) -$$

$$\left.\left.\sin\left(\omega_1 \cdot t - \frac{4\pi}{3} - \beta - \omega_2 \cdot t + \frac{4\pi}{3} - \alpha\right)\right\}\right]$$

$$= Im_2 \cdot \left[\mu \cdot Im_1 \cdot \sin(\omega_1 \cdot t - \omega_2 \cdot t - \alpha) + \mu \cdot n \cdot Ic \cdot \frac{1}{2} \cdot \right.$$

$$\left[\sin\{(\omega_1 + \omega_2) \cdot t + \alpha - \beta\} - \sin\{(\omega_1 - \omega_2) \cdot t - \alpha - \beta\} + \right.$$

$$\sin\left\{(\omega_1 - \omega_2) \cdot t - \frac{4\pi}{3} + \alpha - \beta\right\} -$$

$$\sin\{(\omega_1 - \omega_2) \cdot t - \alpha + \beta\} +$$

$$\sin\left\{(\omega_1 + \omega_2) \cdot t - \frac{8\pi}{3} + \alpha - \beta\right\} -$$

$$\left.\left.\sin\{(\omega_1 - \omega_2) \cdot t - \alpha - \beta\}\right]\right]$$

$$= Im_2 \cdot \left[\mu \cdot Im_1 \cdot \sin(\omega_1 \cdot t - \omega_2 \cdot t - \alpha) - \frac{3}{2} \cdot \mu \cdot n \cdot Ic \cdot \right.$$

$$\sin\{(\omega_1 - \omega_2) \cdot t - \alpha - \beta\} + \mu \cdot n \cdot Ic \cdot \frac{1}{2} \cdot$$

$$[\sin\{(\omega_1 + \omega_2) \cdot t + \alpha - \beta\} +$$

$$\sin\left\{(\omega_1 - \omega_2) \cdot t + \alpha - \beta - \frac{2\pi}{3}\right\} +$$

-continued
$$\sin\{(\omega_1 + \omega_2) \cdot t + \alpha - \beta - \frac{4\pi}{3}\}\Big]\Big]$$

$$= \mu \cdot Im_2 \cdot \Big[Im_1 \cdot \sin\{(\omega_1 - \omega_2) \cdot t - \alpha\} - \frac{3}{2} \cdot n \cdot Ic \cdot$$

$$\sin\{(\omega_1 - \omega_2) \cdot t - \alpha - \beta\}$$

(1-3) When Inner Rotating Magnetic Fields are Applied

In order to pass currents in the coils a, b, c each of which has a phase difference of $\gamma$ with respect to the rotating inner magnets $m_2$, alternating currents Ica(t), Icb(t), Icc(t) in the above equation (3) are set by the following equations (10A)–(10C).

$$Ica(t) = Ic \cdot \cos(\omega_2 \cdot t - \gamma) \tag{10A}$$

$$Icb(t) = Ic \cdot \cos\left(\omega_2 \cdot t - \gamma - \frac{2\pi}{3}\right) \tag{10B}$$

$$Icc(t) = Ic \cdot \cos\left(\omega_2 \cdot t - \gamma - \frac{4\pi}{3}\right) \tag{10C}$$

where,

Ic=amplitude of alternating currents, and $\gamma$=phase difference.

The drive force $f_1$, $f_2$ is calculated by substituting equations (10A)–(10C) in equations (5)–(6).

$$f_1 = Im_1 \cdot \Big[\mu \cdot Im_2 \cdot \sin\Big[\omega_2 \cdot t + \alpha - \omega_1 \cdot t + \mu \cdot n \cdot Ic \cdot$$

$$\Big\{\cos(\omega_2 \cdot t - \gamma) \cdot \sin(\omega_1 \cdot t) +$$

$$\cos\left(\omega_2 \cdot t - \gamma - \frac{2\pi}{3}\right) \cdot \sin\left(\omega_1 \cdot t - \frac{2\pi}{3}\right) +$$

$$\cos\left(\omega_2 \cdot t - \gamma - \frac{4\pi}{3}\right) \cdot \sin\left(\omega_1 \cdot t - \frac{4\pi}{3}\right)\Big\}\Big]\Big]$$

Here, the above equation may be rewritten using the formula $\cos(a) \cdot \sin(b) = \frac{1}{2} \cdot \{\sin(a+b) - \sin(a-b)\}$ $$f_1 = Im_1 \cdot \Big[\mu \cdot Im_2 \cdot \sin(\omega_2 \cdot t + \alpha - \omega_1 \cdot t) + \frac{1}{2} \cdot \mu \cdot n \cdot Ic \cdot \tag{11}$$

$$\Big\{\sin(\omega_2 \cdot t - \gamma + \omega_1 \cdot t) - \sin(\omega_2 \cdot t - \gamma - \omega_1 \cdot t) +$$

$$\sin\left(\omega_2 \cdot t - \gamma - \frac{2\pi}{3} + \omega_1 \cdot t - \frac{2\pi}{3}\right) -$$

$$\sin\left(\omega_2 \cdot t - \gamma - \frac{2\pi}{3} - \omega_1 \cdot t + \frac{2\pi}{3}\right) +$$

$$\sin\left(\omega_2 \cdot t - \gamma - \frac{4\pi}{3} + \omega_1 \cdot t - \frac{4\pi}{3}\right) -$$

$$\sin\left(\omega_2 \cdot t - \gamma - \frac{4\pi}{3} - \omega_1 \cdot t + \frac{4\pi}{3}\right)\Big\}\Big] +$$

$$= Im_1 \cdot \Big[\mu \cdot Im_2 \cdot \sin\{(\omega_2 - \omega_1) \cdot t + \alpha\} + \frac{1}{2} \cdot \mu \cdot n \cdot Ic \cdot$$

$$\Big[\sin\{(\omega_2 + \omega_1) \cdot t - \gamma\} - \sin\{(\omega_2 - \omega_1) \cdot t - \gamma\} +$$

$$\sin\Big\{(\omega_2 + \omega_1) \cdot t - \gamma - \frac{4\pi}{3}\Big\} - \sin\{(\omega_2 - \omega_1) \cdot t - \gamma\} +$$

-continued
$$\sin\Big\{(\omega_2 + \omega_1) \cdot t - \gamma - \frac{8\pi}{3}\Big\} - \sin\{(\omega_2 - \omega_1) \cdot t - \gamma\}\Big]\Big]$$

$$= Im_1 \cdot \Big[\mu \cdot Im_2 \cdot \sin\{(\omega_2 - \omega_1) \cdot t + \alpha\} - \frac{3}{2} \cdot \mu \cdot n \cdot Ic \cdot$$

$$\sin\{(\omega_2 - \omega_1) \cdot t - \gamma\} + \frac{1}{2} \cdot \mu \cdot n \cdot Ic \cdot$$

$$\Big[\sin\{(\omega_2 + \omega_1) \cdot t - \gamma\} + \sin\Big\{(\omega_2 + \omega_1) \cdot t - \gamma - \frac{2\pi}{3}\Big\} +$$

$$\sin\Big\{(\omega_2 + \omega_1) \cdot t - \gamma - \frac{4\pi}{3}\Big\}\Big]\Big]$$

$$= -\mu \cdot Im_1 \cdot \Big[Im_2 \cdot \sin\{(\omega_1 - \omega_2) \cdot t - \alpha\} - \frac{3}{2} \cdot n \cdot Ic \cdot$$

$$\sin\{(\omega_1 - \omega_2) \cdot t + \gamma\}\Big]$$

Equation (11) shows that a torque fluctuation occurs only in the outer magnets.

Also, $f_2$ may be rewritten by the following equation.

$$f_2 = Im_2 \cdot \Big[\mu \cdot Im_1 \cdot \sin(\omega_2 \cdot t - \omega_1 \cdot t - \alpha) + \mu \cdot n \cdot Ic \cdot$$

$$\Big\{\cos(\omega_2 \cdot t - \gamma) \cdot \sin(\omega_2 \cdot t + \alpha) +$$

$$\cos\left(\omega_2 \cdot t - \gamma - \frac{2\pi}{3}\right) \cdot \sin\left(\omega_2 \cdot t + \alpha - \frac{2\pi}{3}\right) +$$

$$\cos\left(\omega_2 \cdot t - \gamma - \frac{4\pi}{3}\right) \cdot \sin\left(\omega_2 \cdot t + \alpha - \frac{4\pi}{3}\right)\Big\}\Big]$$

Here, the above equation may be rewritten using the formula $\cos(a) \cdot \sin(b) = \frac{1}{2} \cdot \{\sin(a+b) - \sin(a-b)\}$.

$$f_2 = Im_2 \cdot \Big[\mu \cdot Im_1 \cdot \sin(\omega_1 \cdot t - \omega_2 \cdot t - \alpha) - \frac{3}{2} \cdot \mu \cdot n \cdot Ic \cdot \tag{12}$$

$$\sin(-\alpha - \gamma) + \frac{1}{2} \cdot \mu \cdot n \cdot Ic \cdot \Big\{\sin(2 \cdot \omega_2 \cdot t + \alpha - \gamma) +$$

$$\sin\left(2 \cdot \omega_2 \cdot t + \alpha - \gamma - \frac{2\pi}{3}\right) + \sin\left(2 \cdot \omega_2 \cdot t + \alpha - \gamma - \frac{4\pi}{3}\right)\Big\}\Big]$$

$$= \mu \cdot Im_2 \cdot \Big[Im_1 \cdot \sin\{(\omega_1 - \omega_2) \cdot t - \alpha\} + \frac{3}{2} \cdot n \cdot Ic \cdot \sin(\alpha + \gamma)\Big]$$

Equation (12) has a form wherein the first term which is a torque fluctuation amount due to the effect of the magnetic field of the inner magnets is added to the second term which is a constant torque.

(1-4) When the Outer Rotating Magnetic Fields and Inner Rotating Magnetic Fields are Applied Together The above Ica(t), Icb(t), Icc(t) are set to pass a current through the coils 6 in synchronism with the outer magnets and inner magnets.

$$Ica(t) = Ic \cdot \cos(\omega_1 \cdot t - \beta) + Ic_2 \cdot \cos(\omega_2 \cdot t - \gamma) \tag{13A}$$

$$Icb(t) = Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right) \tag{13B}$$

$$Icc(t) = Ic \cdot \cos\left(\omega_1 \cdot t - \beta - \frac{4\pi}{3}\right) + Ic_2 \cdot \cos\left(\omega_2 \cdot t - \gamma - \frac{4\pi}{3}\right) \tag{13C}$$

The drive forces $f_1$, $f_2$ are calculated by the following equations (14), (15).

$$f_1 = Im_1 \cdot \left[ \mu \cdot Im_2 \cdot \sin(\omega_2 \cdot t + \alpha - \omega_1 \cdot t) + \mu \cdot n \cdot \right. \tag{14}$$

$$\left[ \{Ic \cdot \cos(\omega_1 \cdot t - \beta) + Ic_2 \cdot \cos(\omega_2 \cdot t - \gamma)\} \cdot \sin(\omega_1 \cdot t) + \right.$$

$$\left\{ Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right) \right\} \cdot$$

$$\sin\left(\omega_1 \cdot t - \frac{2\pi}{3}\right) + \left\{ Ic \cdot \cos\left(\omega_1 \cdot t - \beta - \frac{4\pi}{3}\right) + \right.$$

$$\left. Ic_2 \cdot \cos\left(\omega_2 \cdot t - \gamma - \frac{4\pi}{3}\right) \right\} \cdot \sin\left(\omega_1 \cdot t - \frac{4\pi}{3}\right) \right] \right]$$

$$= Im_1 \cdot \left[ \mu \cdot Im_2 \cdot \sin(\omega_2 \cdot t + \alpha - \omega_1 \cdot t) + \mu \cdot n \cdot \right.$$

$$\left\{ Ic \cdot \cos(\omega_1 \cdot t - \beta) \cdot \sin(\omega_1 \cdot t) + Ic_2 \cdot \cos(\omega_2 \cdot t - \gamma) \cdot \right.$$

$$\sin(\omega_1 \cdot t) + Ic \cdot \cos\left(\omega_1 \cdot t - \beta - \frac{2\pi}{3}\right) \cdot \sin\left(\omega_1 \cdot t - \frac{2\pi}{3}\right) +$$

$$Ic_2 \cdot \cos\left(\omega_2 \cdot t - \gamma - \frac{2\pi}{3}\right) \cdot \sin\left(\omega_1 \cdot t - \frac{2\pi}{3}\right) +$$

$$Ic \cdot \cos\left(\omega_1 \cdot t - \beta - \frac{4\pi}{3}\right) \cdot \sin\left(\omega_1 \cdot t - \frac{4\pi}{3}\right) +$$

$$\left. Ic_2 \cdot \cos\left(\omega_2 \cdot t - \gamma - \frac{4\pi}{3}\right) \cdot \sin\left(\omega_1 \cdot t - \frac{4\pi}{3}\right) \right\} \right]$$

$$= Im_1 \cdot \left[ \mu \cdot Im_2 \cdot \sin(\omega_2 \cdot t + \alpha - \omega_1 \cdot t) + \mu \cdot n \cdot \right.$$

$$\left[ Ic \cdot \left\{ \cos(\omega_1 \cdot t - \beta) \cdot \sin(\omega_1 \cdot t) + \cos\left(\omega_1 \cdot t - \beta - \frac{2\pi}{3}\right) \cdot \right. \right.$$

$$\sin\left(\omega_1 \cdot t - \frac{2\pi}{3}\right) + \cos\left(\omega_1 \cdot t - \beta - \frac{4\pi}{3}\right) \cdot$$

$$\left. \sin\left(\omega_1 \cdot t - \frac{4\pi}{3}\right) \right\} + Ic_2 \cdot \{\cos(\omega_2 \cdot t - \gamma) \cdot \sin(\omega_1 \cdot t) +$$

$$\cos\left(\omega_2 \cdot t - \gamma - \frac{2\pi}{3}\right) \cdot \sin\left(\omega_1 \cdot t - \frac{2\pi}{3}\right) +$$

$$\left. \cos\left(\omega_2 \cdot t - \gamma - \frac{4\pi}{3}\right) \cdot \sin\left(\omega_1 \cdot t - \frac{4\pi}{3}\right) \right\} \right]$$

$$= Im_1 \cdot \left[ \mu \cdot Im_2 \cdot \sin(\omega_2 \cdot t + \alpha - \omega_1 \cdot t) + \mu \cdot n \cdot \right.$$

$$\left[ Ic \cdot \left(\frac{3}{2} \cdot \sin\beta\right) + Ic_2 \cdot \left[\frac{3}{2} \cdot \sin\{(\omega_1 - \omega_2)t + \gamma\}\right] \right] \right]$$

Equation (14) has a form wherein a torque fluctuation is added to a constant torque according to a rotation phase difference β relative to the outer magnets $m_1$.

$$f_2 = Im_2 \cdot \left[ \mu \cdot Im_1 \cdot \sin(\omega_1 \cdot t - \omega_2 \cdot t - \alpha) + \mu \cdot n \cdot \right.$$

$$\left[ \{Ic \cdot \cos(\omega_1 \cdot t - \beta) + Ic_2 \cdot \cos(\omega_2 \cdot t - \gamma)\} \cdot \sin(\omega_2 \cdot t + \alpha) + \right.$$

$$\left\{ Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right) \right\} \cdot$$

$$\sin\left(\omega_2 \cdot t + \alpha - \frac{2\pi}{3}\right) + \left\{ Ic \cdot \cos\left(\omega_1 \cdot t - \beta - \frac{4\pi}{3}\right) + \right.$$

$$\left. Ic_2 \cdot \cos\left(\omega_2 \cdot t - \gamma - \frac{4\pi}{3}\right) \right\} \cdot \sin\left(\omega_2 \cdot t + \alpha - \frac{4\pi}{3}\right) \right] \right]$$

$$= Im_2 \cdot \left[ \mu \cdot Im_1 \cdot \sin(\omega_1 \cdot t - \omega_2 \cdot t - \alpha) + \mu \cdot n \cdot \right.$$

$$\left\{ Ic \cdot \cos(\omega_1 \cdot t - \beta) \cdot \sin(\omega_2 \cdot t + \alpha) + Ic_2 \cdot \cos(\omega_2 \cdot t - \gamma) \cdot \right.$$

$$\sin(\omega_2 \cdot t + \alpha) + Ic \cdot \cos\left(\omega_1 \cdot t - \beta - \frac{2\pi}{3}\right) \cdot \sin\left(\omega_2 \cdot t + \alpha - \frac{2\pi}{3}\right) +$$

$$Ic_2 \cdot \cos\left(\omega_2 \cdot t - \gamma - \frac{2\pi}{3}\right) \cdot \sin\left(\omega_2 \cdot t + \alpha - \frac{2\pi}{3}\right) +$$

$$Ic \cdot \cos\left(\omega_1 \cdot t - \beta - \frac{4\pi}{3}\right) \cdot \sin\left(\omega_2 \cdot t + \alpha - \frac{4\pi}{3}\right) +$$

$$\left. Ic_2 \cdot \cos\left(\omega_2 \cdot t - \gamma - \frac{4\pi}{3}\right) \cdot \sin\left(\omega_2 \cdot t + \alpha - \frac{4\pi}{3}\right) \right\} \right]$$

$$= Im_2 \cdot \left[ \mu \cdot Im_1 \cdot \sin(\omega_1 \cdot t - \omega_2 \cdot t - \alpha) + \mu \cdot n \cdot \right.$$

$$\left[ Ic \cdot \left\{ \cos(\omega_1 \cdot t - \beta) \cdot \sin(\omega_2 \cdot t + \alpha) + \cos\left(\omega_1 \cdot t - \beta - \frac{2\pi}{3}\right) \cdot \right. \right.$$

$$\sin\left(\omega_2 \cdot t + \alpha - \frac{2\pi}{3}\right) + \cos\left(\omega_1 \cdot t - \beta - \frac{4\pi}{3}\right) \cdot$$

$$\left. \sin\left(\omega_2 \cdot t + \alpha - \frac{4\pi}{3}\right) \right\} + Ic_2 \cdot \{\cos(\omega_2 \cdot t - \gamma) \cdot \sin(\omega_2 \cdot t + \alpha) +$$

$$\cos\left(\omega_2 \cdot t - \gamma - \frac{2\pi}{3}\right) \cdot \sin\left(\omega_2 \cdot t + \alpha - \frac{2\pi}{3}\right) +$$

$$\left. \cos\left(\omega_2 \cdot t - \gamma - \frac{4\pi}{3}\right) \cdot \sin\left(\omega_2 \cdot t + \alpha - \frac{4\pi}{3}\right) \right\} \right]$$

Here, the above equation may be rewritten using the formula $\cos(a)\cdot\sin(b) = \frac{1}{2}\{\sin(a+b) - \sin(a-b)\}$ $$f_2 = Im_2 \cdot \left[ \mu \cdot Im_1 \cdot \sin(\omega_1 \cdot t - \omega_2 \cdot t - \alpha) + \mu \cdot n \cdot \right. \tag{15}$$

$$\left[ Ic \cdot \left[ \frac{1}{2} \cdot \{\sin(\omega_1 \cdot t - \beta + \omega_2 \cdot t + \alpha) - \right. \right.$$

$$\sin(\omega_1 \cdot t - \beta - \omega_2 \cdot t - \alpha)\} + \frac{1}{2} \cdot$$

$$\left\{ \sin\left(\omega_1 \cdot t - \beta - \frac{2\pi}{3} + \omega_2 \cdot t + \alpha - \frac{2\pi}{3}\right) - \right.$$

$$\left. \sin\left(\omega_1 \cdot t - \beta - \frac{2\pi}{3} - \omega_2 \cdot t - \alpha + \frac{2\pi}{3}\right) \right\} + \frac{1}{2} \cdot$$

$$\left\{ \sin\left(\omega_1 \cdot t - \beta - \frac{4\pi}{3} + \omega_2 \cdot t + \alpha - \frac{4\pi}{3}\right) - \right.$$

$$\left. \sin\left(\omega_1 \cdot t - \beta - \frac{4\pi}{3} - \omega_2 \cdot t - \alpha + \frac{4\pi}{3}\right) \right\} \right] + Ic_2 \cdot \left[ \frac{1}{2} \cdot$$

$$\{\sin(\omega_2 \cdot t - \gamma + \omega_2 \cdot t + \alpha) - \sin(\omega_2 \cdot t - \gamma - \omega_2 \cdot t - \alpha)\} +$$

$$\frac{1}{2} \cdot \left\{ \sin\left(\omega_2 \cdot t - \gamma - \frac{2\pi}{3} + \omega_2 \cdot t + \alpha - \frac{2\pi}{3}\right) - \right.$$

$$\left. \sin\left(\omega_2 \cdot t - \gamma - \frac{2\pi}{3} - \omega_2 \cdot t - \alpha + \frac{2\pi}{3}\right) \right\} + \frac{1}{2} \cdot$$

$$\left\{ \sin\left(\omega_2 \cdot t - \gamma - \frac{4\pi}{3} + \omega_2 \cdot t + \alpha - \frac{4\pi}{3}\right) - \right.$$

$$\left. \sin\left(\omega_2 \cdot t - \gamma - \frac{4\pi}{3} - \omega_2 \cdot t - \alpha + \frac{4\pi}{3}\right) \right\} \right] \right]$$

$$= Im_2 \cdot \left[ \mu \cdot Im_1 \cdot \sin(\omega_1 \cdot t - \omega_2 \cdot t - \alpha) + \mu \cdot n \cdot \right.$$

$$\left[ Ic \cdot \left\{ \frac{1}{2} \cdot \{\sin(\omega_1 \cdot t - \beta + \omega_2 \cdot t + \alpha) - \right. \right.$$

$$\left. \sin(\omega_1 \cdot t - \beta - \omega_2 \cdot t - \alpha) \right\} + \frac{1}{2} \cdot$$

$$\left\{ \sin\left(\omega_1 \cdot t - \beta + \omega_2 \cdot t + \alpha - \frac{4\pi}{3}\right) - \right.$$

-continued $$\left.\sin(\omega_1 \cdot t - \beta - \omega_2 \cdot t - \alpha)\right\} + \frac{1}{2} \cdot$$

$$\left\{\sin\left(\omega_1 \cdot t - \beta + \omega_2 \cdot t + \alpha - \frac{8\pi}{3}\right) - \right.$$

$$\left.\sin(\omega_1 \cdot t - \beta - \omega_2 \cdot t - \alpha)\right\} + Ic_2 \cdot \left[\frac{1}{2} \cdot\right.$$

$$\{\sin(\omega_2 \cdot t - \gamma + \omega_2 \cdot t + \alpha) - \sin(\omega_2 \cdot t - \gamma - \omega_2 \cdot t - \alpha)\} +$$

$$\frac{1}{2} \cdot \left\{\sin\left(\omega_2 \cdot t - \gamma + \omega_2 \cdot t + \alpha - \frac{4\pi}{3}\right) - \right.$$

$$\left.\sin(\omega_2 \cdot t - \gamma - \omega_2 \cdot t - \alpha)\right\} + \frac{1}{2} \cdot$$

$$\left\{\sin\left(\omega_2 \cdot t - \gamma + \omega_2 \cdot t + \alpha - \frac{8\pi}{3}\right) - \right.$$

$$\left.\left.\left.\sin(\omega_2 \cdot t - \gamma - \omega_2 \cdot t - \alpha)\right\}\right]\right]$$

$$= Im_2 \cdot \left[\mu \cdot Im_1 \cdot \sin(\omega_1 \cdot t - \omega_2 \cdot t - \alpha) + \frac{1}{2} \cdot \mu \cdot n \cdot Ic \cdot \right.$$

$$\{\sin(\omega_1 \cdot t - \beta + \omega_2 \cdot t + \alpha) - \sin(\omega_1 \cdot t - \beta - \omega_2 \cdot t - \alpha) +$$

$$\sin\left(\omega_1 \cdot t - \beta + \omega_2 \cdot t + \alpha - \frac{4\pi}{3}\right) -$$

$$\sin(\omega_1 \cdot t - \beta + \omega_2 \cdot t - \alpha) +$$

$$\sin\left(\omega_1 \cdot t - \beta + \omega_2 \cdot t + \alpha - \frac{8\pi}{3}\right) -$$

$$\left.\sin(\omega_1 \cdot t - \beta - \omega_2 \cdot t - \alpha)\right\} + \frac{1}{2} \cdot \mu \cdot n \cdot Ic_2 \cdot$$

$$\{\sin(\omega_2 \cdot t - \gamma + \omega_2 \cdot t + \alpha) - \sin(\omega_2 \cdot t - \gamma + \omega_2 \cdot t - \alpha) +$$

$$\sin\left(\omega_2 \cdot t - \gamma + \omega_2 \cdot t + \alpha - \frac{4\pi}{3}\right) -$$

$$\sin(\omega_2 \cdot t - \gamma - \omega_2 \cdot t - \alpha) +$$

$$\sin\left(\omega_2 \cdot t - \gamma + \omega_2 \cdot t + \alpha - \frac{8\pi}{3}\right) -$$

$$\left.\left.\sin(\omega_2 \cdot t - \gamma - \omega_2 \cdot t - \alpha)\right\}\right]$$

$$= Im_2 \cdot \left[\mu \cdot Im_1 \cdot \sin(\omega_1 \cdot t - \omega_2 \cdot t - \alpha) + \frac{1}{2} \cdot \mu \cdot n \cdot Ic \cdot \right.$$

$$\left[-3 \cdot \sin\{(\omega_2 - \omega_1)t - \alpha - \beta\} + \frac{1}{2} \cdot \mu \cdot n \cdot Ic_2 \cdot\right.$$

$$\left.\left.\{-3 \cdot \sin(-\alpha - \gamma)\}\right]\right]$$

$$= Im_2 \cdot \left[\mu \cdot Im_1 \cdot \sin(\omega_1 \cdot t - \omega_2 \cdot t - \alpha) - \frac{3}{2} \cdot \mu \cdot n \cdot Ic \cdot \right.$$

$$\left.\sin\{(\omega_2 - \omega_1) \cdot t - \alpha - \beta\} + \frac{3}{2} \cdot \mu \cdot n \cdot Ic_2 \cdot 3 \cdot \sin(\alpha + \gamma)\right]$$

Equation (15) also has a form wherein a torque fluctuation is added to a constant torque rotation phase difference ($\alpha+\gamma$) relative to the inner magnets $m_2$.

(1-5) Summary

The above-mentioned equations (8),(9),(11),(12),(14), (15) may be summarized as follows.

When the outer rotating magnetic fields are applied $$f_1 = -\mu \cdot Im_1 \cdot [Im_2 \cdot \sin\{(\omega_2 - \omega_1) \cdot t - \alpha\} - \frac{3}{2} \cdot n \cdot Ic \cdot \sin\beta] \quad (8)$$

$$f_2 = \mu \cdot Im_2 \cdot [Im_1 \cdot \sin\{(\omega_1 - \omega_2) \cdot t - \alpha\} - \frac{3}{2} \cdot n \cdot Ic \cdot \sin\{(\omega_1 - \omega_2) \cdot t - \alpha - \beta\}] \quad (9)$$

When the inner rotating magnetic fields are applied $$f_1 = -\mu \cdot Im_1 \cdot [Im_2 \cdot \sin\{(\omega_2 - \omega_1) \cdot t - \alpha\} - \frac{3}{2} \cdot n \cdot Ic \cdot \sin\{(\omega_1 - \omega_2) \cdot t + \gamma\}] \quad (11)$$

$$f_2 = \mu \cdot Im_2 \cdot [Im_1 \cdot \sin\{(\omega_1 - \omega_2) \cdot t - \alpha\} + \frac{3}{2} \cdot n \cdot Ic \cdot \sin(\alpha + \gamma)] \quad (12)$$

When the outer rotating magnetic fields and inner rotating magnetic fields are applied together $$f_1 = Im_1 \cdot [\mu \cdot Im_2 \cdot \sin(\omega_2 \cdot t + \alpha - \omega_1 \cdot t) + \mu \cdot n \cdot [Ic \cdot (\frac{3}{2} \cdot \sin\beta) + Ic_2 \cdot [\frac{3}{2} \cdot \sin\{(\omega_1 - \omega_2) \cdot t + \gamma\}]]] \quad (14)$$

$$f_2 = \mu \cdot Im_2 \cdot [Im_1 \cdot \sin(\omega_1 \cdot t - \omega_2 \cdot t - \alpha) + \frac{3}{2} \cdot n \cdot Ic \cdot \sin\{(\omega_1 - \omega_2) \cdot t - \alpha - \beta\} + \frac{3}{2} \cdot n \cdot Ic_2 \cdot \sin(\alpha + \gamma)] \quad (15)$$

The meaning of these equations is as follows.

The second term on the right-hand side of equation (8), the second term on the right-hand side of equation (12), the second term on the right-hand side of equation (14) and the third term on the right-hand side of equation (15) are fixed terms, i.e., constant values, and a rotational torque occurs only when these constant terms are present. Terms other than the constant terms are trigonometric functions, and the average value of a drive force fn which does not comprise a fixed term is zero. In other words, a rotational torque does not occur due to terms other than fixed terms.

Comparing equations (8) and (9), only $f_1$ from equation (8) comprises a constant torque. In other words, when a current is passed through the coils 6 of the stator 2 in synchronism with the rotation of the outer magnets, a rotational torque acts only the outer magnets.

Comparing equations (11) and (12), only $f_2$ from equation (12) comprises a constant torque. In other words, when a current is passed through the coils 6 of the stator 2 in synchronism with the rotation of the inner magnets, a rotational torque acts only the inner magnets.

Comparing equations (14) and (15), $f_1$ from equation (14) and $f_2$ from equation (15) both comprise a constant torque. In other words, when a current synchronized with the rotation of the outer magnets and a current synchronized with the rotation of the inner magnets are passed together through the coils 6, rotational torques corresponding to the respective currents act on the outer and inner magnets.

It is seen from the above facts that, when the magnetic pole number ratio is 1:1, the two rotors 3,4 can be driven as a generator and a motor simultaneously using only one series of coils 6. Further, it may be surmised that the same operation is possible for any magnetic pole number ratio.

(1-6) Suppression of Torque Fluctuation

Due to terms other than fixed terms in the equations containing fixed terms, i.e., due to the first term on the right-hand side of equation (8), and the first and third terms on the right-hand side of equation (14), a torque fluctuation appears in the outer magnets rotation due to the phase difference ($\omega_1-\omega_2$) between the inner magnets and outer magnets.

Also, due to the first term on the right-hand side of equation (12), and the first and second terms on the right-hand side of equation (15), a torque fluctuation appears in the inner magnets rotation due to the phase difference ($\omega_1-\omega_2$) between the inner magnets and outer magnets.

Now, the suppression of torque fluctuation will be considered when both the outer rotating magnetic fields and an inner rotating magnetic fields are applied.

Equation (14) may be rewritten as follows.

$$f_1 = \mu \cdot Im_1 \cdot Im_2 \cdot \sin(\omega_2 \cdot t + \alpha - \omega_1 \cdot t) + Ic \cdot \mu \cdot n \cdot Im_1 \cdot Ic \cdot (\frac{3}{2} \cdot \sin\beta) + Ic_2 \cdot Im_1 \cdot \frac{3}{2} \cdot \sin\{(\omega_1 - \omega_2) \cdot t + \gamma\}$$

Here, $f_1$ may be written as follows.

$$f_1 = A + Ic \cdot C + Ic_2 \cdot V \quad (16)$$

where, $A = \mu \cdot Im_1 \cdot Im_2 \cdot \sin(\omega_2 \cdot t + \alpha - \omega_1 \cdot t)$,
$V = Im_1 \cdot 3/2 \cdot \sin\{(\omega_1 - \omega_2) \cdot t + \gamma\}$, and
$C = \mu \cdot n \cdot Im_1 \cdot Ic \cdot (3/2 \cdot \sin \beta)$.

Here, if a modulation of $$Ic = \frac{C_1 - A - Ic_2 \cdot V}{C}$$

is added, $f_1 = C_1$ (constant) and the torque fluctuation is eliminated from the rotation of the outer magnets.

Similarly, equation (15) may be rewritten as follows.

$$f_2 = \mu \cdot Im_2 \cdot Im_1 \cdot \sin(\omega_1 \cdot t - \omega_2 \cdot t - \alpha) + Ic \cdot 3/2 \cdot \mu \cdot Im_2 \cdot n \cdot \sin\{(\omega_1 - \omega_2) \cdot t - \alpha - \beta\} + Ic_2 \cdot 3/2 \cdot \mu \cdot Im_2 \cdot n \cdot \sin(\alpha + \gamma)$$

Here, $f_2$ may be written as follows.

$$f_2 = -A + Ic \cdot D + Ic_2 \cdot E \quad (17)$$

where, $D = 3/2 \cdot \mu \cdot Im_2 \cdot n \cdot \sin\{(\omega_1 - \omega_2) \cdot t - \alpha - \beta\}$, and
$E = 3/2 \cdot \mu \cdot Im_2 \cdot n \cdot \sin(\alpha + \gamma)$.

Here, if a modulation of $$Ic_2 = \frac{C_2 - A - Ic \cdot D}{E}$$

is added, $f_2 = C_2$ (constant) and the torque fluctuation is eliminated from the rotation of the inner magnets.

Therefore to give both permanent magnets a constant rotation, the following two simultaneous second order equations regarding $Ic$ and $Ic_2$ should be solved.

$$C_1 = A + Ic \cdot C + Ic_2 \cdot V \quad (18)$$

$$C_2 = -A + Ic \cdot D + Ic_2 \cdot E \quad (19)$$

In this way, in the composite current, the torque fluctuation in the rotation of the rotors can be eliminated by adding an amplitude modulation to the alternating current which generates rotating magnetic fields that produce a torque fluctuation.

(2) N(2(2p)-2p) Type (2-1) When the magnetic pole number ratio is 2:1

Figure 9:
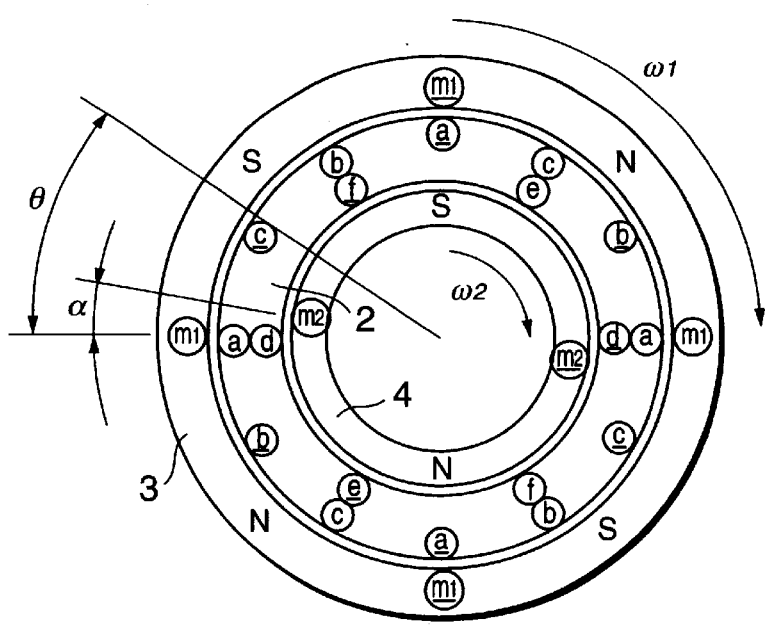
FIG. 9 is a schematic cross-sectional view of a motor/generator having a magnetic pole number ratio of 2:1 and coils arranged on the inner circumference and outer circumference of a stator, assumed for the purpose of describing a composite current according to this invention.

Taking the motor/generator of FIG. 9 as an example, when the magnetic pole number of the outer magnets is 4 and the magnetic pole number of the inner magnets is 2, the magnetic pole number ratio is 2:1. In this construction, if the permanent magnets are magnetically replaced by an equivalent coil, a magnetic flux density $B_1$ generated by the outer magnets is expressed by the following equation (21).

$$B_1 = Bm_1 \cdot \sin(2\omega_1 \cdot t - 2\theta) = \mu \cdot Im_1 \cdot \sin(2\omega_1 \cdot t - 2\theta) \quad (21)$$

The magnetic flux density $B_2$ generated in the inner magnets is expressed by equation (22) which is equivalent to the equation (2).

$$B_2 = Bm_2 \cdot \sin(\omega_2 \cdot t + \alpha - \theta) = \mu \cdot Im_2 \cdot \sin(\omega_2 \cdot t + \alpha - \theta) \quad (22)$$

It may be considered that the coils are arranged as shown in FIG. 9 so as to calculate the magnetic field produced by the coils 6 of the stator 2 separately for the outer rotating magnetic fields which rotate the outer rotor 3 and the inner rotating magnetic fields which rotate the inner rotor 4.

Magnetic flux densities $Bc_1$, $Bc_2$ of the outer coils and inner coils are expressed by the following equations (23), (24).

$$Bc_1 = \mu \cdot n \cdot \left\{ Ica(t) \cdot \sin 2\theta + Icb(t) \cdot \sin\left(2\theta - \frac{2\pi}{e}\right) + Icc(t) \cdot \sin\left(2\theta - \frac{4\pi}{3}\right) \right\} \quad (23)$$

$$Bc_2 = \mu \cdot n \cdot \left\{ Icd(t) \cdot \sin\theta + Ice(t) \cdot \sin\left(\theta - \frac{2\pi}{e}\right) + Icf(t) \cdot \sin\left(\theta - \frac{4\pi}{3}\right) \right\} \quad (24)$$

where, $Icd(t)$, $Ice(t)$, $Icf(t)$ are also currents which are different in phase by 120 degrees as in the case of $Ica(t)$, $Icb(t)$, $Icc(t)$.

Next, the change of magnetic flux density $B_1$, $B_2$, $Bc_1$, $Bc_2$ mentioned above will be described referring to FIGS. 10A–10D.

The magnetic flux density B at an angle $\theta$ is the sum of the aforesaid four magnetic flux densities.

$$B = B_1 + B_2 + Bc_1 + Bc_2 \quad (25)$$

$$= \mu \cdot Im_1 \cdot \sin(2\omega_1 \cdot t - 2\theta) +$$

$$\mu \cdot Im_2 \cdot \sin(\omega_2 \cdot t + \alpha - \theta) +$$

$$\mu \cdot n \cdot \left\{ Ica(t) \cdot \sin 2\theta + Icb(t) \cdot \sin\left(2\theta - \frac{2\pi}{3}\right) + Icc(t) \cdot \sin\left(2\theta - \frac{4\pi}{3}\right) \right\} +$$

$$\mu \cdot n \cdot \left\{ Icd(t) \cdot \sin\theta + Ice(t) \cdot \sin\left(\theta - \frac{2\pi}{3}\right) + Icf(t) \cdot \sin\left(\theta - \frac{4\pi}{3}\right) \right\}$$

Here, if the total torque acting on the outer rotor 3 is $\tau_1$, the following equation holds.

$$\tau_1 = f_1 \cdot r_1$$

where, $r_1$ = distance to outer magnets from center axis of outer rotor.

In the construction of FIG. 9, unlike the case of FIG. 7, the torques exerted on each of the outer magnets $m_1$ are not symmetrical. Therefore the force $f_1$ is considered to be a total force acting on each of four equivalent direct currents that correspond to the outer magnets $m_1$. This relation is expressed by the following equation.

$$f_1 = Im_1 \cdot B_{10} + Im_1 \cdot B_{20} - Im_1 \cdot B_{30} - Im_1 \cdot B_{40}$$

where, $B_{10}$ is magnetic flux density B at $\theta = \omega_1 \cdot t$,
$B_{20}$ is magnetic flux density B at $\theta = \omega_1 \cdot t + \pi$,
$B_{30}$ is | magnetic flux density B at in $\theta = \omega_1 \cdot t + \pi/2$, and
$B_{40}$ is magnetic flux density B at $\theta = \omega_1 \cdot t + 3\pi/2$.

Therefore, the above equation can be rewritten as follows.

$$f_1 = \mu \cdot Im_1 \cdot \left[ Im_1 \cdot \sin(2\omega_1 \cdot t - 2\omega_1 \cdot t) + Im_1 \cdot \sin(2\omega_1 \cdot t - 2\omega_1 \cdot t - 2\pi) - \right. \quad (26)$$

-continued $$Im_1 \cdot \sin(2\omega_1 \cdot t - 2\omega_1 \cdot t - \pi) -$$

$$Im_1 \cdot \sin(2\omega_1 \cdot t - 2\omega_1 \cdot t + 3\pi) +$$

$$Im_2 \cdot \sin(\omega_2 \cdot t + \alpha - \omega_1 \cdot t) +$$

$$Im_2 \cdot \sin(\omega_2 \cdot t + \alpha - \omega_1 \cdot t + \pi) -$$

$$Im_2 \cdot \sin\left(\omega_2 \cdot t + \alpha - \omega_1 \cdot t + \frac{\pi}{2}\right) -$$

$$Im_2 \cdot \sin\left(\omega_2 \cdot t + \alpha - \omega_1 \cdot t + \frac{\pi}{2}\right) +$$

$$n \cdot \left\{ Ica(t) \cdot \sin(2\omega_1 \cdot t) + Icb(t) \cdot \sin\left(2\omega_1 \cdot t - \frac{2\pi}{3}\right) + \right.$$

$$\left. Icc(t) \cdot \sin\left(2\omega_1 \cdot t - \frac{4\pi}{3}\right) \right\} +$$

$$n \cdot \left\{ Ica(t) \cdot \sin(2\omega_1 \cdot t + 2\pi) + \right.$$

$$Icb(t) \cdot \sin\left(2\omega_1 \cdot t + 2\pi - \frac{2\pi}{3}\right) +$$

$$\left. Icc(t) \cdot \sin\left(2\omega_1 \cdot t + 2\pi - \frac{4\pi}{3}\right) \right\} -$$

$$n \cdot \left\{ Ica(t) \cdot \sin(2\omega_1 \cdot t + \pi) + Icb(t) \cdot \sin\left(2\omega_1 \cdot t + \frac{\pi}{3}\right) + \right.$$

$$\left. Icc(t) \cdot \sin\left(2\omega_1 \cdot t - \frac{\pi}{3}\right) \right\} +$$

$$n \cdot \left\{ Icd(t) \cdot \sin(\omega_1 \cdot t) + Ice(t) \cdot \sin\left(\omega_1 \cdot t - \frac{2\pi}{3}\right) + \right.$$

$$\left. Icf(t) \cdot \sin\left(\omega_1 \cdot t - \frac{4\pi}{3}\right) \right\} +$$

$$n \cdot \left\{ Icd(t) \cdot \sin(\omega_1 \cdot t + \pi) + Ice(t) \cdot \sin\left(\omega_1 \cdot t + \pi - \frac{2\pi}{3}\right) + \right.$$

$$\left. Icf(t) \cdot \sin\left(\omega_1 \cdot t + \pi - \frac{4\pi}{3}\right) \right\} -$$

$$n \cdot \left\{ Icd(t) \cdot \sin\left(\omega_1 \cdot t + \frac{\pi}{2}\right) + Ice(t) \cdot \sin\left(\omega_1 \cdot t + \frac{\pi}{2} - \frac{2\pi}{3}\right) + \right.$$

$$\left. Icf(t) \cdot \sin\left(\omega_1 \cdot t + \frac{\pi}{2} - \frac{4\pi}{3}\right) \right\} -$$

$$n \cdot \left\{ Icd(t) \cdot \sin\left(\omega_1 \cdot t + \frac{3\pi}{2}\right) + \right.$$

$$Ice(t) \cdot \sin\left(\omega_1 \cdot t + \frac{3\pi}{2} - \frac{2\pi}{3}\right) +$$

$$\left. Icf(t) \cdot \sin\left(\omega_1 \cdot t + \frac{3\pi}{2} - \frac{4\pi}{3}\right) \right\} \Big]$$

$$= 4 \cdot \mu \cdot Im_1 \cdot n \cdot \left\{ Ica(t) \cdot \sin(2\omega_1 \cdot t) + \right.$$

$$\left. Icb(t) \cdot \sin\left(2\omega_1 \cdot t - \frac{2\pi}{3}\right) + Icc(t) \cdot \sin\left(2\omega_1 \cdot t - \frac{4\pi}{3}\right) \right\}$$

Equation (26) shows that the torque acting on the outer magnets $m_1$ due to the exciting currents of the coils a, b, c can be controlled, and that it is not affected by the exciting currents of the coils d, e, f.

Next, if the torque acting on the inner rotor 4 is $\tau_2$, the following equation holds.

$$\tau_2 = f_2 \cdot r_2$$

where, $r_2$ = distance to inner magnets $m_2$ from center shaft of an inner rotor.

The torques acting on the inner magnets $m_2$ of the inner rotor 4 are not symmetrical. Therefore, the force $f_2$ is considered to be a total force acting on each of two equivalent direct currents that correspond to the inner magnets. This relation is expressed by the following equation.

$$f_2 = Im_2 \cdot B_{100} - Im_2 \cdot B_{200}$$

where, $B_{100}$ is magnetic flux density B when $\theta = \omega_2 \cdot t + \alpha$, and $B_{200}$ is magnetic flux density B when $\theta = \omega_2 \cdot t + \pi + \alpha$.

Therefore, the above equation may be rewritten as follows.

$$f_2 = \mu \cdot Im_2 \cdot \Big[ Im_1 \cdot \sin(2\omega_1 \cdot t - 2\omega_2 \cdot t - 2\alpha) - \tag{27}$$

$$Im_1 \cdot \sin(2\omega_1 \cdot t - 2\omega_2 \cdot t - 2\alpha - 2\pi) +$$

$$Im_2 \cdot \sin(2\omega_2 \cdot t + 2\alpha - 2\omega_2 \cdot t - 2\alpha) -$$

$$Im_2 \cdot \sin(2\omega_2 \cdot t + 2\alpha - 2\omega_2 \cdot t - 2\alpha - 2\pi) +$$

$$n \cdot \left\{ Ica(t) \cdot \sin(2\omega_2 \cdot t + 2\alpha) + \right.$$

$$Icb(t) \cdot \sin\left(2\omega_2 \cdot t + 2\alpha - \frac{2\pi}{3}\right) +$$

$$\left. Icc(t) \cdot \sin\left(2\omega_2 \cdot t + 2\alpha - \frac{4\pi}{3}\right) \right\} -$$

$$n \cdot \left\{ Ica(t) \cdot \sin(2\omega_2 \cdot t + 2\pi + 2\alpha) + \right.$$

$$Icb(t) \cdot \sin\left(2\omega_2 \cdot t + 2\pi + 2\alpha - \frac{2\pi}{3}\right) +$$

$$\left. Icc(t) \cdot \sin\left(2\omega_2 \cdot t + 2\pi + 2\alpha - \frac{4\pi}{3}\right) \right\} +$$

$$n \cdot \left\{ Icd(t) \cdot \sin(\omega_2 \cdot t + \alpha) + Ice(t) \cdot \sin\left(\omega_2 \cdot t + \alpha - \frac{2\pi}{3}\right) + \right.$$

$$\left. Icf(t) \cdot \sin\left(\omega_2 \cdot t + \alpha - \frac{4\pi}{3}\right) \right\} -$$

$$n \Big\{ Icd(t) \cdot \sin(\omega_2 \cdot t + \pi + \alpha) +$$

$$Ice(t) \cdot \sin\left(\omega_2 \cdot t + \pi + \alpha - \frac{2\pi}{3}\right) +$$

$$\left. Icf(t) \cdot \sin\left(\omega_2 \cdot t + \pi + \alpha - \frac{4\pi}{3}\right) \right\} \Big]$$

$$= 2\mu \cdot Im_2 \cdot n \cdot \left\{ Icd(t) \cdot \sin(\omega_2 \cdot t + \alpha) + \right.$$

$$\left. Ice(t) \cdot \sin\left(\omega_2 \cdot t + \alpha - \frac{2\pi}{3}\right) + Icf(t) \cdot \sin\left(\omega_2 \cdot t + \alpha - \frac{4\pi}{3}\right) \right\}$$

According to the equation (27), the torque acting on the inner magnets $m_2$ due to the excitation currents of the coils d, e, f can be controlled, and the torque acting on the inner magnets $m_2$ is not affected by the excitation currents of the coils a, b, c.

(2-2) When the Outer Rotating Magnetic Fields are Applied

Currents with a phase difference of β with respect to the rotation position of the outer magnets $m_1$ are passed through the coils a, b, c. In order to generate the above currents, the alternating currents Ica(t), Icb(t), Icc(t) mentioned above may be defined by the following equations.

$$Ica(t) = Ic \cdot \cos(2\omega_1 \cdot t - 2\beta) \tag{28A}$$

$$Ica(t) = Ic \cdot \cos(2\omega_1 \cdot t - 2\beta) \tag{28A}$$

$$Icb(t) = Ic \cdot \cos\left(2\omega_1 \cdot t - 2\beta - \frac{2\pi}{3}\right) \tag{28B}$$

$$cc(t) = Ic \cdot \cos\left(2\omega_1 \cdot t - 2\beta - \frac{4\pi}{3}\right) \tag{28C}$$

Next, (28A)–(28C) are substituted in equations (26) (27) to calculate $f_1$.

$$f_1 = 4\mu \cdot Im_1 \cdot n \cdot Ic \cdot \left\{ \cos(2\omega_1 \cdot t - 2\beta) \cdot \sin(2\omega_1 \cdot t) + \right.$$
$$\cos\left(2\omega_1 \cdot t - 2\beta - \frac{2\pi}{3}\right) \cdot \sin\left(2\omega_1 \cdot t - \frac{2\pi}{3}\right) +$$
$$\left. \cos\left(2\omega_1 \cdot t - 2\beta - \frac{4\pi}{3}\right) \cdot \sin\left(2\omega_1 \cdot t - \frac{4\pi}{3}\right) \right\}$$

Here, the above equation may be rewritten as the following equation (29) using the formula $\cos(a)\cdot\sin(b)=\frac{1}{2}\cdot\{\sin(a+b)-\sin(a-b)\}$.

$$f_1 = 4\mu \cdot Im_1 \cdot n \cdot Ic \cdot \left[ \frac{1}{2} \cdot \{\sin(2\omega_1 \cdot t - 2\beta + 2\omega_1 \cdot t) - \right. \tag{29}$$
$$\sin(2\omega_1 \cdot t - 2\beta - 2\omega_1 \cdot t)\} +$$
$$\frac{1}{2} \cdot \left\{ \sin\left(2\omega_1 \cdot t - 2\beta - \frac{2\pi}{3} + 2\omega_1 \cdot t - \frac{2\pi}{3}\right) - \right.$$
$$\left. \sin\left(2\omega_1 \cdot t - 2\beta - \frac{2\pi}{3} - 2\omega_1 \cdot t + \frac{2\pi}{3}\right) \right\} +$$
$$\frac{1}{2} \cdot \left\{ \sin\left(2\omega_1 \cdot t - 2\beta - \frac{4\pi}{3} + 2\omega_1 \cdot t + \frac{4\pi}{3}\right) - \right.$$
$$\left. \left. \sin\left(2\omega_1 \cdot t - 2\beta - \frac{4\pi}{3} - 2\omega_1 \cdot t + \frac{4\pi}{3}\right) \right\} \right]$$
$$= 2\mu \cdot Im_1 \cdot n \cdot Ic \cdot \left\{ \sin(4\omega_1 \cdot t - 2\beta) + \sin 2\beta + \right.$$
$$\sin\left(4\omega_1 \cdot t - 2\beta - \frac{4\pi}{3}\right) + \sin 2\beta +$$
$$\left. \sin\left(4\omega_1 \cdot t - 2\beta - \frac{8\pi}{3}\right) + \sin 2\beta \right\}$$
$$= 2\mu \cdot Im_1 \cdot n \cdot Ic \cdot \left\{ \sin(4\omega_1 \cdot t - 2\beta) + \right.$$
$$\sin\left(4\omega_1 \cdot t - 2\beta - \frac{4\pi}{3}\right) + \sin\left(4\omega_1 \cdot t - 2\beta - \frac{4\pi}{3}\right) +$$
$$\left. 3\sin 2\beta \right\}$$
$$= 6\mu \cdot Im_1 \cdot n \cdot Ic \cdot \sin 2\beta$$

Equation (29) shows that the torque acting on the outer magnet $m_1$ varies according to the phase difference $\beta$. Therefore, the rotation position of the outer magnets $m_1$ should be measured and excitation currents shifted in phase by $\beta$ should be applied to the coils a, b, c.

(2-3) When the Inner Rotating Magnetic Fields are Applied

Currents with a phase difference of $\gamma$ with respect to the rotation position of the inner magnets $m_2$ are passed through the coils d, e, f.

In order to generate the above currents, the alternating currents Icd(t), Ice(t), Icf(t) mentioned above may be defined by the following equations.

$$Icd(t)=Ic\cdot\cos(\omega_2\cdot t-\gamma) \tag{30A}$$

$$Icd(t) = Ic \cdot \cos(\omega_2 \cdot t - \gamma) \tag{30A}$$

$$Ice(t) = Ic \cdot \cos\left(\omega_2 \cdot t - \gamma - \frac{2\pi}{3}\right) \tag{30B}$$

$$Icf(t) = Ic \cdot \cos\left(\omega_2 \cdot t - \gamma - 4\frac{\pi}{3}\right) \tag{30C}$$

Next, (30A)–(30C) are substituted in equations (27) to calculate $f_2$.

$$f_2 = 2\mu \cdot Im_2 \cdot n \cdot \left\{ Ic \cdot \cos(\omega_2 \cdot t - \gamma) \cdot \sin(\omega_2 \cdot t + \alpha) + \right.$$
$$Ic \cdot \cos\left(\omega_2 \cdot t - \gamma - \frac{2\pi}{3}\right) \cdot \sin\left(\omega_2 \cdot t + \alpha - \frac{2\pi}{3}\right) +$$
$$\left. Ic \cdot \cos\left(\omega_2 \cdot t - \gamma - \frac{4\pi}{3}\right) \cdot \sin\left(\omega_2 \cdot t + \alpha - \frac{4\pi}{3}\right) \right\}$$

Here, the above equation may be rewritten using the formula $\cos(a)\cdot\sin(b)=\frac{1}{2}\cdot\{\sin(a+b)-\sin(a-b)\}$ $$f_2 = 2\mu \cdot Im_2 \cdot n \cdot Ic \cdot \left[ \frac{1}{2} \cdot \{\sin(\omega_2 \cdot t - \gamma + \omega_2 \cdot t + \alpha) - \right. \tag{31}$$
$$\sin(\omega_2 \cdot t - \gamma - \omega_2 \cdot t - \alpha)\}) +$$
$$\frac{1}{2} \cdot \left\{ \sin\left(\omega_2 \cdot t - \gamma - \frac{2\pi}{3} + \omega_2 \cdot t + \alpha - \frac{2\pi}{3}\right) - \right.$$
$$\left. \sin\left(\omega_2 \cdot t - \gamma - \frac{2\pi}{3} - \omega_2 \cdot t - \alpha + \frac{2\pi}{3}\right) \right\} +$$
$$\frac{1}{2} \cdot \left\{ \sin\left(\omega_2 \cdot t - \gamma - \frac{4\pi}{3} + \omega_2 \cdot t + \alpha - \frac{4\pi}{3}\right) - \right.$$
$$\left. \left. \sin\left(\omega_2 \cdot t - \gamma - \frac{4\pi}{3} - \omega_2 \cdot t - \alpha + \frac{4\pi}{3}\right) \right\} \right]$$
$$= \mu \cdot Im_2 \cdot n \cdot Ic \cdot \left\{ \sin(2\omega_2 \cdot t - \gamma + \alpha) + \sin(\gamma + \alpha) + \right.$$
$$\sin\left(2\omega_2 \cdot t - \gamma - \frac{4\pi}{3} + \alpha\right) + \sin(\gamma + \alpha) +$$
$$\left. \sin\left(2\omega_2 \cdot t - \gamma - \frac{8\pi}{3} + \alpha\right) + \sin(\gamma + \alpha) \right\}$$
$$= \mu \cdot Im_2 \cdot n \cdot Ic \cdot \left\{ \sin(2\omega_2 \cdot t - \gamma + \alpha) + \right.$$
$$\sin\left(2\omega_2 \cdot t - \gamma - \frac{4\pi}{3} + \alpha\right) +$$
$$\left. \sin\left(2\omega_2 \cdot t - \gamma - \frac{8\pi}{3} + \alpha\right) + 3\sin(\gamma + \alpha) \right\}$$
$$= 3\mu \cdot Im_2 \cdot n \cdot Ic \cdot \sin(\gamma + \alpha)$$

Equation (31) shows that the torque acting on the inner magnet $m_2$ varies according to the phase difference ($\gamma+\alpha$).

Therefore, the rotation position of the inner magnets $m_2$ should be measured and excitation currents shifted in phase by ($\gamma+\alpha$) should be applied to the coils d, e, f.

(2-4) Summary

Equation (29) shows that when currents are passed through the coils 6 of the stator 2 in synchronism with the outer magnets $m_1$, a rotational torque acts only the outer magnets $m_1$.

Equation (31) shows that when currents are passed through the coils 6 in synchronism with the outer magnets $m_2$, a rotational torque acts only the outer magnets $m_2$.

Although the calculations are not shown, when a current synchronized with the rotation of the outer magnets and a current synchronized with the rotation of the inner magnets are passed together through the coils 6, rotational torques corresponding to the respective currents act on the outer and inner magnets as in the case where the magnetic pole number ratio is 2:1, as described in (1-4).

This fact shows that also in the case where the magnetic pole number ratio is 2:1, the two rotors 3, 4 can be driven as a generator/motor using the coils 6.

In this case, as only constant terms remain, there is no fluctuation of rotation torque of the inner rotor 4 due to the effect of the outer rotor 3 or the rotational magnetic field produced to drive the outer rotor 3, and conversely, there is no fluctuation of rotation torque of the outer rotor 3 due to the effect of the inner rotor 4 or the rotational magnetic field produced to drive the inner rotor 4.

In other words, when the magnetic pole number ratio is 2:1, both rotors can be driven with a constant rotation, without adding an amplitude modulation to eliminate torque fluctuation as when the magnetic pole number ratio is 1:1, or as described later, 3:1.

(2-5) Setting of Currents Flowing Through Stator Coil

In FIG. 9, a series of coils a, c, b for generating the outer rotating magnetic fields and another series of coils d, f, e for generating the inner rotating magnetic fields are assumed for the purpose of theoretical calculation.

Figure 11:
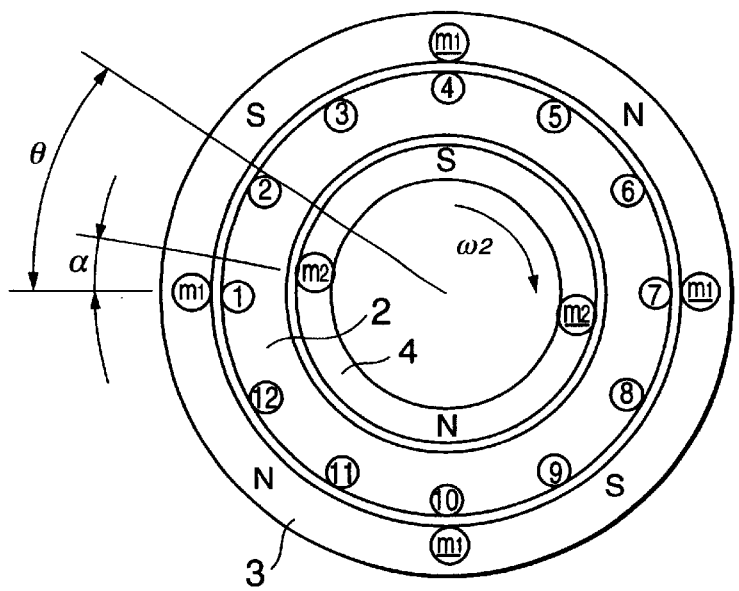
FIG. 11 is similar to FIG. 9, but showing a case where the coils on the inner and outer circumferences are integrated.

In the real motor/generator according to this invention, these coils are integrated as shown in FIG. 11. specifically, the coils a and d, b and f, c and e, a and d, b and f, and c and e in FIG. 9 are respectively integrated to coils #1, #3, #5, #7, #9, #11. The composite currents $I_1$–$I_{12}$ passed through the coils #1–#12 in FIG. 11 are therefore set as follows due to their relation to the currents passed through the coils a, c, b and d, f, e in FIG. 9.

$I_1$=Ia+Id
$I_2$=Ic
$I_3$=Ib+If
$I_4$=Ia
$I_5$=Ic+Ie
$I_6$=Ib
$I_7$=Ia+Id
$I_8$=Ic
$I_9$=Ib+If
$I_{10}$=Ia
$I_{11}$=Ic+Ie
$I_{12}$=Ib

In this case, the load on the coils through which the currents $I_1, I_3, I_5, I_7, I_9, I_{11}$ are passed is greater than that of the remaining coils through which the currents $I_2, I_4, I_6, I_8, I_{10}$ are passed. Therefore, it is considered to spread the load among the remaining coils in order to form the inner rotating magnetic fields.

For example, comparing FIG. 2 and FIG. 1, the coils in FIG. 2 corresponding to 1, 1, 2, 2 in FIG. 1 are the outer coils a, a, c, c and the inner coils d, d. In this case, it is assumed that the position of the coils d, d is shifted to a position that is equidistant from the coil a, a and the coil c, c. These shifted coils are designated as coils d', d'.

Half of the current Id passed through the coil d' is assigned to each of the coils a and c, and half of the current Id passed through the coil d' is assigned to each of the coils a and c. Similarly coils e', e' and f', f are assumed and the currents passing through these coils are allocated in a similar manner.

In this way, the following alternative current settings are possible:

$I_1$=Ia+½·Id'
$I_2$=Ic+½·Id'
$I_3$=Ib+½·If
$I_4$=Ia+½·If
$I_5$=Ic+½·Ie'
$I_6$=Ib+½·Ie'
$I_7$=Ia+½·Id'
$I_8$=Ic+½·Id'
$I_9$=Ib+½·If
$I_{10}$=Ia+½·If
$I_{11}$=Ic+½·Ie'
$I_{12}$=Ib+½·Id'

Alternatively, the following settings are possible.

Figure 12A:
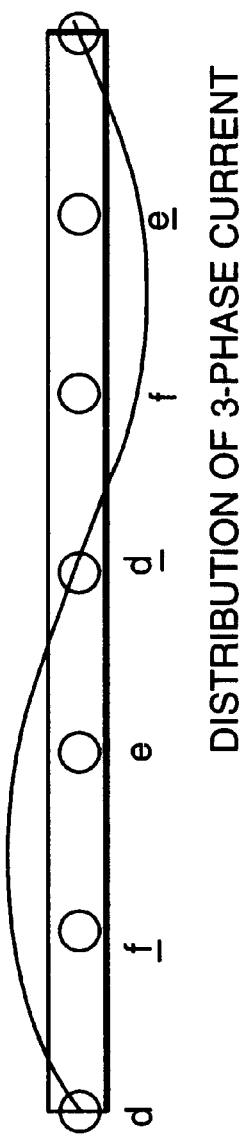
FIGS. 12A–12B are diagrams showing a distribution of alternating current for driving the motor/generator of FIG. 11.
Figure 12B:
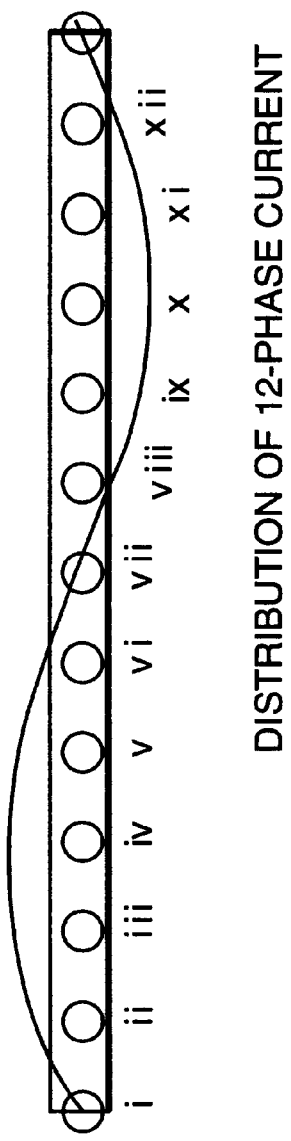

$I_1$=Ia+Ii
$I_2$=Ic+Iii
$I_3$=Ib+Iiii
$I_4$=Ia+Iiv
$I_5$=Ic+Iv
$I_6$=Ib+Ivi
$I_7$=Ia+Ivii
$I_8$=Ic+Iviii
$I_9$=Ib+Iix
$I_{10}$=Ia+Ix
$I_{11}$=Ic+Ixi
$I_{12}$=Ib+Ixii The currents Ii–Ixii which are the second terms on the right-hand side of the above equations for setting $I_1$–$I_{12}$, comprise a twelve-phase alternating current as shown in FIGS. 12A, 12B. The inner rotating magnetic fields may be formed by this twelve-phase alternating current.

(2-6) When the Inner Rotating Magnetic Fields are Supplied by Twelve-phase Alternating Current (2-6-1) Magnetic Flux Density $Bc_2$ The magnetic flux density $Bc_2$ when the inner rotating magnetic fields are supplied by a twelve-phase alternating current is expressed by the following equation (32).

$$Bc_2 = \mu \cdot n \cdot \{Ici(t) \cdot \sin\theta + Icii(t) \cdot \sin\left(\theta - \frac{2\pi}{12}\right) + \quad (32)$$

$$Iciii(t) \cdot \sin\left(\theta - \frac{4\pi}{12}\right) + Iciv(t) \cdot \sin\left(\theta - \frac{6\pi}{12}\right) +$$

$$Icv(t) \cdot \sin\left(\theta - \frac{8\pi}{12}\right) + Icvi(t) \cdot \sin\left(\theta - \frac{10\pi}{12}\right) +$$

$$Icvii(t) \cdot \sin\left(\theta - \frac{12\pi}{12}\right) + Icviii(t) \cdot \sin\left(\theta - \frac{14\pi}{12}\right) +$$

$$Icix(t) \cdot \sin\left(\theta - \frac{16\pi}{12}\right) + Icx(t) \cdot \sin\left(\theta - \frac{18\pi}{12}\right) +$$

$$Icxi(t) \cdot \sin\left(\theta - \frac{20\pi}{12}\right) + Icxii(t) \cdot \sin\left(\theta - \frac{22\pi}{12}\right)\}$$

The total magnetic flux density B is expressed by the following equation.

$$B = B_1 + B_2 + Bc_1 + Bc_2 \quad (33)$$

$$= \mu \cdot Im_1 \cdot \sin(2\omega_1 \cdot t - 2\theta) + \mu \cdot Im_2 \cdot \sin(\omega_2 \cdot t + \alpha - \theta) +$$

$$\mu \cdot n \cdot \{Ica(t) \cdot \sin 2\theta + Icb(t) \cdot \sin\left(2\theta - \frac{2\pi}{3}\right) +$$

$$Icc(t) \cdot \sin\left(2\theta - \frac{4\pi}{3}\right)\} +$$

$$\mu \cdot n \cdot \{Ici(t) \cdot \sin\theta + Icii(t) \cdot \sin\left(\theta - \frac{2\pi}{12}\right) +$$

$$Iciii(t) \cdot \sin\left(\theta - \frac{4\pi}{12}\right) + Iciv(t) \cdot \sin\left(\theta - \frac{6\pi}{12}\right) +$$

$$Icv(t) \cdot \sin\left(\theta - \frac{8\pi}{12}\right) + Icvi(t) \cdot \sin\left(\theta - \frac{10\pi}{12}\right) +$$

$$Icvii(t) \cdot \sin\left(\theta - \frac{12\pi}{12}\right) + Icviii(t) \cdot \sin\left(\theta - \frac{14\pi}{12}\right) +$$

$$Icix(t) \cdot \sin\left(\theta - \frac{16\pi}{12}\right) + Icx(t) \cdot \sin\left(\theta - \frac{18\pi}{12}\right) +$$

-continued $$Icxi(t) \cdot \sin\left(\theta - \frac{20\pi}{12}\right) + Icxii(t) \cdot \sin\left(\theta - \frac{22\pi}{12}\right)\Big\}$$

$f_1$ is calculated by the following equation.

$$f_1 = Im_1 \cdot B_{10} + Im_1 \cdot B_{20} - Im_1 \cdot B_{30} - Im_1 \cdot B_{40}$$

where, $B_{10}$ is magnetic flux density B at $\theta = \omega_1 \cdot t$,
$B_{20}$ is magnetic flux density B at $\theta = \omega_1 \cdot t + \pi$,
$B_{30}$ is | magnetic flux density B at $\theta = \omega_1 \cdot t + \pi/2$, and
$B_{40}$ is magnetic flux density B at $\theta = \omega_1 \cdot t + 3\pi/2$.

Therefore, the above equation can be rewritten as follows.

$$\begin{aligned} f_1 = \mu \cdot Im_1 \cdot \Big[ & Im_1 \cdot \sin(2\omega_1 \cdot t - 2\omega_1 \cdot t) + \\ & Im_1 \cdot \sin(2\omega_1 \cdot t - 2\omega_1 \cdot t - 2\pi) - \\ & Im_1 \cdot \sin(2\omega_1 \cdot t - 2\omega_1 \cdot t - \pi) - \\ & Im_1 \cdot \sin(2\omega_1 \cdot t - 2\omega_1 \cdot t - 3\pi) + \\ & Im_2 \cdot \sin(\omega_2 \cdot t + \alpha - \omega_1 \cdot t) + \\ & Im_2 \cdot \sin(\omega_2 \cdot t + \alpha - \omega_1 \cdot t - \pi) - \\ & Im_2 \cdot \sin\left(\omega_2 \cdot t + \alpha - \omega_1 \cdot t - \frac{\pi}{2}\right) - \\ & Im_2 \cdot \sin\left(\omega_2 \cdot t + \alpha - \omega_1 \cdot t - \frac{3\pi}{2}\right) + \\ & n \cdot \Big\{ Ica(t) \cdot \sin(2\omega_1 \cdot t) + Icb(t) \cdot \sin\left(2\omega_1 \cdot t - \frac{2\pi}{3}\right) + \\ & Icc(t) \cdot \sin\left(2\omega_1 \cdot t - \frac{4\pi}{3}\right)\Big\} + \\ & n \cdot \Big\{ Ica(t) \cdot \sin(2\omega_1 \cdot t + 2\pi) + \\ & Icb(t) \cdot \sin\left(2\omega_1 \cdot t + 2\pi - \frac{2\pi}{3}\right) + \\ & Icc(t) \cdot \sin\left(2\omega_1 \cdot t + 2\pi - \frac{4\pi}{3}\right)\Big\} - \\ & n \cdot \Big\{ Ica(t) \cdot \sin(2\omega_1 \cdot t + \pi) + Icb(t) \cdot \sin\left(2\omega_1 \cdot t + \frac{\pi}{3}\right) + \\ & Icc(t) \cdot \sin\left(2\omega_1 \cdot t + 2\pi - \frac{\pi}{3}\right)\Big\} - \\ & n \cdot \Big\{ Ica(t) \cdot \sin(2\omega_1 \cdot t + \pi) + Icb(t) \cdot \sin\left(2\omega_1 \cdot t + \frac{\pi}{3}\right) + \\ & Icc(t) \cdot \sin\left(2\omega_1 \cdot t + 2\pi - \frac{\pi}{3}\right)\Big\} + \\ & n \cdot \Big[ Ici(t) \cdot \Big\{ \sin(\omega_1 \cdot t) + \sin(\omega_1 \cdot t + \pi) - \\ & \sin\left(\omega_1 \cdot t + \frac{\pi}{2}\right) - \sin\left(\omega_1 \cdot t + \frac{3\pi}{2}\right)\Big\} + \\ & Icii(t) \cdot \Big\{ \sin\left(\omega_1 \cdot t - \frac{2\pi}{12}\right) + \sin\left(\omega_1 \cdot t - \frac{2\pi}{12} + \pi\right) - \\ & \sin\left(\omega_1 \cdot t - \frac{2\pi}{12} + \frac{\pi}{2}\right) - \sin\left(\omega_1 \cdot t - \frac{2\pi}{12} + \frac{3\pi}{2}\right)\Big\} + \\ & Iciii(t) \cdot \Big\{ \sin\left(\omega_1 \cdot t - \frac{4\pi}{12}\right) + \sin\left(\omega_1 \cdot t - \frac{4\pi}{12} + \pi\right) - \\ & \sin\left(\omega_1 \cdot t - \frac{4\pi}{12} + \frac{\pi}{2}\right) - \sin\left(\omega_1 \cdot t - \frac{4\pi}{12} + \frac{3\pi}{2}\right)\Big\} + \\ & Iciv(t) \cdot \Big\{ \sin\left(\omega_1 \cdot t - \frac{6\pi}{12}\right) + \sin\left(\omega_1 \cdot t - \frac{6\pi}{12} + \pi\right) - \\ & \sin\left(\omega_1 \cdot t - \frac{6\pi}{12} + \frac{\pi}{2}\right) - \sin\left(\omega_1 \cdot t - \frac{6\pi}{12} + \frac{3\pi}{2}\right)\Big\} + \end{aligned} \quad (34)$$

$$\begin{aligned} & Icv(t) \cdot \Big\{ \sin\left(\omega_1 \cdot t - \frac{8\pi}{12}\right) + \sin\left(\omega_1 \cdot t - \frac{8\pi}{12} + \pi\right) - \\ & \sin\left(\omega_1 \cdot t - \frac{8\pi}{12} + \frac{\pi}{2}\right) - \sin\left(\omega_1 \cdot t - \frac{8\pi}{12} + \frac{3\pi}{2}\right)\Big\} + \\ & Icvi(t) \cdot \Big\{ \sin\left(\omega_1 \cdot t - \frac{10\pi}{12}\right) + \sin\left(\omega_1 \cdot t - \frac{10\pi}{12} + \pi\right) - \\ & \sin\left(\omega_1 \cdot t - \frac{10\pi}{12} + \frac{\pi}{2}\right) - \sin\left(\omega_1 \cdot t - \frac{10\pi}{12} + \frac{3\pi}{2}\right)\Big\} + \\ & Icvii(t) \cdot \Big\{ \sin\left(\omega_1 \cdot t - \frac{12\pi}{12}\right) + \sin\left(\omega_1 \cdot t - \frac{12\pi}{12} + \pi\right) - \\ & \sin\left(\omega_1 \cdot t - \frac{12\pi}{12} + \frac{\pi}{2}\right) - \sin\left(\omega_1 \cdot t - \frac{12\pi}{12} + \frac{3\pi}{2}\right)\Big\} + \\ & Icviii(t) \cdot \Big\{ \sin\left(\omega_1 \cdot t - \frac{14\pi}{12}\right) + \sin\left(\omega_1 \cdot t - \frac{14\pi}{12} + \pi\right) - \\ & \sin\left(\omega_1 \cdot t - \frac{14\pi}{12} + \frac{\pi}{2}\right) - \sin\left(\omega_1 \cdot t - \frac{14\pi}{12} + \frac{3\pi}{2}\right)\Big\} + \\ & Icix(t) \cdot \Big\{ \sin\left(\omega_1 \cdot t - \frac{16\pi}{12}\right) + \sin\left(\omega_1 \cdot t - \frac{16\pi}{12} + \pi\right) - \\ & \sin\left(\omega_1 \cdot t - \frac{16\pi}{12} + \frac{\pi}{2}\right) - \sin\left(\omega_1 \cdot t - \frac{16\pi}{12} + \frac{3\pi}{2}\right)\Big\} + \\ & Icx(t) \cdot \Big\{ \sin\left(\omega_1 \cdot t - \frac{18\pi}{12}\right) + \sin\left(\omega_1 \cdot t - \frac{18\pi}{12} + \pi\right) - \\ & \sin\left(\omega_1 \cdot t - \frac{18\pi}{12} + \frac{\pi}{2}\right) - \sin\left(\omega_1 \cdot t - \frac{18\pi}{12} + \frac{3\pi}{2}\right)\Big\} + \\ & Icxi(t) \cdot \Big\{ \sin\left(\omega_1 \cdot t - \frac{20\pi}{12}\right) + \sin\left(\omega_1 \cdot t - \frac{20\pi}{12} + \pi\right) - \\ & \sin\left(\omega_1 \cdot t - \frac{20\pi}{12} + \frac{\pi}{2}\right) - \sin\left(\omega_1 \cdot t - \frac{20\pi}{12} + \frac{3\pi}{2}\right)\Big\} + \\ & Icxii(t) \cdot \Big\{ \sin\left(\omega_1 \cdot t - \frac{22\pi}{12}\right) + \sin\left(\omega_1 \cdot t - \frac{22\pi}{12} + \pi\right) - \\ & \sin\left(\omega_1 \cdot t - \frac{22\pi}{12} + \frac{\pi}{2}\right) - \sin\left(\omega_1 \cdot t - \frac{22\pi}{12} + \frac{3\pi}{2}\right)\Big\} \Big] \Big] \\ = & 4\mu \cdot n \cdot Im_1 \cdot \Big\{ Ica(t) \cdot \sin(2\omega_1 \cdot t) + \\ & Icb(t) \cdot \sin\left(2\omega_1 \cdot t - \frac{2\pi}{3}\right) + Icc(t) \cdot \sin\left(2\omega_1 \cdot t - \frac{4\pi}{3}\right)\Big\} \end{aligned}$$

This is the same as equation (26) where the inner rotating magnetic fields are produced by a three-phase alternating current.

Also, $f_2$ is calculated by the following equation.

$$f_2 = Im_2 \cdot B_{100} - Im_2 \cdot B_{200}$$

where, $B_{100}$ is magnetic flux density B at $\theta = \omega_2 \cdot t + \alpha$, and
$B_{200}$ is magnetic flux density B at $\theta = \omega_2 \cdot t + \pi + \alpha$.

Therefore, the above equation can be rewritten as follows.

$$\begin{aligned} f_2 = \mu \cdot Im_2 \cdot \Big[ & Im_1 \cdot \sin(2\omega_1 \cdot t - 2\omega_2 \cdot t - 2\alpha) - \\ & Im_1 \cdot \sin(2\omega_1 \cdot t - 2\omega_2 \cdot t - 2\alpha - 2\pi) + \\ & Im_2 \cdot \sin(2\omega_2 \cdot t + 2\alpha - 2\omega_2 \cdot t - 2\alpha) - \\ & Im_2 \cdot \sin(2\omega_2 \cdot t + 2\alpha - 2\omega_2 \cdot t - 2\alpha - 2\pi) + \\ & n \cdot \Big\{ Ica(t) \cdot \sin(2\omega_2 \cdot t + 2\alpha) + \\ & Icb(t) \cdot \sin\left(2\omega_2 \cdot t + 2\alpha - \frac{2\pi}{3}\right) + \end{aligned}$$

-continued $$Icc(t) \cdot \sin\left(2\omega_2 \cdot t + 2\alpha - \frac{4\pi}{3}\right)\right\} -$$

$$n \cdot \{Ica(t) \cdot \sin(2\omega_2 \cdot t + 2\pi + 2\alpha) +$$

$$Icb(t) \cdot \sin\left(2\omega_2 \cdot t + 2\pi + 2\alpha - \frac{2\pi}{3}\right) +$$

$$Icc(t) \cdot \sin\left(2\omega_2 \cdot t + 2\pi + 2\alpha - \frac{4\pi}{3}\right)\right\} +$$

$$n \cdot \left[Ici(t) \cdot \{\sin(\omega_2 \cdot t + \alpha) - \sin(\omega_2 \cdot t + \pi + \alpha)\} +\right.$$

$$Icii(t) \cdot \left\{\sin\left(\omega_2 \cdot t + \alpha - \frac{2\pi}{12}\right) - \right.$$

$$\sin\left(\omega_2 \cdot t + \pi + \alpha - \frac{2\pi}{12}\right)\right\} +$$

$$Iciii(t) \cdot \left\{\sin\left(\omega_2 \cdot t + \alpha - \frac{4\pi}{12}\right) - \right.$$

$$\sin\left(\omega_2 \cdot t + \pi + \alpha - \frac{4\pi}{12}\right)\right\} +$$

$$Iciv(t) \cdot \left\{\sin\left(\omega_2 \cdot t + \alpha - \frac{6\pi}{12}\right) - \right.$$

$$\sin\left(\omega_2 \cdot t + \pi + \alpha - \frac{6\pi}{12}\right)\right\} +$$

$$Icv(t) \cdot \left\{\sin\left(\omega_2 \cdot t + \alpha - \frac{8\pi}{12}\right) - \right.$$

$$\sin\left(\omega_2 \cdot t + \pi + \alpha - \frac{8\pi}{12}\right)\right\} +$$

$$Icvi(t) \cdot \left\{\sin\left(\omega_2 \cdot t + \alpha - \frac{10\pi}{12}\right) - \right.$$

$$\sin\left(\omega_2 \cdot t + \pi + \alpha - \frac{10\pi}{12}\right)\right\} +$$

$$Icvii(t) \cdot \left\{\sin\left(\omega_2 \cdot t + \alpha - \frac{12\pi}{12}\right) - \right.$$

$$\sin\left(\omega_2 \cdot t + \pi + \alpha - \frac{12\pi}{12}\right)\right\} +$$

$$Icviii(t) \cdot \left\{\sin\left(\omega_2 \cdot t + \alpha - \frac{14\pi}{12}\right) - \right.$$

$$\sin\left(\omega_2 \cdot t + \pi + \alpha - \frac{14\pi}{12}\right)\right\} +$$

$$Icix(t) \cdot \left\{\sin\left(\omega_2 \cdot t + \alpha - \frac{16\pi}{12}\right) - \right.$$

$$\sin\left(\omega_2 \cdot t + \pi + \alpha - \frac{16\pi}{12}\right)\right\} +$$

$$Icx(t) \cdot \left\{\sin\left(\omega_2 \cdot t + \alpha - \frac{18\pi}{12}\right) - \right.$$

$$\sin\left(\omega_2 \cdot t + \pi + \alpha - \frac{18\pi}{12}\right)\right\} +$$

$$Icxi(t) \cdot \left\{\sin\left(\omega_2 \cdot t + \alpha - \frac{20\pi}{12}\right) - \right.$$

$$\sin\left(\omega_2 \cdot t + \pi + \alpha - \frac{20\pi}{12}\right)\right\} +$$

$$Icxii(t) \cdot \left\{\sin\left(\omega_2 \cdot t + \alpha - \frac{22\pi}{12}\right) - \right.$$

$$\sin\left(\omega_2 \cdot t + \pi + \alpha - \frac{22\pi}{12}\right)\right\}\right]\right]$$

$$= 2\mu \cdot Im_2 \cdot n \cdot \left\{Ici(t) \cdot \sin(\omega_2 \cdot t + \alpha) + \right.$$

$$Icii(t) \cdot \sin\left(\omega_2 \cdot t + \alpha - \frac{2\pi}{12}\right) +$$

$$Iciii(t) \cdot \sin\left(\omega_2 \cdot t + \alpha - \frac{4\pi}{12}\right) +$$

$$Iciv(t) \cdot \sin\left(\omega_2 \cdot t + \alpha - \frac{6\pi}{12}\right) +$$

$$Icv(t) \cdot \sin\left(\omega_2 \cdot t + \alpha - \frac{8\pi}{12}\right) +$$

$$Icvi(t) \cdot \sin\left(\omega_2 \cdot t + \alpha - \frac{10\pi}{12}\right) +$$

$$Icvii(t) \cdot \sin\left(\omega_2 \cdot t + \alpha - \frac{12\pi}{12}\right) +$$

$$Icviii(t) \cdot \sin\left(\omega_2 \cdot t + \alpha - \frac{14\pi}{12}\right) +$$

$$Icix(t) \cdot \sin\left(\omega_2 \cdot t + \alpha - \frac{16\pi}{12}\right) +$$

$$Icx(t) \cdot \sin\left(\omega_2 \cdot t + \alpha - \frac{18\pi}{12}\right) +$$

$$Icxi(t) \cdot \sin\left(\omega_2 \cdot t + \alpha - \frac{20\pi}{12}\right) +$$

$$Icxi(t) \cdot \sin\left(\omega_2 \cdot t + \alpha - \frac{22\pi}{12}\right)\right\}\right]$$

$f_2$ given by this equation (35) is different from $f_2$ given by equation (27) when the inner rotating magnetic fields are formed by a three-phase alternating current. Therefore, the following calculation of $f_2$ when the inner rotating magnetic fields are formed by a twelve-phase alternating current, will be performed.

(2-6-2) Calculation of $f_2$ Using Twelve-phase Alternating Current

The above-mentioned twelve-phase alternating current $Ici(t)$–$Icxii(t)$ is set by the following equations (36A)–(36L).

$$Ici(t) = Ic_2(t) \cdot \cos(\omega_2 \cdot t - \gamma) \tag{36A}$$

$$Icii(t) = Ic_2(t) \cdot \cos\left(\omega_2 \cdot t - \gamma - \frac{2\pi}{12}\right) \tag{36B}$$

$$Iciii(t) = Ic_2(t) \cdot \cos\left(\omega_2 \cdot t - \gamma - \frac{4\pi}{12}\right) \tag{36C}$$

$$Iciv(t) = Ic_2(t) \cdot \cos\left(\omega_2 \cdot t - \gamma - \frac{6\pi}{12}\right) \tag{36D}$$

$$Icv(t) = Ic_2(t) \cdot \cos\left(\omega_2 \cdot t - \gamma - \frac{8\pi}{12}\right) \tag{36E}$$

$$Icvi(t) = Ic_2(t) \cdot \cos\left(\omega_2 \cdot t - \gamma - \frac{10\pi}{12}\right) \tag{36F}$$

$$Icvii(t) = Ic_2(t) \cdot \cos\left(\omega_2 \cdot t - \gamma - \frac{12\pi}{12}\right) \tag{36G}$$

$$Icviii(t) = Ic_2(t) \cdot \cos\left(\omega_2 \cdot t - \gamma - \frac{14\pi}{12}\right) \tag{36H}$$

$$Icix(t) = Ic_2(t) \cdot \cos\left(\omega_2 \cdot t - \gamma - \frac{16\pi}{12}\right) \tag{36I}$$

$$Icx(t) = Ic_2(t) \cdot \cos\left(\omega_2 \cdot t - \gamma - \frac{18\pi}{12}\right) \tag{36J}$$

$$Icxi(t) = Ic_2(t) \cdot \cos\left(\omega_2 \cdot t - \gamma - \frac{20\pi}{12}\right) \tag{36K}$$

$$Icxii(t) = Ic_2(t) \cdot \cos\left(\omega_2 \cdot t - \gamma - \frac{22\pi}{12}\right) \tag{36L}$$

$f_2$ is calculated by substituting equations (36A)–(36L) in equation (35).

$$f_2 = 2\mu \cdot Im_2 \cdot n \cdot Ic(t) \cdot \Big\{\cos(\omega_2 \cdot t - \gamma) \cdot \sin(\omega_2 \cdot t + \alpha) +$$

$$\cos\left(\omega_2 \cdot t - \gamma - \frac{2\pi}{12}\right) \cdot \sin\left(\omega_2 \cdot t + \alpha - \frac{2\pi}{12}\right) +$$

$$\cos\left(\omega_2 \cdot t - \gamma - \frac{4\pi}{12}\right) \cdot \sin\left(\omega_2 \cdot t + \alpha - \frac{4\pi}{12}\right) +$$

$$\cos\left(\omega_2 \cdot t - \gamma - \frac{6\pi}{12}\right) \cdot \sin\left(\omega_2 \cdot t + \alpha - \frac{6\pi}{12}\right) +$$

$$\cos\left(\omega_2 \cdot t - \gamma - \frac{8\pi}{12}\right) \cdot \sin\left(\omega_2 \cdot t + \alpha - \frac{8\pi}{12}\right) +$$

$$\cos\left(\omega_2 \cdot t - \gamma - \frac{10\pi}{12}\right) \cdot \sin\left(\omega_2 \cdot t + \alpha - \frac{10\pi}{12}\right) +$$

$$\cos\left(\omega_2 \cdot t - \gamma - \frac{12\pi}{12}\right) \cdot \sin\left(\omega_2 \cdot t + \alpha - \frac{12\pi}{12}\right) +$$

$$\cos\left(\omega_2 \cdot t - \gamma - \frac{14\pi}{12}\right) \cdot \sin\left(\omega_2 \cdot t + \alpha - \frac{14\pi}{12}\right) +$$

$$\cos\left(\omega_2 \cdot t - \gamma - \frac{16\pi}{12}\right) \cdot \sin\left(\omega_2 \cdot t + \alpha - \frac{16\pi}{12}\right) +$$

$$\cos\left(\omega_2 \cdot t - \gamma - \frac{18\pi}{12}\right) \cdot \sin\left(\omega_2 \cdot t + \alpha - \frac{18\pi}{12}\right) +$$

$$\cos\left(\omega_2 \cdot t - \gamma - \frac{20\pi}{12}\right) \cdot \sin\left(\omega_2 \cdot t + \alpha - \frac{20\pi}{12}\right) +$$

$$\cos\left(\omega_2 \cdot t - \gamma - \frac{22\pi}{12}\right) \cdot \sin\left(\omega_2 \cdot t + \alpha - \frac{22\pi}{12}\right)\Big\}$$

Here, the above equation may be rewritten using the formula $\cos(a)\cdot\sin(b) = \frac{1}{2}\cdot\{\sin(a+b) - \sin(a-b)\}$.

$$f_2 = 2\mu \cdot Im_2 \cdot n \cdot Ic_2(t) \cdot \Big[\frac{1}{2} \cdot \{\sin(\omega_2 \cdot t - \gamma + \omega_2 \cdot t + \alpha) - \tag{37}$$

$$\sin(\omega_2 \cdot t - \gamma - \omega_2 \cdot t - \alpha)\} +$$

$$\frac{1}{2} \cdot \Big\{\sin\left(\omega_2 \cdot t - \gamma - \frac{2\pi}{12} + \omega_2 \cdot t + \alpha - \frac{2\pi}{12}\right) -$$

$$\sin\left(\omega_2 \cdot t - \gamma - \frac{2\pi}{12} - \omega_2 \cdot t - \alpha + \frac{2\pi}{12}\right)\Big\} +$$

$$\frac{1}{2} \cdot \Big\{\sin\left(\omega_2 \cdot t - \gamma - \frac{4\pi}{12} + \omega_2 \cdot t + \alpha - \frac{4\pi}{12}\right) -$$

$$\sin\left(\omega_2 \cdot t - \gamma - \frac{4\pi}{12} - \omega_2 \cdot t - \alpha + \frac{4\pi}{12}\right)\Big\} +$$

$$\frac{1}{2} \cdot \Big\{\sin\left(\omega_2 \cdot t - \gamma - \frac{6\pi}{12} + \omega_2 \cdot t + \alpha - \frac{6\pi}{12}\right) -$$

$$\sin\left(\omega_2 \cdot t - \gamma - \frac{6\pi}{12} - \omega_2 \cdot t - \alpha + \frac{6\pi}{12}\right)\Big\} +$$

$$\frac{1}{2} \cdot \Big\{\sin\left(\omega_2 \cdot t - \gamma - \frac{8\pi}{12} + \omega_2 \cdot t + \alpha - \frac{8\pi}{12}\right) -$$

$$\sin\left(\omega_2 \cdot t - \gamma - \frac{8\pi}{12} - \omega_2 \cdot t - \alpha + \frac{8\pi}{12}\right)\Big\} +$$

$$\frac{1}{2} \cdot \Big\{\sin\left(\omega_2 \cdot t - \gamma - \frac{10\pi}{12} + \omega_2 \cdot t + \alpha - \frac{10\pi}{12}\right) -$$

$$\sin\left(\omega_2 \cdot t - \gamma - \frac{10\pi}{12} - \omega_2 \cdot t - \alpha + \frac{10\pi}{12}\right)\Big\} +$$

$$\frac{1}{2} \cdot \Big\{\sin\left(\omega_2 \cdot t - \gamma - \frac{12\pi}{12} + \omega_2 \cdot t + \alpha - \frac{12\pi}{12}\right) -$$

$$\sin\left(\omega_2 \cdot t - \gamma - \frac{12\pi}{12} - \omega_2 \cdot t - \alpha + \frac{12\pi}{12}\right)\Big\} +$$

$$\frac{1}{2} \cdot \Big\{\sin\left(\omega_2 \cdot t - \gamma - \frac{14\pi}{12} + \omega_2 \cdot t + \alpha - \frac{14\pi}{12}\right) -$$

$$\sin\left(\omega_2 \cdot t - \gamma - \frac{14\pi}{12} - \omega_2 \cdot t - \alpha + \frac{14\pi}{12}\right)\Big\} +$$

-continued $$\frac{1}{2} \cdot \Big\{\sin\left(\omega_2 \cdot t - \gamma - \frac{16\pi}{12} + \omega_2 \cdot t + \alpha - \frac{16\pi}{12}\right) -$$

$$\sin\left(\omega_2 \cdot t - \gamma - \frac{16\pi}{12} - \omega_2 \cdot t - \alpha + \frac{16\pi}{12}\right)\Big\} +$$

$$\frac{1}{2} \cdot \Big\{\sin\left(\omega_2 \cdot t - \gamma - \frac{18\pi}{12} + \omega_2 \cdot t + \alpha - \frac{18\pi}{12}\right) -$$

$$\sin\left(\omega_2 \cdot t - \gamma - \frac{18\pi}{12} - \omega_2 \cdot t - \alpha + \frac{18\pi}{12}\right)\Big\} +$$

$$\frac{1}{2} \cdot \Big\{\sin\left(\omega_2 \cdot t - \gamma - \frac{20\pi}{12} + \omega_2 \cdot t + \alpha - \frac{20\pi}{12}\right) -$$

$$\sin\left(\omega_2 \cdot t - \gamma - \frac{20\pi}{12} - \omega_2 \cdot t - \alpha + \frac{20\pi}{12}\right)\Big\} +$$

$$\frac{1}{2} \cdot \Big\{\sin\left(\omega_2 \cdot t - \gamma - \frac{22\pi}{12} + \omega_2 \cdot t + \alpha - \frac{22\pi}{12}\right) -$$

$$\sin\left(\omega_2 \cdot t - \gamma - \frac{22\pi}{12} - \omega_2 \cdot t - \alpha + \frac{22\pi}{12}\right)\Big\}\Big]$$

$$= 2\mu \cdot Im_2 \cdot n \cdot Ic_2(t) \cdot \Big[\frac{1}{2}\{\sin(2\omega_2 \cdot t - \gamma + \alpha) + \sin(\gamma + \alpha)\} +$$

$$\frac{1}{2}\Big\{\sin\left(2\omega_2 \cdot t - \gamma + \alpha - \frac{4\pi}{12}\right) + \sin(\gamma + \alpha)\Big\} +$$

$$\frac{1}{2}\Big\{\sin\left(2\omega_2 \cdot t - \gamma + \alpha - \frac{8\pi}{12}\right) + \sin(\gamma + \alpha)\Big\} +$$

$$\frac{1}{2}\Big\{\sin\left(2\omega_2 \cdot t - \gamma + \alpha - \frac{12\pi}{12}\right) + \sin(\gamma + \alpha)\Big\} +$$

$$\frac{1}{2}\Big\{\sin\left(2\omega_2 \cdot t - \gamma + \alpha - \frac{16\pi}{12}\right) + \sin(\gamma + \alpha)\Big\} +$$

$$\frac{1}{2}\Big\{\sin\left(2\omega_2 \cdot t - \gamma + \alpha - \frac{20\pi}{12}\right) + \sin(\gamma + \alpha)\Big\} +$$

$$\frac{1}{2}\Big\{\sin\left(2\omega_2 \cdot t - \gamma + \alpha - \frac{24\pi}{12}\right) + \sin(\gamma + \alpha)\Big\} +$$

$$\frac{1}{2}\Big\{\sin\left(2\omega_2 \cdot t - \gamma + \alpha - \frac{28\pi}{12}\right) + \sin(\gamma + \alpha)\Big\} +$$

$$\frac{1}{2}\Big\{\sin\left(2\omega_2 \cdot t - \gamma + \alpha - \frac{32\pi}{12}\right) + \sin(\gamma + \alpha)\Big\} +$$

$$\frac{1}{2}\Big\{\sin\left(2\omega_2 \cdot t - \gamma + \alpha - \frac{36\pi}{12}\right) + \sin(\gamma + \alpha)\Big\} +$$

$$\frac{1}{2}\Big\{\sin\left(2\omega_2 \cdot t - \gamma + \alpha - \frac{40\pi}{12}\right) + \sin(\gamma + \alpha)\Big\} +$$

$$\frac{1}{2}\Big\{\sin\left(2\omega_2 \cdot t - \gamma + \alpha - \frac{44\pi}{12}\right) + \sin(\gamma + \alpha)\Big\}\Big]$$

$$= \mu \cdot Im_2 \cdot n \cdot Ic_2(t) \cdot \Big\{\sin(2\omega_2 \cdot t - \gamma + \alpha) +$$

$$\sin\left(2\omega_2 \cdot t - \gamma + \alpha - \frac{4\pi}{12}\right) + \sin\left(2\omega_2 \cdot t - \gamma + \alpha - \frac{8\pi}{12}\right) +$$

$$\sin\left(2\omega_2 \cdot t - \gamma + \alpha - \frac{12\pi}{12}\right) + \sin\left(2\omega_2 \cdot t - \gamma + \alpha - \frac{16\pi}{12}\right) +$$

$$\sin\left(2\omega_2 \cdot t - \gamma + \alpha - \frac{20\pi}{12}\right) + \sin\left(2\omega_2 \cdot t - \gamma + \alpha - \frac{24\pi}{12}\right) +$$

$$\sin\left(2\omega_2 \cdot t - \gamma + \alpha - \frac{28\pi}{12}\right) + \sin\left(2\omega_2 \cdot t - \gamma + \alpha - \frac{32\pi}{12}\right) +$$

$$\sin\left(2\omega_2 \cdot t - \gamma + \alpha - \frac{36\pi}{12}\right) + \sin\left(2\omega_2 \cdot t - \gamma + \alpha - \frac{40\pi}{12}\right) +$$

$$\sin\left(2\omega_2 \cdot t - \gamma + \alpha - \frac{44\pi}{12}\right) + 12\sin(\gamma + \alpha)\Big\}$$

$$= \mu \cdot Im_2 \cdot n \cdot Ic_2(t) \cdot \Big\{\sin(2\omega_2 \cdot t - \gamma + \alpha) +$$

$$\sin\left(2\omega_2 \cdot t - \gamma + \alpha - \frac{\pi}{3}\right) + \sin\left(2\omega_2 \cdot t - \gamma + \alpha - \frac{2\pi}{3}\right) -$$

$$\sin(2\omega_2 \cdot t - \gamma + \alpha) - \sin\left(2\omega_2 \cdot t - \gamma + \alpha - \frac{\pi}{3}\right) -$$

$$\sin\left(2\omega_2 \cdot t - \gamma + \alpha - \frac{2\pi}{3}\right) + \sin(2\omega_2 \cdot t - \gamma + \alpha) +$$

$$\sin\left(2\omega_2 \cdot t - \gamma + \alpha - \frac{\pi}{3}\right) + \sin\left(2\omega_2 \cdot t - \gamma + \alpha - \frac{2\pi}{3}\right) -$$

$$\sin(2\omega_2 \cdot t - \gamma + \alpha) - \sin\left(2\omega_2 \cdot t - \gamma + \alpha - \frac{\pi}{3}\right) -$$

$$\sin\left(2\omega_2 \cdot t - \gamma + \alpha - \frac{2\pi}{3}\right) + 12\sin(\gamma + \alpha)\bigg\}$$

$$= 12\mu \cdot Im_2 \cdot n \cdot Ic_2(t) \cdot \sin(\gamma + \alpha)$$

(2-6-3) Summary

Comparing equation (37) obtained when the inner rotating magnetic fields are supplied by a twelve-phase alternating current with the above-mentioned equation (31) obtained when the inner rotating magnetic fields are supplied by a three-phase alternating current (31), the constant term of equation (37), i.e., the last term, is four times that of equation (31).

In other words, when the inner magnet is driven by a twelve-phase alternating current (Ii–Ixii), the drive torque obtained is four times that when the inner magnet is driven by a three-phase alternating current.

In other words, the inner magnets drive current required to exert the same drive torque on the inner *magnets $m_2$, is only one fourth of that when a three-phase alternating current is applied.

(3) N(3(2p)-2p) Type (3-1) When the Magnetic Pole Number Ratio is 3:1

Figure 13:
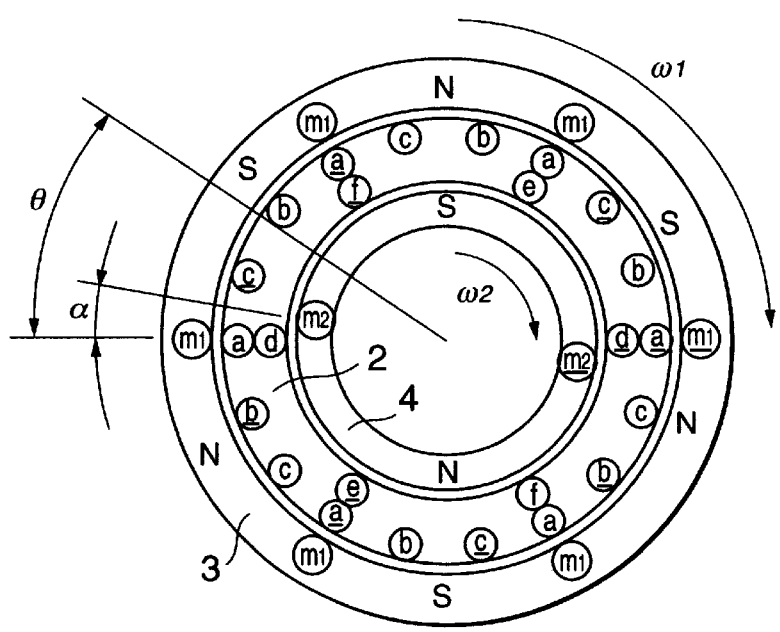
FIG. 13 is similar to FIG. 9, but showing a case where the magnetic pole number ratio is 3:1.

Taking a motor/generator of FIG. 13 as an example, the magnetic pole number ratio is 3:1 when the magnetic pole number of the outer magnets $m_2$ is 6 and the magnetic pole number of the inner magnets $m_1$ is 2.

In this construction, the magnetic flux densities $B_1$ and $B_2$ generated by the outer and inner permanent magnets are expressed by the following equations (41), (42).

$$B_1 = Bm_1 \cdot \sin(3\omega_1 \cdot t - 3\theta) = \mu \cdot Im_1 \cdot \sin(3\omega_1 \cdot t - 3\theta) \quad (41)$$

$$B_2 = Bm_2 \cdot \sin(\omega_2 \cdot t + \alpha - \theta) = \mu \cdot Im_2 \cdot \sin(\omega_2 \cdot t + \alpha - \theta) \quad (42)$$

The rotating magnetic fields produced by the coils 6 of the stator 2 are calculated separately for the outer rotor 3 and inner rotor 4. The magnetic flux densities $Bc_1$, $Bc_2$ of the coils 6 relative to the outer magnets $m_1$ and inner magnets $m_2$ are expressed by the following equations (43), (44).

$$Bc_1 = \mu \cdot n \cdot \{Ica(t) \cdot \sin(3\theta) + \quad (43)$$
$$Icb(t) \cdot \sin\left(3\theta - \frac{2\pi}{3}\right) + Icc(t) \cdot \sin\left(3\theta - \frac{4\pi}{3}\right)\}$$

$$Bc_2 = \mu \cdot n \cdot \{Icd(t) \cdot \sin\theta + \quad (44)$$
$$Ice(t) \cdot \sin\left(\theta - \frac{2\pi}{3}\right) + Icf(t) \cdot \sin\left(\theta - \frac{4\pi}{3}\right)\}$$

The variation of the aforesaid magnetic flux densities $B_1$, $B_2$ and Bc, $Bc_2$ are shown in FIGS. 14A–14D.

The total magnetic flux density B is expressed by the following equation.

$$B = B_1 + B_2 + Bc_1 + Bc_2 \quad (45)$$

$$= \mu \cdot Im_1 \cdot \sin(3\omega_1 \cdot t - 3\theta) + \mu \cdot Im_2 \cdot \sin(\omega_2 \cdot t + \alpha - \theta) +$$

$$\mu \cdot n \cdot \left\{Ica(t) \cdot \sin(3\theta) + Icb(t) \cdot \sin\left(3\theta - \frac{2\pi}{3}\right) + Icc(t) \cdot \sin\left(3\theta - \frac{4\pi}{3}\right)\right\} +$$

$$\mu \cdot n \cdot \left\{Icd(t) \cdot \sin\theta + Ice(t) \cdot \sin\left(\theta - \frac{2\pi}{3}\right) + Icf(t) \cdot \sin\left(\theta - \frac{4\pi}{3}\right)\right\}$$

Here, let the torque acting on the outer rotor 3 be $\tau_1$. If the force which acts on a semicircle of the outer rotor 3 is $f_1$, the force which then acts on the other semicircle is also $f_1$. Therefore, the force acting on the whole circumference is $2f_1$, and the torque $\tau_1$ may be expressed by the following equation.

$$\tau_1 = 2f_1 \cdot r_1$$

where, $r_1$=distance to outer magnets from center axis of outer rotor.

As three equivalent direct currents are formed for one semicircle, $f_1$ is given by the following equation.

$$f_1 = Im_1 \cdot B_{1000} + Im_1 \cdot B_{2000} - Im_1 \cdot B_{3000}$$

where, $B_{1000}$ is magnetic flux density B at $\theta=\omega_1 \cdot t$, $B_{2000}$ is | magnetic flux density B at $\theta=\omega_1 \cdot t + 2\pi/3$, and $B_{3000}$ is magnetic flux density B at $\theta=\omega_1 \cdot t + \pi/3$.

Therefore, the above equation can be rewritten as follows.

$$f_1 = \mu \cdot Im_1 \cdot \Big[Im_1 \cdot \sin(3\omega_1 \cdot t - 3\omega_1 \cdot t) + \quad (46)$$

$$Im_1 \cdot \sin(3\omega_1 \cdot t - 3\omega_1 \cdot t - 2\pi) -$$

$$Im_1 \cdot \sin(3\omega_1 \cdot t - 3\omega_1 \cdot t - \pi) +$$

$$Im_2 \cdot \sin(\omega_2 \cdot t + \alpha - \omega_1 \cdot t) +$$

$$Im_2 \cdot \sin\left(\omega_2 \cdot t + \alpha - \omega_1 \cdot t - \frac{2\pi}{3}\right) -$$

$$Im_2 \cdot \sin\left(\omega_2 \cdot t + \alpha - \omega_1 \cdot t - \frac{\pi}{3}\right) +$$

$$n \cdot \left\{Ica(t) \cdot \sin(3\omega_1 \cdot t) + Icb(t) \cdot \sin\left(3\omega_1 \cdot t - \frac{2\pi}{3}\right) +$$

$$Icc(t) \cdot \sin\left(3\omega_1 \cdot t - \frac{4\pi}{3}\right)\right\} +$$

$$n \cdot \left\{Ica(t) \cdot \sin(3\omega_1 \cdot t + 2\pi) +$$

$$Icb(t) \cdot \sin\left(3\omega_1 \cdot t + 2\pi - \frac{2\pi}{3}\right) +$$

$$Icc(t) \cdot \sin\left(3\omega_1 \cdot t + 2\pi - \frac{4\pi}{3}\right)\right\} -$$

$$n \cdot \left\{Ica(t) \cdot \sin(3\omega_1 \cdot t + \pi) +$$

$$Icb(t) \cdot \sin\left(3\omega_1 \cdot t + \pi - \frac{2\pi}{3}\right) +$$

$$Icc(t) \cdot \sin\left(3\omega_1 \cdot t + \pi - \frac{4\pi}{3}\right)\right\} +$$

$$n \cdot \left\{Icd(t) \cdot \sin(\omega_1 \cdot t) + Ice(t) \cdot \sin\left(\omega_1 \cdot t - \frac{2\pi}{3}\right) +$$

-continued $$Icf(t)\cdot\sin\left(\omega_1\cdot t-\frac{4\pi}{3}\right)\Big\}+$$

$$n\cdot\Big\{Icd(t)\cdot\sin\left(\omega_1\cdot t+\frac{2\pi}{3}\right)+$$

$$Ice(t)\cdot\sin\left(\omega_1\cdot t+\frac{2\pi}{3}-\frac{2\pi}{3}\right)+$$

$$Icf(t)\cdot\sin\left(\omega_1\cdot t+\frac{2\pi}{3}-\frac{4\pi}{3}\right)\Big\}-$$

$$n\cdot\Big\{Icd(t)\cdot\sin\left(\omega_1\cdot t+\frac{\pi}{3}\right)+Ice(t)\cdot\sin\left(\omega_1\cdot t+\frac{\pi}{3}-\frac{2\pi}{3}\right)+$$

$$Icf(t)\cdot\sin\left(\omega_1\cdot t+\frac{\pi}{3}-\frac{4\pi}{3}\right)\Big\}\Big]$$

$$=\mu\cdot Im_1\cdot\Big[n\cdot\Big\{Ica(t)\cdot\sin(3\omega_1\cdot t)+$$

$$Icb(t)\cdot\sin\left(3\omega_1\cdot t-\frac{2\pi}{3}\right)+Icc(t)\cdot\sin\left(3\omega_1\cdot t-\frac{4\pi}{3}\right)\Big\}+$$

$$n\cdot\Big\{Ica(t)\cdot\sin(3\omega_1\cdot t)+Icb(t)\cdot\sin\left(3\omega_1\cdot t-\frac{2\pi}{3}\right)+$$

$$Icc(t)\cdot\sin\left(3\omega_1\cdot t-\frac{4\pi}{3}\right)\Big\}+$$

$$n\cdot\Big\{Ica(t)\sin(3\omega_1\cdot t)+Icb(t)\cdot\sin\left(3\omega_1\cdot t-\frac{2\pi}{3}\right)+$$

$$Icc(t)\cdot\sin\left(3\omega_1\cdot t-\frac{4\pi}{3}\right)\Big\}+$$

$$n\cdot\Big\{Icd(t)\cdot\sin(\omega_1\cdot t)+Ice(t)\cdot\sin\left(\omega_1\cdot t-\frac{2\pi}{3}\right)+$$

$$Icf(t)\cdot\sin\left(\omega_1\cdot t-\frac{4\pi}{3}\right)\Big\}+$$

$$n\cdot\Big\{Icd(t)\cdot\sin\left(\omega_1\cdot t+\frac{2\pi}{3}\right)+$$

$$Ice(t)\cdot\sin(\omega_1\cdot t)+Icf\cdot\sin\left(\omega_1\cdot t-\frac{2\pi}{3}\right)\Big\}+$$

$$n\cdot\Big\{Icd(t)\cdot\sin\left(\omega_1\cdot t+\frac{4\pi}{3}\right)+Ice(t)\cdot\sin\left(\omega_1\cdot t+\frac{2\pi}{3}\right)+$$

$$Icf(t)\cdot\sin(\omega_1\cdot t)\Big\}\Big]$$

$$=\mu\cdot n\cdot Im_1\cdot\Big[3\cdot\Big\{Ica(t)\cdot\sin(3\omega_1\cdot t)+$$

$$Icb(t)\cdot\sin\left(3\omega_1\cdot t-\frac{2\pi}{3}\right)+Icc(t)\cdot\sin\left(3\omega_1\cdot t-\frac{4\pi}{3}\right)\Big\}+$$

$$Icd(t)\cdot\sin(\omega_1\cdot t)+Icd(t)\cdot\sin\left(\omega_1\cdot t+\frac{2\pi}{3}\right)+$$

$$Icd(t)\cdot\sin\left(\omega_1\cdot t+\frac{4\pi}{3}\right)+Ice(t)\cdot\sin(\omega_1\cdot t)+$$

$$Ice(t)\cdot\sin\left(\omega_1\cdot t+\frac{2\pi}{3}\right)+Ice(t)\cdot\sin\left(\omega_1\cdot t+\frac{4\pi}{3}\right)+$$

$$Icf(t)\cdot\sin(\omega_1\cdot t)+Icf(t)\cdot\sin\left(\omega_1\cdot t+\frac{2\pi}{3}\right)+$$

$$Icf(t)\cdot\sin\left(\omega_1\cdot t+\frac{4\pi}{3}\right)\Big]$$

$$=3\mu\cdot Im_1\cdot n\cdot\Big\{Ica(t)\cdot\sin(3\omega_1\cdot t)+Icb(t)\cdot$$

$$\sin\left(3\omega_1\cdot t-\frac{2\pi}{3}\right)+Icc(t)\cdot\sin\left(3\omega_1\cdot t-\frac{4\pi}{3}\right)\Big\}$$

Equation (46) shows that when the magnetic flux density of the outer magnets $m_1$ is approximated to a sine wave, the torque acting on the outer magnets $m_1$ can be controlled by the exciting currents of the coils a, b, c.

It also shows that the torque acting on the outer magnets $m_1$ is not affected by the excitation currents of the coils d, e, f.

Here, let the torque acting on the inner rotor 4 be $\tau_2$. If the force which acts on a semicircle of the inner rotor 4 is $f_2$, the force which then acts the other semicircle is also $f_2$. Therefore, the force acting on the whole circumference is $2f_2$, and the torque $\tau_2$ may be expressed by the following equation.

$$\tau_2=2f_2\cdot r_2$$

where, $r_2$=distance from center axis of inner rotor 4 to inner magnets $m_2$.

Here, the force $f_2$ is a drive force which an equivalent direct current $Im_2$ generates in a magnetic field of magnetic flux density B. As an equivalent direct current is formed for each semicircle, $f_2$ is given by the following equation.

$$f_2=Im_2\cdot B$$

where, $\theta=\omega_2\cdot t+\alpha$.

From this equation and equation (45), f2 may be expressed by the following equation (47).

$$f_2=\mu\cdot Im_2\cdot\Big[Im_1\cdot\sin(3\omega_1\cdot t-3\omega_2\cdot t-3\alpha)+ \tag{47}$$

$$\mu\cdot Im_2\cdot\sin(\omega_2\cdot t+\alpha-\omega_2\cdot t-\alpha)+$$

$$n\cdot\Big\{Ica(t)\cdot\sin(3\omega_2\cdot t+3\alpha)+$$

$$Icb(t)\cdot\sin\left(3\omega_2\cdot t+3\alpha-\frac{2\pi}{3}\right)+$$

$$Icc(t)\cdot\sin\left(3\omega_2\cdot t+3\alpha-\frac{4\pi}{3}\right)\Big\}+$$

$$n\Big\{Icd(t)\cdot\sin(\omega_2\cdot t+\alpha)+Ice(t)\cdot\sin\left(\omega_2\cdot t+\alpha-\frac{2\pi}{3}\right)+$$

$$Icf(t)\cdot\sin\left(\omega_2\cdot t+\alpha-\frac{4\pi}{3}\right)\Big\}\Big]$$

$$=\mu\cdot Im_2\cdot\Big[Im_1\cdot\sin\{3(\omega_1-\omega_2)t-3\alpha\}+$$

$$n\cdot\Big\{Ica(t)\cdot\sin(3\omega_2\cdot t+3\alpha)+$$

$$Icb(t)\cdot\sin\left(3\omega_2\cdot t+3\alpha-\frac{2\pi}{3}\right)+$$

$$Icc(t)\cdot\sin\left(3\omega_2\cdot t+3\alpha-\frac{4\pi}{3}\right)\Big\}+$$

$$n\cdot\Big\{Icd(t)\cdot\sin(\omega_2\cdot t+\alpha)+Ice(t)\cdot\sin\left(\omega_2\cdot t+\alpha-\frac{2\pi}{3}\right)+$$

$$Icf(t)\cdot\sin\left(\omega_2\cdot t+\alpha-\frac{4\pi}{3}\right)\Big\}\Big]$$

The second term in equation (47) shows that the torque acting on the inner magnets $m_2$ is evidently affected by the exciting currents of the coils a, b, c for the outer magnets $m_1$. However, this is an apparent effect, and there is actually no effect due to the following reason.

If the positions of the outer magnets $m_1$ are $\phi_1=\omega_1\cdot t+\pi/6$, $\phi_2=\omega_1\cdot t+5\pi/6$, $\phi_3=\omega_1\cdot t+9\pi/6$ respectively, the magnetic flux density $B_1$ of the outer magnets $m_1$ at a rotation angle $\theta$ may be expressed by the following equation.

$$B_1 = Bm_1 \cdot \left\{\cos\left(\omega_1 \cdot t + \frac{\pi}{6} - \theta\right) + \cos\left(\omega_1 \cdot t + \frac{5\pi}{6} - \theta\right) + \right.$$
$$\left. \cos\left(\omega_1 \cdot t + \frac{9\pi}{6} - \theta\right)\right\}$$
$$= \mu \cdot Im_1 \cdot \left\{\cos\left(\omega_1 \cdot t + \frac{\pi}{6} - \theta\right) + \cos\left(\omega_1 \cdot t + \frac{5\pi}{6} - \theta\right) + \right.$$
$$\left. \cos\left(\omega_1 \cdot t + \frac{9\pi}{6} - \theta\right)\right\}$$
$$= 0$$

This shows that the magnetic poles formed at 120 degree intervals cancel the magnetic force. In other words, the magnetic pole number of the outer magnets $m_1$ has no effect on the inner magnets $m_2$. Similarly, the magnetic flux density produced by the outer coil is also 0 in total. Therefore, the drive force $f_2$ is as follows.

$$f_2 = \mu \cdot Im_2 \cdot \left[n \cdot \left\{Icd(t) \cdot \sin(\omega_2 \cdot t + \alpha) + \right.\right.$$
$$Ice(t) \cdot \sin\left(\omega_2 \cdot t + \alpha - \frac{2\pi}{3}\right) +$$
$$\left.\left. Icf(t) \cdot \sin\left(\omega_2 \cdot t + \alpha - \frac{4\pi}{3}\right)\right\}\right] \tag{48}$$

(3-2) When Both the Outer Rotating Magnetic Fields and Inner Rotating Magnetic Fields are Supplied The alternating currents Ica(t), Icb(t), Icc(t) and alternating currents Icd(t), Ice(t), Icf(t) are expressed by the following equations.

$$Ica(t) = Ic_1 \cdot \cos(3\omega_1 t - 3\beta) \tag{49A}$$

$$Ica(t) = Ic_1 \cdot \cos(3\omega_1 \cdot t - 3\beta) \tag{49A}$$

$$Icb(t) = Ic_1 \cdot \cos\left(3\omega_1 \cdot t - 3\beta - \frac{2\pi}{3}\right) \tag{49B}$$

$$Icc(t) = Ic_1 \cdot \cos\left(3\omega_1 \cdot t - 3\beta - \frac{4\pi}{3}\right) \tag{49C}$$

$$Icd(t) = Ic_2(t) \cdot \cos(\omega_2 \cdot t - \gamma) \tag{50A}$$

$$Ice(t) = Ic_2(t) \cdot \cos\left(\omega_2 \cdot t - \gamma - \frac{2\pi}{3}\right) \tag{50B}$$

$$Icf(t) = Ic_2(t) \cdot \cos\left(\omega_2 \cdot t - \gamma - \frac{4\pi}{3}\right) \tag{50C}$$

$$Icd(t) = Ic_2(t) \cdot \cos(\omega_2 \cdot t \cdot \gamma) \tag{50A}$$

$$f_1 = 3\mu \cdot Im_1 \cdot n \cdot Ic_1 \cdot \left\{\cos(3\omega_1 \cdot t - 3\beta) \cdot \sin(3\omega_1 \cdot t)\right\}$$

$$f_1 = 3\mu \cdot Im_1 \cdot n \cdot Ic_1 \cdot \left\{\cos(3\omega_1 \cdot t - 3\beta) \cdot \sin(3\omega_1 \cdot t) + \right.$$
$$\cos\left(3\omega_1 \cdot t - 3\beta - \frac{2\pi}{3}\right) \cdot \sin\left(3\omega_1 \cdot t - \frac{2\pi}{3}\right) +$$
$$\left.\cos\left(3\omega_1 \cdot t - 3\beta - \frac{4\pi}{3}\right) \cdot \sin\left(3\omega_1 \cdot t - \frac{4\pi}{3}\right)\right\}$$

In equations (50A)–(50C), to permit amplitude modulation, the current is assumed to be $Ic_2(t)$ which is a function of time t.

$f_1$, $f_2$ are calculated by substituting equations (49A)–(49C) in equation (46), and substituting equations (49)–(49C) and (50A)–(50C) in equation (47).

$$f_1 = 3\mu \cdot Im_1 \cdot n \cdot Ic_1 \cdot \left\{\cos(3\omega_1 \cdot t - 3\beta) \cdot \sin(3\omega_1 \cdot t)\right\}$$

$$f_1 = 3\mu \cdot Im_1 \cdot n \cdot Ic_1 \cdot \left\{\cos(3\omega_1 \cdot t - 3\beta) \cdot \sin(3\omega_1 \cdot t) + \right.$$
$$\cos\left(3\omega_1 \cdot t - 3\beta - \frac{2\pi}{3}\right) \cdot \sin\left(3\omega_1 \cdot t - \frac{2\pi}{3}\right) +$$
$$\left.\cos\left(3\omega_1 \cdot t - 3\beta - \frac{4\pi}{3}\right) \cdot \sin\left(3\omega_1 \cdot t - \frac{4\pi}{3}\right)\right\}$$

Here, the above equation may be rewritten using the formula $\cos(a) \cdot \sin(b) = \frac{1}{2}\{\sin(a+b) - \sin(a-b)\}$.

$$f_1 = 3\mu \cdot Im_1 \cdot n \cdot Ic_1 \cdot \left[\frac{1}{2} \cdot \{\sin(3\omega_1 \cdot t - 3\beta + 3\omega_1 \cdot t) - \right. \tag{51}$$
$$\sin(3\omega_1 \cdot t - 3\beta - 3\omega_1 \cdot t)\} +$$
$$\frac{1}{2} \cdot \left\{\sin\left(3\omega_1 \cdot t - 3\beta - \frac{2\pi}{3} + 3\omega_1 \cdot t - \frac{2\pi}{3}\right) - \right.$$
$$\left.\sin\left(3\omega_1 \cdot t - 3\beta - \frac{2\pi}{3} - 3\omega_1 \cdot t + \frac{2\pi}{3}\right)\right\} +$$
$$\frac{1}{2} \cdot \left\{\sin\left(3\omega_1 \cdot t - 3\beta - \frac{4\pi}{3} + 3\omega_1 \cdot t - \frac{4\pi}{3}\right) - \right.$$
$$\left.\left.\sin\left(3\omega_1 \cdot t - 3\beta - \frac{4\pi}{3} - 3\omega_1 \cdot t + \frac{4\pi}{3}\right)\right\}\right]$$
$$= \frac{3}{2} \cdot \mu \cdot Im_1 \cdot n \cdot Ic_1 \cdot \left\{\sin(6\omega_1 \cdot t - 3\beta) + \sin 3\beta + \right.$$
$$\sin\left(6\omega_1 \cdot t - 3\beta - \frac{4\pi}{3}\right) + \sin 3\beta +$$
$$\left.\sin\left(6\omega_1 \cdot t - 3\beta - \frac{8\pi}{3}\right) + \sin 3\beta\right\}$$
$$= \frac{3}{2}\mu \cdot Im_1 \cdot n \cdot Ic_1 \cdot \left\{\sin(6\omega_1 \cdot t - 3\beta) + \right.$$
$$\sin\left(6\omega_1 \cdot t - 3\beta - \frac{4\pi}{3}\right) +$$
$$\left.\sin\left(6\omega_1 \cdot t - 3\beta - \frac{8\pi}{3}\right) + 3\sin 3\beta\right\}$$
$$= \frac{9}{2} \cdot \mu \cdot Im_1 \cdot n \cdot Ic_1 \cdot \sin 3\beta$$

$$f_2 = \mu \cdot Im_2 \cdot \left[Im_1 \cdot \sin\{3(\omega_1 - \omega_2)t - 3\alpha\} + \right.$$
$$n \cdot Ic_1 \cdot \left\{\cos(3\omega_1 \cdot t - 3\beta) \cdot \sin(3\omega_2 \cdot t + 3\alpha) + \right.$$
$$\cos\left(3\omega_1 \cdot t - 3\beta - \frac{2\pi}{3}\right) \cdot \sin\left(3\omega_2 \cdot t + 3\alpha - \frac{2\pi}{3}\right) +$$
$$\left.\cos\left(3\omega_1 \cdot t - 3\beta - \frac{4\pi}{3}\right) \cdot \sin\left(3\omega_2 \cdot t + 3\alpha - \frac{4\pi}{3}\right)\right\} +$$
$$n \cdot Ic_2(t) \cdot \left\{\cos(\omega_2 \cdot t - \gamma) \cdot \sin(\omega_2 \cdot t + \alpha) + \right.$$
$$\cos\left(\omega_2 \cdot t - \gamma - \frac{2\pi}{3}\right) \cdot \sin\left(\omega_2 \cdot t + \alpha - \frac{2\pi}{3}\right) +$$
$$\left.\left.\cos\left(\omega_2 \cdot t - \gamma - \frac{4\pi}{3}\right) \cdot \sin\left(\omega_2 \cdot t + \alpha - \frac{4\pi}{3}\right)\right\}\right]$$

Here, the above equation may be rewritten using the expression $\cos(a) \cdot \sin(b) = \frac{1}{2}\{\sin(a+b) - \sin(a-b)\}$.

$$f_2 = \mu \cdot Im_2 \cdot \left[Im_1 \cdot \sin\{3(\omega_1 - \omega_2) \cdot t - 3\alpha\} + \right. \tag{52}$$
$$n \cdot Ic_1 \cdot \left[\frac{1}{2} \cdot \{\sin(3\omega_1 \cdot t - 3\beta + 3\omega_2 \cdot t + 3\alpha) - \right.$$
$$\sin(3\omega_1 \cdot t - 3\beta + 3\omega_2 \cdot t - 3\alpha)\} +$$

-continued $$\frac{1}{2} \cdot \left\{ \sin\left(3\omega_1 \cdot t - 3\beta - \frac{2\pi}{3} + 3\omega_2 \cdot t + 3\alpha - \frac{2\pi}{3}\right) - \sin\left(3\omega_1 \cdot t - 3\beta - \frac{2\pi}{3} - 3\omega_2 \cdot t - 3\alpha + \frac{2\pi}{3}\right) \right\} +$$

$$\frac{1}{2} \cdot \left\{ \sin\left(3\omega_1 \cdot t - 3\beta - \frac{4\pi}{3} + 3\omega_2 \cdot t + 3\alpha - \frac{4\pi}{3}\right) - \sin\left(3\omega_1 \cdot t - 3\beta - \frac{4\pi}{3} - 3\omega_2 \cdot t - 3\alpha + \frac{4\pi}{3}\right) \right\} +$$

$$n \cdot Ic_2(t) \cdot \left[ \frac{1}{2} \cdot \{\sin(\omega_2 \cdot t - \gamma + \omega_2 \cdot t + \alpha) - \sin(\omega_2 \cdot t - \gamma - \omega_2 \cdot t - \alpha)\} + \right.$$

$$\frac{1}{2} \cdot \left\{ \sin\left(\omega_2 \cdot t - \gamma - \frac{2\pi}{3} + \omega_2 \cdot t + \alpha - \frac{2\pi}{3}\right) - \sin\left(\omega_2 \cdot t - \gamma - \frac{2\pi}{3} - \omega_2 \cdot t - \alpha + \frac{2\pi}{3}\right) \right\} +$$

$$\left. \frac{1}{2} \cdot \left\{ \sin\left(\omega_2 \cdot t - \gamma - \frac{4\pi}{3} + \omega_2 \cdot t + \alpha - \frac{4\pi}{3}\right) - \sin\left(\omega_2 \cdot t - \gamma - \frac{4\pi}{3} - \omega_2 \cdot t - \alpha + \frac{4\pi}{3}\right) \right\} \right]$$

$$= \mu \cdot Im_2 \cdot \left[ Im_1 \cdot \sin\{3(\omega_1 - \omega_2) \cdot t - 3\alpha\} + \right.$$

$$\frac{1}{2} \cdot n \cdot Ic_1 \cdot \left\{ \sin(3\omega_1 \cdot t + 3\omega_2 \cdot t - 3\beta + 3\alpha) + \sin\left(3\omega_1 \cdot t + 3\omega_2 \cdot t - 3\beta + 3\alpha - \frac{4\pi}{3}\right) + \sin\left(3\omega_1 \cdot t + 3\omega_2 \cdot t - 3\beta + 3\alpha - \frac{8\pi}{3}\right) - 3\sin(3\omega_1 \cdot t - 3\beta + 3\omega_2 \cdot t - 3\alpha) \right\} +$$

$$\frac{1}{2} \cdot n \cdot Ic_2(t) \cdot \left\{ \sin(2\omega_2 \cdot t - \gamma + \alpha) + \sin\left(2\omega_2 \cdot t - \gamma + \alpha - \frac{4\pi}{3}\right) + \sin\left(2\omega_2 \cdot t - \gamma + \alpha - \frac{8\pi}{3}\right) + 3\sin(\gamma + \alpha) \right\} \right]$$

$$= \mu \cdot Im_2 \cdot \left[ Im_1 \cdot \sin\{3(\omega_1 - \omega_2) \cdot t - 3\alpha\} + \right.$$

$$\frac{1}{2} \cdot n \cdot Ic_1 \cdot \left\{ \sin(3\omega_1 \cdot t + 3\omega_2 \cdot t - 3\beta + 3\alpha) + \sin\left(3\omega_1 \cdot t + 3\omega_2 \cdot t - 3\beta + 3\alpha - \frac{2\pi}{3}\right) + \sin\left(3\omega_1 \cdot t + 3\omega_2 \cdot t - 3\beta + 3\alpha - \frac{4\pi}{3}\right) - 3\sin(3\omega_1 \cdot t - 3\beta - 3\omega_2 \cdot t - 3\alpha) \right\} +$$

$$\frac{1}{2} \cdot n \cdot Ic_2(t) \cdot \left\{ \sin(2\omega_2 \cdot t - \gamma + \alpha) + \sin\left(2\omega_2 \cdot t - \gamma + \alpha - \frac{2\pi}{3}\right) + \sin\left(2\omega_2 \cdot t - \gamma + \alpha - \frac{4\pi}{3}\right) + 3\sin(\gamma + \alpha) \right\} \right]$$

$$= \mu \cdot Im_2 \cdot \left[ Im_1 \cdot \sin\{3(\omega_1 - \omega_2) \cdot t - 3\alpha\} - \right.$$

$$\frac{3}{2} \cdot n \cdot Ic_1 \cdot \sin(3\omega_1 \cdot t - 3\beta - 3\omega_2 \cdot t - 3\alpha) +$$

$$\left. \frac{3}{2} \cdot n \cdot Ic_2(t) \cdot \sin(\gamma + \alpha) \right]$$

As described with regard to equation (48), $f_2$ is a constant value when there is no effect of the outer magnets $m_1$ and outer coils a, c, b as shown by the following equation (53).

$$f_2 = \frac{3}{2} \cdot \{n \cdot Ic_2(t) \cdot \sin(\gamma + \alpha)\} \tag{53}$$

Conversely, when there is an effect from the magnetic field due to the outer magnets $m_1$ and outer coils, if $Ic_2(t)$ is set by the following equation (54), $ff_2 = C$ (constant) in the equation (52) and the motor/generator can be driven by a constant torque.

$$Ic_2(t) = \frac{\frac{2}{3} \cdot \frac{C}{\mu \cdot Im_2} - Im_1 \cdot \sin\{3(\omega_1 - \omega_2)t - 3\alpha\} + n \cdot Ic_1 \cdot \sin(3\omega_1 \cdot t - 3\beta - 3\omega_2 \cdot t - 3\alpha)}{n \cdot \sin(\gamma + \alpha)} \tag{54}$$

Figure 15A:
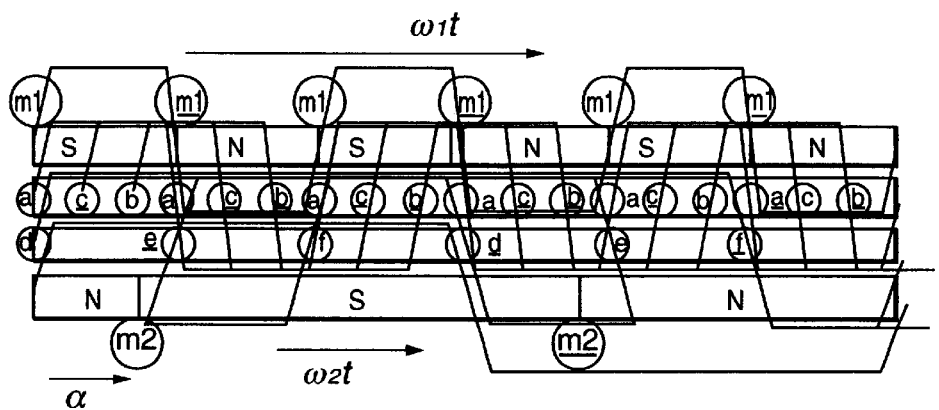
FIGS. 15A–15C are diagrams describing magnetic force interference in the motor/generator of FIG. 13.
Figure 15B:
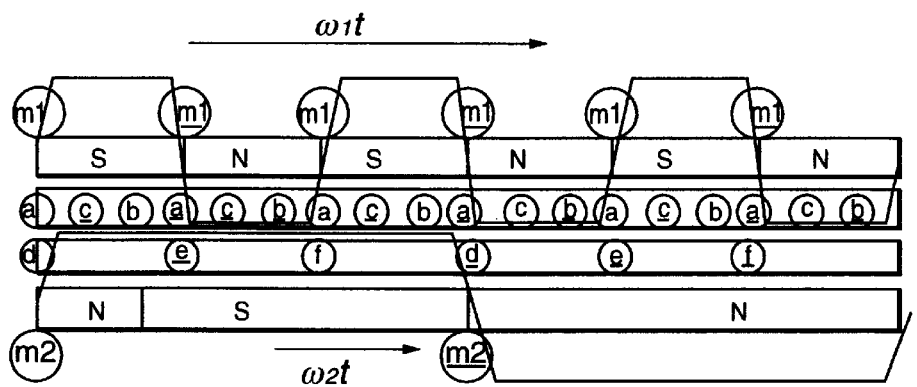
Figure 15C:
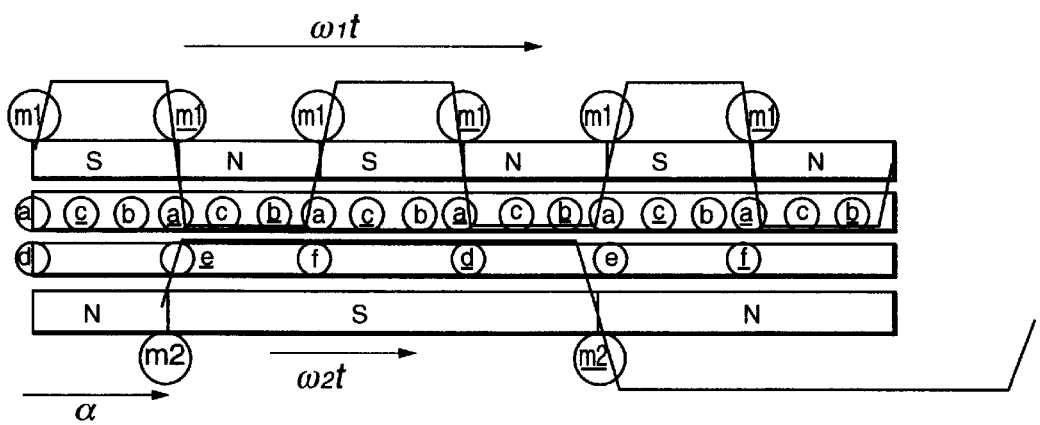

In other words, this means that according to equation (52), some effect of the outer magnets $m_1$ is generated relative to the rotation of the inner magnets $m_2$ when the magnetic pole number ratio is 3:1. More precisely, a constant torque fluctuation based on the phase difference $(\omega_1 - \omega_2)$ occurs in the rotational torque of the inner magnets $m_2$. This situation is shown in FIGS. 15A–15C.

If a magnetic field is assumed to be rectangular in a model representation, the magnetic force interference between the outer magnets and inner magnets may be clearly expressed.

Comparing state A with state B, as state B is stable, a torque is generated in state A which tends to shift to state B. This torque is an intermittent torque and is generated by a phase difference $(\omega_1 - \omega_2)$. Further, as a perfect sine wave cannot be realized due to the effect of distance between coils, it may be impossible to completely eliminate the effect of the outer magnets. The most extreme example of such case is expressed by equation (52). However, a torque fluctuation can be eliminated in most cases by applying amplitude modulation from equation (54), and the inner magnet can be driven with a constant torque even when the magnetic pole number ratio is 3:1.

(3-3) Summary

According to equations (51), (52), when currents are passed through the coils of the stator 2 in synchronism with the rotations of the outer magnets $m_1$ and inner magnets $m_2$, a rotational torque acts on both permanent magnets.

It will of course be understood that when currents are passed through the coils of the stator in synchronism with the rotation of the outer magnets $m_1$, a rotational torque acts only the outer magnets $m_1$, and when currents are passed through the coils of the stator in synchronism with the rotation of the inner magnets $m_2$, a rotational torque acts only the inner magnets $m_2$.

This fact shows that also in the case where the magnetic pole number ratio is 3:1, the two rotors 3, 4 can be driven as a generator and a motor using one series of the coils 6.

(3-4) Current Settings

In FIG. 13, one series of coils a, c, b are assumed to generate the outer rotating magnetic fields, and another series of coils d, f, e are assumed to generate the inner rotating magnetic fields.

Figure 16:
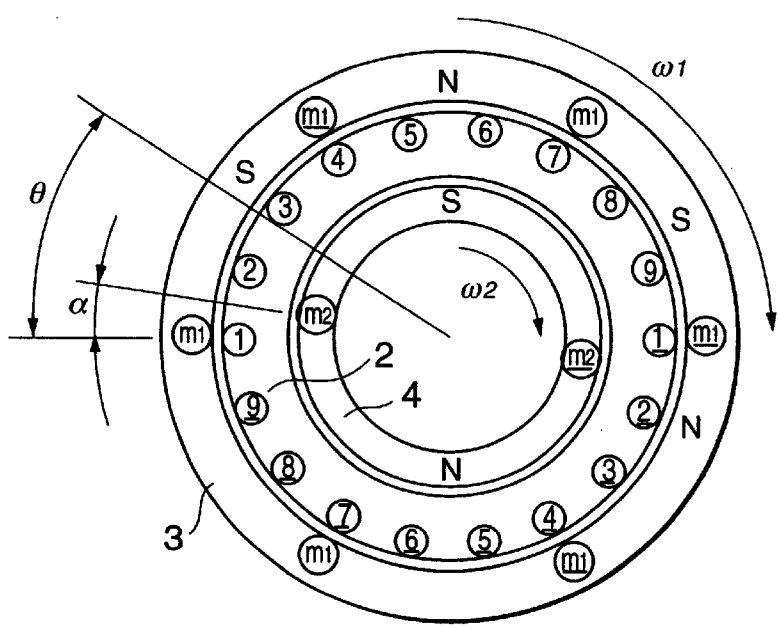
FIG. 16 is similar to FIG. 13, but showing a case where the coils on the inner and outer circumferences are integrated.

In the real motor/generator according to this invention, these coils are integrated as shown in FIG. 16. Specifically, the coils a and d, a and f, a and e, a and d, a and f, a and e in FIG. 13 are respectively integrated to coils #1, #4, #7, #1, #4 and #7.

In view of the construction of FIG. 16, the currents passing through the coils 6 of the stator 2 may be set as follows.

$$I_1 = Ia + Id \qquad I_{10} = \underline{I_1} = \underline{Ia} + \underline{Id}$$

$$I_2 = \underline{Ic} \qquad I_{11} = \underline{I_2} = Ic$$

$$I_3 = Ib \qquad I_{12} = \underline{I_3} = \underline{Ib}$$

$$I_4 = \underline{Ia} + If \qquad I_{13} = \underline{I_4} = Ia + If$$

$$I_5 = Ic \qquad I_{14} = \underline{I_5} = \underline{Ic}$$

$$I_6 = \underline{Ib} \qquad I_{15} = \underline{I_6} = Ib$$

$$I_7 = Ia + Ie \qquad I_{16} = \underline{Ia} + \underline{Ie}$$

$$I_8 = \underline{Ic} \qquad I_{17} = \underline{I_8} = Ic$$

$$I_9 = Ib \qquad I_{18} = \underline{I_9} = \underline{Ib}$$

When the magnetic pole number ratio is 3:1, an eighteen-phase alternating current is required, but the phase is reversed over half the circumference, so a nine-phase alternating current (half of eighteen-phase) may be used.

In this case as the load on coils #1, #4, #7, #1, #4 and #7 is heavy, it is desirable to use also the remaining coils in order to form the inner rotating magnetic fields. For example, the following current settings are recommended.

$$I_1 = Ia + Ii \qquad I_{10} = \underline{I_1} = Ia + Ii$$

$$I_2 = Ic + \underline{Ivi} \qquad I_{11} = \underline{I_2} = Ic + Ivi$$

$$I_3 = Ib + Iii \qquad I_{12} = \underline{I_3} = Ib + \underline{Iii}$$

$$I_4 = Ia + Ivii \qquad I_{13} = \underline{I_4} = Ia + Ivii$$

$$I_5 = Ic + Iiii \qquad I_{14} = \underline{I_5} = Ic + \underline{Iiii}$$

$$I_6 = Ib + \underline{Iviii} \qquad I_{15} = \underline{I_6} = Ib + Iviii$$

$$I_7 = Ia + Iiv \qquad I_{16} = \underline{I_7} = Ia + \underline{Iiv}$$

$$I_8 = Ic + Iix \qquad I_{17} = \underline{I_8} = Ic + Iix$$

$$I_9 = Ib + Iv \qquad I_{18} = \underline{I_9} = Ib + Iv$$

Figure 17A:
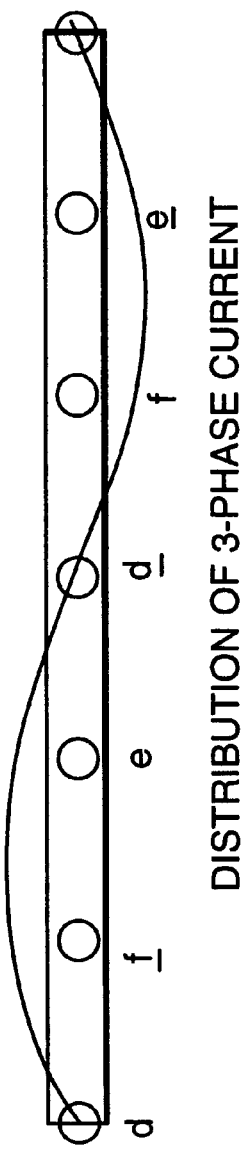
FIGS. 17A, 17B are diagrams showing a distribution of alternating current for driving the motor/generator of FIG. 16.
Figure 17B:
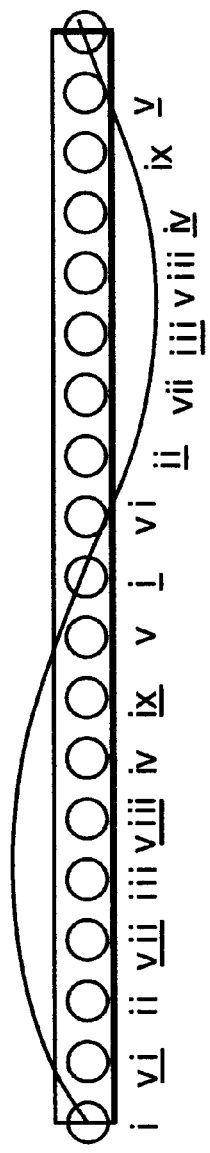

The phases of the currents Ii–Iix and $\underline{Ii}$–$\underline{Iix}$ for forming the inner rotating magnetic fields are shown in FIGS. 17A and 17B.

(3-5) When the Inner Rotating Magnetic Fields with Nine-phase Alternating Current are Supplied (3-5-1) Magnetic Flux Density $Bc_2$ The magnetic flux density $Bc_2$ when the inner rotating magnetic fields are produced by nine-phase alternating current is expressed by the following equation (55).

$$Bc_2 = \mu \cdot n \cdot \left\{ Ici(t) \cdot \sin\theta + Icii(t) \cdot \sin\left(\theta - \frac{2\pi}{9}\right) + \right. \tag{55}$$
$$Iciii(t) \cdot \sin\left(\theta - \frac{4\pi}{9}\right) + Iciv(t) \cdot \sin\left(\theta - \frac{6\pi}{9}\right) +$$
$$Icv(t) \cdot \sin\left(\theta - \frac{8\pi}{9}\right) + Icvi(t) \cdot \sin\left(\theta - \frac{10\pi}{9}\right) +$$
$$Icvii(t) \cdot \sin\left(\theta - \frac{12\pi}{9}\right) + Icviii(t) \cdot \sin\left(\theta - \frac{14\pi}{9}\right) +$$
$$\left. Icix(t) \cdot \sin\left(\theta - \frac{16\pi}{9}\right) \right\}$$

The total magnetic flux density B is expressed as follows.

$$B = B_1 + B_2 + Bc_1 + Bc_2 \tag{56}$$
$$= \mu \cdot Im_1 \cdot \sin(3\omega_1 \cdot t - 3\theta) + \mu \cdot Im_2 \cdot \sin(\omega_2 \cdot t + \alpha - \theta) +$$
$$\mu \cdot n \cdot \left\{ Ica(t) \cdot \sin(3\theta) + Icb(t) \cdot \sin\left(3\theta - \frac{2\pi}{3}\right) + \right.$$
$$\left. Icc(t) \cdot \sin\left(3\theta - \frac{4\pi}{3}\right) \right\} +$$
$$\mu \cdot n \cdot \left\{ Ici(t) \cdot \sin\theta + Icii(t) \cdot \sin\left(\theta - \frac{2\pi}{9}\right) + \right.$$
$$Iciii(t) \cdot \sin\left(\theta - \frac{4\pi}{9}\right) + Iciv(t) \cdot \sin\left(\theta - \frac{6\pi}{9}\right) +$$
$$Icv(t) \cdot \sin\left(\theta - \frac{8\pi}{9}\right) + Icvi(t) \cdot \sin\left(\theta - \frac{10\pi}{9}\right) +$$
$$Icvii(t) \cdot \sin\left(\theta - \frac{12\pi}{9}\right) + Icviii(t) \cdot \sin\left(\theta - \frac{14\pi}{9}\right) +$$
$$\left. Icix(t) \cdot \sin\left(\theta - \frac{16\pi}{9}\right) \right\}$$

$f_1$ is calculated by the following equation.

$$f_1 = Im_1 \cdot B_{1000} + Im_1 \cdot B_{2000} - Im_1 \cdot B_{3000}$$

where, $B_{1000}$ is magnetic flux density B at $\theta = \omega_1 \cdot t$,
$B_{2000}$ is magnetic flux density B at $\theta = \omega_1 \cdot t + 2\pi/3$, and
$B_{3000}$ is magnetic flux density B at $\theta = \omega_1 \cdot t + \pi/3$.

Therefore, the above equation can be rewritten as follows.

$$f_1 = \mu \cdot Im_1 \cdot \left[ Im_1 \cdot \{\sin(3\omega_1 \cdot t - 3\omega_1 \cdot t) + \right. \tag{57}$$
$$\sin(3\omega_1 \cdot t - 3\omega_1 \cdot t + 2\pi) -$$
$$\sin(3\omega_1 \cdot t - 3\omega_1 \cdot t + \pi)\} +$$
$$Im_2 \cdot \{\sin(\omega_2 \cdot t + \alpha - \omega_1 \cdot t) +$$
$$\sin\left(\omega_2 \cdot t + \alpha - \omega_1 \cdot t - \frac{2\pi}{3}\right) -$$
$$\sin\left(\omega_2 \cdot t + \alpha - \omega_1 \cdot t - \frac{\pi}{3}\right)\} +$$
$$n \cdot \left[ Ica(t) \cdot \{\sin(3\omega_1 \cdot t) + \right.$$
$$\sin(3\omega_1 \cdot t + 2\pi) - \sin(3\omega_1 \cdot t + \pi)\} +$$
$$Icb(t) \cdot \left\{ \sin\left(3\omega_1 \cdot t - \frac{2\pi}{3}\right) + \right.$$
$$\left. \sin\left(3\omega_1 \cdot t + 2\pi - \frac{2\pi}{3}\right) - \sin\left(3\omega_1 \cdot t + \pi - \frac{2\pi}{3}\right)\right\} +$$
$$Icc(t) \cdot \left\{ \sin\left(3\omega_1 \cdot t - \frac{4\pi}{3}\right) + \right.$$
$$\left. \sin\left(3\omega_1 \cdot t + 2\pi - \frac{4\pi}{3}\right) - \sin\left(3\omega_1 \cdot t + \pi - \frac{4\pi}{3}\right)\right\} \right] +$$
$$n \cdot \left[ Ici(t) \cdot \{\sin(\omega_1 \cdot t) + \right.$$
$$\sin\left(\omega_1 \cdot t + \frac{2\pi}{3}\right) + \sin\left(\omega_1 \cdot t + \frac{\pi}{3}\right)\} +$$
$$Icii(t) \cdot \left\{ \sin\left(\omega_1 \cdot t - \frac{2\pi}{9}\right) + \right.$$
$$\left. \sin\left(\omega_1 \cdot t - \frac{2\pi}{9} + \frac{2\pi}{3}\right) - \sin\left(\omega_1 \cdot t - \frac{2\pi}{9} + \frac{\pi}{3}\right)\right\} +$$

$$Iciii(t) \cdot \left\{ \sin\left(\omega_1 \cdot t - \frac{4\pi}{9}\right) + \right.$$

$$\left. \sin\left(\omega_1 \cdot t - \frac{4\pi}{9} + \frac{2\pi}{3}\right) - \sin\left(\omega_1 \cdot t - \frac{4\pi}{9} + \frac{\pi}{3}\right) \right\} +$$

$$Iciv(t) \cdot \left\{ \sin\left(\omega_1 \cdot t - \frac{6\pi}{9}\right) + \right.$$

$$\left. \sin\left(\omega_1 \cdot t - \frac{6\pi}{9} + \frac{2\pi}{3}\right) - \sin\left(\omega_1 \cdot t - \frac{6\pi}{9} + \frac{\pi}{3}\right) \right\} +$$

$$Icv(t) \cdot \left\{ \sin\left(\omega_1 \cdot t - \frac{8\pi}{9}\right) + \right.$$

$$\left. \sin\left(\omega_1 \cdot t - \frac{8\pi}{9} + \frac{2\pi}{3}\right) - \sin\left(\omega_1 \cdot t - \frac{8\pi}{9} + \frac{\pi}{3}\right) \right\} +$$

$$Icvi(t) \cdot \left\{ \sin\left(\omega_1 \cdot t - \frac{10\pi}{9}\right) + \right.$$

$$\left. \sin\left(\omega_1 \cdot t - \frac{10\pi}{9} + \frac{2\pi}{3}\right) - \sin\left(\omega_1 \cdot t - \frac{10\pi}{9} + \frac{\pi}{3}\right) \right\} +$$

$$Icvii(t) \cdot \left\{ \sin\left(\omega_1 \cdot t - \frac{12\pi}{9}\right) + \right.$$

$$\left. \sin\left(\omega_1 \cdot t - \frac{12\pi}{9} + \frac{2\pi}{3}\right) - \sin\left(\omega_1 \cdot t - \frac{12\pi}{9} + \frac{\pi}{3}\right) \right\} +$$

$$Icviii(t) \cdot \left\{ \sin\left(\omega_1 \cdot t - \frac{14\pi}{9}\right) + \right.$$

$$\left. \sin\left(\omega_1 \cdot t - \frac{14\pi}{9} + \frac{2\pi}{3}\right) - \sin\left(\omega_1 \cdot t - \frac{14\pi}{9} + \frac{\pi}{3}\right) \right\} +$$

$$Icix(t) \cdot \left\{ \sin\left(\omega_1 \cdot t - \frac{16\pi}{9}\right) + \right.$$

$$\sin\left(\omega_1 \cdot t - \frac{16\pi}{9} + \frac{2\pi}{3}\right) -$$

$$\left. \sin\left(\omega_1 \cdot t - \frac{16\pi}{9} + \frac{\pi}{3}\right) \right\} \Bigg] \Bigg]$$

$$= \mu \cdot Im_1 \cdot \Big[ Im_1 \cdot \{\sin(3\omega_1 \cdot t - 3\omega_1 \cdot t) +$$

$$\sin(3\omega_1 \cdot t - 3\omega_1 \cdot t + 2\pi) -$$

$$\sin(3\omega_1 \cdot t - 3\omega_1 \cdot t + \pi) \} + \quad (=0)$$

$$Im_2 \cdot \{\sin(\omega_2 \cdot t + \alpha - \omega_1 \cdot t) +$$

$$\sin\left(\omega_2 \cdot t + \alpha - \omega_1 \cdot t - \frac{2\pi}{3}\right) -$$

$$\sin\left(\omega_2 \cdot t + \alpha - \omega_1 \cdot t + \frac{\pi}{3}\right)\} + \quad (=0)$$

$$n \cdot \Big[ Ica(t) \cdot \{\sin(3\omega_1 \cdot t) + \sin(3\omega_1 \cdot t + 2\pi) -$$

$$\sin(3\omega_1 \cdot t + \pi)\} +$$

$$Icb(t) \cdot \left\{ \sin\left(3\omega_1 \cdot t - \frac{2\pi}{3}\right) + \right.$$

$$\sin\left(3\omega_1 \cdot t + 2\pi - \frac{2\pi}{3}\right) -$$

$$\left. \sin\left(3\omega_1 \cdot t + \pi - \frac{2\pi}{3}\right) \right\} +$$

$$Icc(t) \cdot \left\{ \sin\left(3\omega_1 \cdot t - \frac{4\pi}{3}\right) + \right.$$

$$\sin\left(3\omega_1 \cdot t + 2\pi - \frac{4\pi}{3}\right) - \quad (\neq 0)$$

$$\left. \sin\left(3\omega_1 \cdot t + \pi - \frac{4\pi}{3}\right) \right\} \Bigg] +$$

$$n \cdot \Big[ Ici(t) \cdot \{\sin(\omega_1 \cdot t) +$$

$$\sin\left(\omega_1 \cdot t + \frac{2\pi}{3}\right) - \sin\left(\omega_1 \cdot t + \frac{\pi}{3}\right)\} + \quad (=0)$$

$$Icii(t) \cdot \left\{ \sin\left(\omega_1 \cdot t - \frac{2\pi}{9}\right) + \right.$$

$$\left. \sin\left(\omega_1 \cdot t - \frac{2\pi}{9} + \frac{2\pi}{3}\right) - \sin\left(\omega_1 \cdot t - \frac{2\pi}{9} + \frac{\pi}{3}\right) \right\} + \quad (=0)$$

$$Iciii(t) \cdot \left\{ \sin\left(\omega_1 \cdot t - \frac{4\pi}{9}\right) + \right.$$

$$\left. \sin\left(\omega_1 \cdot t - \frac{4\pi}{9} + \frac{2\pi}{3}\right) - \sin\left(\omega_1 \cdot t - \frac{4\pi}{9} + \frac{\pi}{3}\right) \right\} + \quad (=0)$$

$$Iciv(t) \cdot \left\{ \sin\left(\omega_1 \cdot t - \frac{6\pi}{9}\right) + \right.$$

$$\left. \sin\left(\omega_1 \cdot t - \frac{6\pi}{9} + \frac{2\pi}{3}\right) - \sin\left(\omega_1 \cdot t - \frac{6\pi}{9} + \frac{\pi}{3}\right) \right\} + \quad (=0)$$

$$Icv(t) \cdot \left\{ \sin\left(\omega_1 \cdot t - \frac{8\pi}{9}\right) + \right.$$

$$\left. \sin\left(\omega_1 \cdot t - \frac{8\pi}{9} + \frac{2\pi}{3}\right) - \sin\left(\omega_1 \cdot t - \frac{8\pi}{9} + \frac{\pi}{3}\right) \right\} + \quad (=0)$$

$$Icvi(t) \cdot \left\{ \sin\left(\omega_1 \cdot t - \frac{10\pi}{9}\right) + \right.$$

$$\left. \sin\left(\omega_1 \cdot t - \frac{10\pi}{9} + \frac{2\pi}{3}\right) - \sin\left(\omega_1 \cdot t - \frac{10\pi}{9} + \frac{\pi}{3}\right) \right\} + \quad (=0)$$

$$Icvii(t) \cdot \left\{ \sin\left(\omega_1 \cdot t - \frac{12\pi}{9}\right) + \right.$$

$$\left. \sin\left(\omega_1 \cdot t - \frac{12\pi}{9} + \frac{2\pi}{3}\right) - \sin\left(\omega_1 \cdot t - \frac{12\pi}{9} + \frac{\pi}{3}\right) \right\} + \quad (=0)$$

$$Icviii(t) \cdot \left\{ \sin\left(\omega_1 \cdot t - \frac{14\pi}{9}\right) + \right.$$

$$\left. \sin\left(\omega_1 \cdot t - \frac{14\pi}{9} + \frac{2\pi}{3}\right) - \sin\left(\omega_1 \cdot t - \frac{14\pi}{9} + \frac{\pi}{3}\right) \right\} + \quad (=0)$$

$$Icix(t) \cdot \left\{ \sin\left(\omega_1 \cdot t - \frac{16\pi}{9}\right) + \right.$$

$$\left. \sin\left(\omega_1 \cdot t - \frac{16\pi}{9} + \frac{2\pi}{3}\right) - \sin\left(\omega_1 \cdot t - \frac{16\pi}{9} + \frac{\pi}{3}\right) \right\} \Bigg] \Bigg] \quad (=0)$$

$$= 3\mu \cdot n \cdot Im_1 \{ Ica(t) \cdot \sin(3\omega_1 \cdot t) +$$

$$Icb(t) \cdot \sin\left(3\omega_1 \cdot t - \frac{2\pi}{3}\right) +$$

$$Icc(t) \cdot \sin\left(3\omega_1 \cdot t - \frac{4\pi}{3}\right) \}$$

This is the same as equation (46) which is obtained when the inner rotating magnetic fields are supplied by a three-phase alternating current.

On the other hand, $f_2$ may be calculated as follows.

$$f_2 = Im_2 \cdot B$$

where, $\theta = \omega_2 \cdot t + \alpha$.

From this equation and equation (56), $f_2$ may be expressed by the following equation.

$$f_2 = \mu \cdot Im_2 \cdot \Big[ Im_1 \cdot \sin(3\omega_1 \cdot t - 3\omega_2 \cdot t - 3\alpha) + \quad (58)$$

$$Im_2 \cdot \sin(\omega_2 \cdot t + \alpha - \omega_2 \cdot t - \alpha) +$$

$$n \cdot \{ Ica(t) \cdot \sin(3\omega_2 \cdot t + 3\alpha) +$$

$$Icb(t) \cdot \sin\left(3\omega_2 \cdot t + 3\alpha - \frac{2\pi}{3}\right) +$$

-continued $$Icc(t) \cdot \sin\left(3\omega_2 \cdot t + 3\alpha - \frac{4\pi}{3}\right)\right\} +$$

$$n \cdot \left\{Ici(t) \cdot \sin(\omega_2 \cdot t + \alpha) + Icii(t) \cdot \sin\left(\omega_2 \cdot t + \alpha - \frac{2\pi}{9}\right) + \right.$$

$$Iciii(t) \cdot \sin\left(\omega_2 \cdot t + \alpha - \frac{4\pi}{9}\right) +$$

$$Iciv(t) \cdot \sin\left(\omega_2 \cdot t + \alpha - \frac{6\pi}{9}\right) +$$

$$Icv(t) \cdot \sin\left(\omega_2 \cdot t + \alpha - \frac{8\pi}{9}\right) +$$

$$Icvi(t) \cdot \sin\left(\omega_2 \cdot t + \alpha - \frac{10\pi}{9}\right) +$$

$$Icvii(t) \cdot \sin\left(\omega_2 \cdot t + \alpha - \frac{12\pi}{9}\right) +$$

$$Icviii(t) \cdot \sin\left(\omega_2 \cdot t + \alpha - \frac{14\pi}{9}\right) +$$

$$\left. Icix(t) \cdot \sin\left(\omega_2 \cdot t + \alpha - \frac{16\pi}{9}\right)\right\}\right]$$

$$= \mu \cdot Im_2 \cdot \left[Im_1 \cdot \sin(3\omega_1 \cdot t - 3\omega_2 \cdot t - 3\alpha) + \right.$$

$$n \cdot \{Ica(t) \cdot \sin(3\omega_2 \cdot t + 3\alpha) +$$

$$Icb(t) \cdot \sin\left(3\omega_2 \cdot t + 3\alpha - \frac{2\pi}{3}\right) +$$

$$Icc(t) \cdot \sin\left(3\omega_2 \cdot t + 3\alpha - \frac{4\pi}{3}\right)\right\} +$$

$$n \cdot \left\{Ici(t) \cdot \sin(\omega_2 \cdot t + \alpha) + Icii(t) \cdot \sin\left(\omega_2 \cdot t + \alpha - \frac{2\pi}{9}\right) + \right.$$

$$Iciii(t) \cdot \sin\left(\omega_2 \cdot t + \alpha - \frac{4\pi}{9}\right) +$$

$$Iciv(t) \cdot \sin\left(\omega_2 \cdot t + \alpha - \frac{6\pi}{9}\right) +$$

$$Icv(t) \cdot \sin\left(\omega_2 \cdot t + \alpha - \frac{8\pi}{9}\right) +$$

$$Icvi(t) \cdot \sin\left(\omega_2 \cdot t + \alpha - \frac{10\pi}{9}\right) +$$

$$Icvii(t) \cdot \sin\left(\omega_2 \cdot t + \alpha - \frac{12\pi}{9}\right) +$$

$$Icviii(t) \cdot \sin\left(\omega_2 \cdot t + \alpha - \frac{14\pi}{9}\right) +$$

$$\left. Icix(t) \cdot \sin\left(\omega_2 \cdot t + \alpha - \frac{16\pi}{9}\right)\right\}\right]$$

(3-5-2) When the outer rotating magnetic fields and inner rotating magnetic fields are supplied together.

The three-phase alternating currents Ica(t), Icb(t), Icc(t) mentioned above are expressed by the following equations (59A), (59B), (59C).

$$Ica(t) = Ic_1 \cdot \cos(3\omega_1 \cdot t - 3\beta) \tag{59A}$$

$$Icb(t) = Ic_1 \cdot \cos\left(3\omega_1 \cdot t - 3\beta - \frac{2\pi}{3}\right) \tag{59B}$$

$$Icc(t) = Ic_1 \cdot \cos\left(3\omega_1 \cdot t - 3\beta - \frac{4\pi}{3}\right) \tag{59C}$$

The nine-phase alternating currents Ici(t)–Icix(t) mentioned above are set as follows.

$$Ici(t) = Ic_2(t) \cdot \cos(\omega_2 \cdot t - \gamma) \tag{60A}$$

$$Icii(t) = Ic_2(t) \cdot \cos\left(\omega_2 \cdot t - \gamma - \frac{2\pi}{9}\right) \tag{60B}$$

$$Iciii(t) = Ic_2(t) \cdot \cos\left(\omega_2 \cdot t - \gamma - \frac{4\pi}{9}\right) \tag{60C}$$

$$Iciv(t) = Ic_2(t) \cdot \cos\left(\omega_2 \cdot t - \gamma - \frac{6\pi}{9}\right) \tag{60D}$$

$$Icv(t) = Ic_2(t) \cdot \cos\left(\omega_2 \cdot t - \gamma - \frac{8\pi}{9}\right) \tag{60E}$$

$$Icvi(t) = Ic_2(t) \cdot \cos\left(\omega_2 \cdot t - \gamma - \frac{10\pi}{9}\right) \tag{60F}$$

$$Icvii(t) = Ic_2(t) \cdot \cos\left(\omega_2 \cdot t - \gamma - \frac{12\pi}{9}\right) \tag{60G}$$

$$Icviii(t) = Ic_2(t) \cdot \cos\left(\omega_2 \cdot t - \gamma - \frac{14\pi}{9}\right) \tag{60H}$$

$$Icix(t) = Ic_2(t) \cdot \cos\left(\omega_2 \cdot t - \gamma - \frac{16\pi}{9}\right) \tag{60I}$$

Next, $f_2$ is calculated by substituting equations (59A)–(59C) and equations (60A)–(60I) into equation (58).

$$f_2 = \mu \cdot Im_2 \cdot \left[Im_1 \cdot \sin(3\omega_1 \cdot t - 3\omega_2 \cdot t - 3\alpha) + \right.$$

$$n \cdot \{Ic_1 \cdot \cos(3\omega_1 \cdot t - 3\beta) \cdot \sin(3\omega_2 \cdot t - 3\alpha) +$$

$$Ic_1 \cdot \cos\left(3\omega_1 \cdot t - 3\beta - \frac{2\pi}{3}\right) \cdot \sin\left(3\omega_2 \cdot t + 3\alpha - \frac{2\pi}{3}\right) +$$

$$Ic_1 \cdot \cos\left(3\omega_1 \cdot t - 3\beta - \frac{4\pi}{3}\right) \cdot \sin\left(3\omega_2 \cdot t + 3\alpha - \frac{4\pi}{3}\right)\right\} +$$

$$n \cdot \{Ic_2(t) \cdot \cos(\omega_2 \cdot t - \gamma) \cdot \sin(\omega_1 \cdot t + \alpha) +$$

$$Ic_2(t) \cdot \cos\left(\omega_2 \cdot t - \gamma - \frac{2\pi}{9}\right) \cdot \sin\left(\omega_1 \cdot t + \alpha - \frac{2\pi}{9}\right) +$$

$$Ic_2(t) \cdot \cos\left(\omega_2 \cdot t - \gamma - \frac{4\pi}{9}\right) \cdot \sin\left(\omega_1 \cdot t + \alpha - \frac{4\pi}{9}\right) +$$

$$Ic_2(t) \cdot \cos\left(\omega_2 \cdot t - \gamma - \frac{6\pi}{9}\right) \cdot \sin\left(\omega_1 \cdot t + \alpha - \frac{6\pi}{9}\right) +$$

$$Ic_2(t) \cdot \cos\left(\omega_2 \cdot t - \gamma - \frac{8\pi}{9}\right) \cdot \sin\left(\omega_1 \cdot t + \alpha - \frac{8\pi}{9}\right) +$$

$$Ic_2(t) \cdot \cos\left(\omega_2 \cdot t - \gamma - \frac{10\pi}{9}\right) \cdot \sin\left(\omega_1 \cdot t + \alpha - \frac{10\pi}{9}\right) +$$

$$Ic_2(t) \cdot \cos\left(\omega_2 \cdot t - \gamma - \frac{12\pi}{9}\right) \cdot \sin\left(\omega_1 \cdot t + \alpha - \frac{12\pi}{9}\right) +$$

$$Ic_2(t) \cdot \cos\left(\omega_2 \cdot t - \gamma - \frac{14\pi}{9}\right) \cdot \sin\left(\omega_1 \cdot t + \alpha - \frac{14\pi}{9}\right) +$$

$$\left. Ic_2(t) \cdot \cos\left(\omega_2 \cdot t - \gamma - \frac{16\pi}{9}\right) \cdot \sin\left(\omega_1 \cdot t + \alpha - \frac{16\pi}{9}\right)\right\}\right]$$

Here, the above equation may be rewritten using the formula $\cos(a) \cdot \sin(b) = \frac{1}{2} \cdot \{\sin(a+b) - \sin(a-b)\}$.

$$f_2 = \mu \cdot Im_2 \cdot \left[Im_1 \cdot \sin(3\omega_1 \cdot t - 3\omega_2 \cdot t - 3\alpha) + \right. \tag{61}$$

$$n \cdot Ic_1 \cdot \left[\frac{1}{2} \cdot \{\sin(3\omega_1 \cdot t - 3\beta + 3\omega_2 \cdot t + 3\alpha) - \right.$$

$$\sin(3\omega_1 \cdot t - 3\beta - 3\omega_2 \cdot t - 3\alpha)\} +$$

-continued $$\frac{1}{2} \cdot \left\{ \sin\left(3\omega_1 \cdot t - 3\beta - \frac{2\pi}{3} + 3\omega_2 \cdot t + 3\alpha - \frac{2\pi}{3}\right) - \sin\left(3\omega_1 \cdot t - 3\beta - \frac{2\pi}{3} - 3\omega_2 \cdot t - 3\alpha + \frac{2\pi}{3}\right) \right\} +$$

$$\frac{1}{2} \cdot \left\{ \sin\left(3\omega_1 \cdot t - 3\beta - \frac{4\pi}{3} + 3\omega_2 \cdot t + 3\alpha - \frac{4\pi}{3}\right) - \sin\left(3\omega_1 \cdot t - 3\beta - \frac{4\pi}{3} - 3\omega_2 \cdot t - 3\alpha + \frac{4\pi}{3}\right) \right\} \Bigg] +$$

$$n \cdot Ic_2(t) \cdot \left[ \frac{1}{2} \cdot \{\sin(\omega_2 \cdot t - \gamma + \omega_2 \cdot t + \alpha) - \sin(\omega_2 \cdot t - \gamma - \omega_2 \cdot t - \alpha)\} +$$

$$\frac{1}{2} \cdot \left\{ \sin\left(\omega_2 \cdot t - \gamma - \frac{2\pi}{9} + \omega_2 \cdot t + \alpha\right) - \sin\left(\omega_2 \cdot t - \gamma - \frac{2\pi}{9} - \omega_2 \cdot t - \alpha\right) \right\} +$$

$$\frac{1}{2} \cdot \left\{ \sin\left(\omega_2 \cdot t - \gamma - \frac{4\pi}{9} + \omega_2 \cdot t + \alpha\right) - \sin\left(\omega_2 \cdot t - \gamma - \frac{4\pi}{9} - \omega_2 \cdot t - \alpha\right) \right\} +$$

$$\frac{1}{2} \cdot \left\{ \sin\left(\omega_2 \cdot t - \gamma - \frac{8\pi}{9} + \omega_2 \cdot t + \alpha\right) - \sin\left(\omega_2 \cdot t - \gamma - \frac{6\pi}{9} - \omega_2 \cdot t - \alpha\right) \right\} +$$

$$\frac{1}{2} \cdot \left\{ \sin\left(\omega_2 \cdot t - \gamma - \frac{10\pi}{9} + \omega_2 \cdot t + \alpha\right) - \sin\left(\omega_2 \cdot t - \gamma - \frac{8\pi}{9} - \omega_2 \cdot t - \alpha\right) \right\} +$$

$$\frac{1}{2} \cdot \left\{ \sin\left(\omega_2 \cdot t - \gamma - \frac{12\pi}{9} + \omega_2 \cdot t + \alpha\right) - \sin\left(\omega_2 \cdot t - \gamma - \frac{10\pi}{9} - \omega_2 \cdot t - \alpha\right) \right\} +$$

$$\frac{1}{2} \cdot \left\{ \sin\left(\omega_2 \cdot t - \gamma - \frac{14\pi}{9} + \omega_2 \cdot t + \alpha\right) - \sin\left(\omega_2 \cdot t - \gamma - \frac{12\pi}{9} - \omega_2 \cdot t - \alpha\right) \right\} +$$

$$\frac{1}{2} \cdot \left\{ \sin\left(\omega_2 \cdot t - \gamma - \frac{16\pi}{9} + \omega_2 \cdot t + \alpha\right) - \sin\left(\omega_2 \cdot t - \gamma - \frac{14\pi}{9} + \omega_2 \cdot t - \alpha\right) \right\} \Bigg] \Bigg]$$

$$= \mu \cdot Im_2 \cdot \Bigg[ Im_1 \cdot \sin(3\omega_1 \cdot t - 3\omega_2 \cdot t - 3\alpha) +$$

$$\frac{1}{2} \cdot n \cdot Ic_1 \cdot \Big\{ \sin(3\omega_1 \cdot t + 3\omega_2 \cdot t - 3\beta + 3\alpha) - \sin(3\omega_1 \cdot t - 3\omega_2 \cdot t - 3\alpha - 3\beta) +$$

$$\sin\left(3\omega_1 \cdot t + 3\omega_2 \cdot t - 3\beta + 3\alpha - \frac{4\pi}{3}\right) - \sin(3\omega_1 \cdot t - 3\omega_2 \cdot t - 3\alpha - 3\beta) +$$

$$\sin\left(3\omega_1 \cdot t + 3\omega_2 \cdot t - 3\beta + 3\alpha - \frac{2\pi}{3}\right) - \sin(3\omega_1 \cdot t - 3\omega_2 \cdot t - 3\alpha - 3\beta) \Big\} +$$

$$n \cdot Ic_2(t) \cdot \Bigg[ \frac{1}{2} \cdot \{\sin(\omega_2 \cdot t - \gamma + \omega_2 \cdot t + \alpha) + \sin(\gamma + \alpha)\} +$$

$$\frac{1}{2} \cdot \left\{ \sin\left(\omega_2 \cdot t - \gamma + \omega_2 \cdot t + \alpha - \frac{4\pi}{9}\right) + \sin(\gamma + \alpha) \right\} +$$

$$\frac{1}{2} \cdot \left\{ \sin\left(\omega_2 \cdot t - \gamma + \omega_2 \cdot t + \alpha - \frac{8\pi}{9}\right) + \sin(\gamma + \alpha) \right\} +$$

-continued $$\frac{1}{2} \cdot \left\{ \sin\left(\omega_2 \cdot t - \gamma + \omega_2 \cdot t + \alpha - \frac{12\pi}{9}\right) + \sin(\gamma + \alpha) \right\} +$$

$$\frac{1}{2} \cdot \left\{ \sin\left(\omega_2 \cdot t - \gamma + \omega_2 \cdot t + \alpha - \frac{16\pi}{9}\right) + \sin(\gamma + \alpha) \right\} +$$

$$\frac{1}{2} \cdot \left\{ \sin\left(\omega_2 \cdot t - \gamma + \omega_2 \cdot t + \alpha - \frac{2\pi}{9}\right) + \sin(\gamma + \alpha) \right\} +$$

$$\frac{1}{2} \cdot \left\{ \sin\left(\omega_2 \cdot t - \gamma + \omega_2 \cdot t + \alpha - \frac{6\pi}{9}\right) + \sin(\gamma + \alpha) \right\} +$$

$$\frac{1}{2} \cdot \left\{ \sin\left(\omega_2 \cdot t - \gamma + \omega_2 \cdot t + \alpha - \frac{10\pi}{9}\right) + \sin(\gamma + \alpha) \right\} +$$

$$\frac{1}{2} \cdot \left\{ \sin\left(\omega_2 \cdot t - \gamma + \omega_2 \cdot t + \alpha - \frac{14\pi}{9}\right) + \sin(\gamma + \alpha) \right\} \Bigg] \Bigg]$$

$$= \mu \cdot Im_2 \cdot \Big\{ Im_1 \cdot \sin(3\omega_1 \cdot t - 3\omega_2 \cdot t - 3\alpha) -$$

$$\frac{3}{2} \cdot n \cdot Ic_1 \cdot \sin(3\omega_1 \cdot t + 3\omega_2 \cdot t - 3\alpha - 3\beta) +$$

$$\frac{9}{2} \cdot n \cdot Ic_2(t) \cdot \sin(\gamma + \alpha) \Big\}$$

(3-5-3) Summary

As described in the case of equation (48), as in the case of three-phase alternating current, the first and second terms on the right-hand side of equation (61) are canceled when these terms in other phases are taken into account.

When this equation (61) for the case where the inner rotating magnetic fields are supplied by a nine-phase alternating current is compared with the above-mentioned equation (52) where the inner rotating magnetic fields are supplied by a three-phase alternating current, the fixed term of equation (61), i.e., the last term, is three times that of equation (52).

In other words, when the drive current of the inner magnets $m_2$ is a nine-phase alternating current (Ii–Iix), a drive force, i.e., drive torque, is three times that when the drive current of the inner magnet is a three-phase alternating current.

In other words, the drive torque required to generate the same drive torque for the inner magnets $m_2$ is only ⅓.

This completes the theoretical analysis of this invention.

Finally, fourth-eighth embodiments of the invention will be described referring to FIGS. 18–22. Here too, the inner rotor 4 is arranged inside the stator 2 and the outer rotor 3 is arranged outside the stator 2 as in the above-mentioned first-third embodiments, and the magnetic pole number ratio of the outer rotor 3 and inner rotor 4 is varied.

Figure 18:
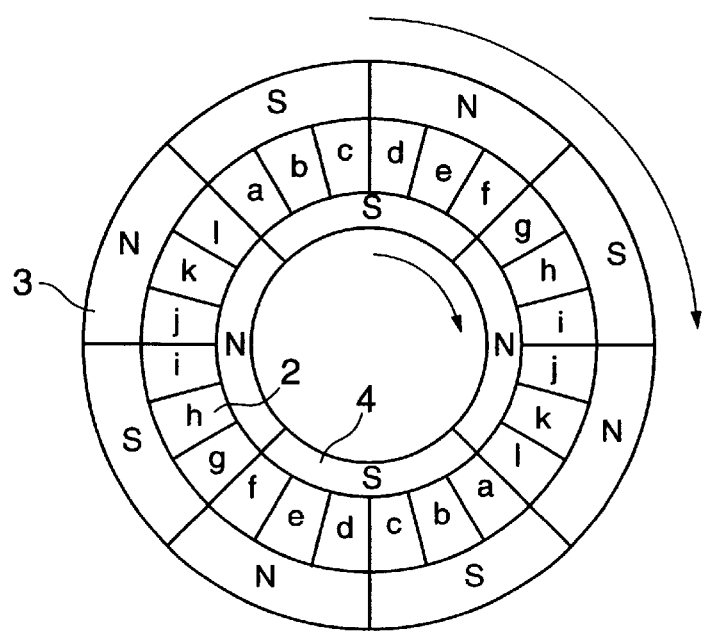
FIG. 18 is a schematic diagram of a motor/generator according to a fourth embodiment of this invention.

In the fourth embodiment shown in FIG. 18, the magnetic pole number ratio is set at 2:1.

Figure 19:
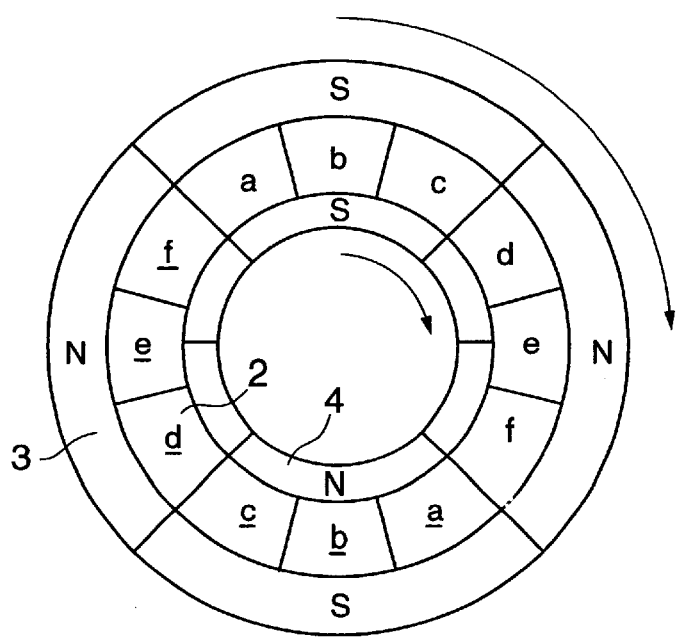
FIG. 19 is similar to FIG. 18, but showing a fifth embodiment of this invention.

In the fifth embodiment shown in FIG. 19, the magnetic pole number ratio is set at 2:1.

Figure 20:
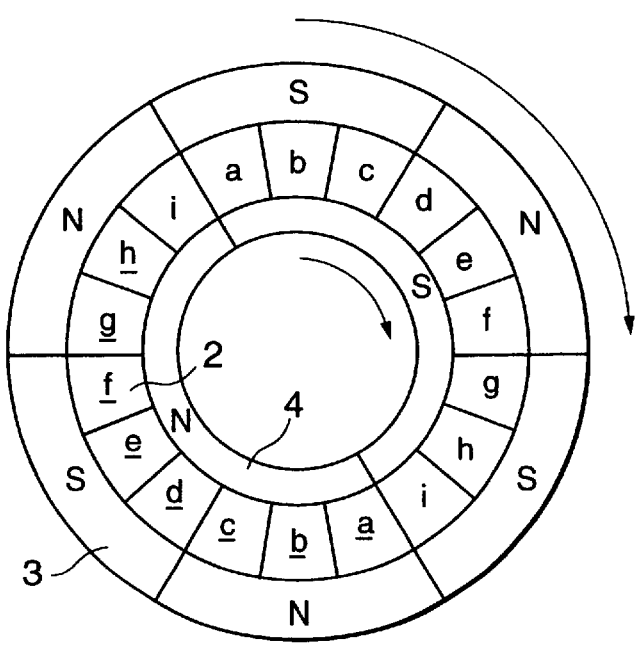
FIG. 20 is similar to FIG. 18, but showing a sixth embodiment of this invention.

In the sixth embodiment shown in FIG. 20, the magnetic pole number ratio is set at 3:1.

Figure 21:
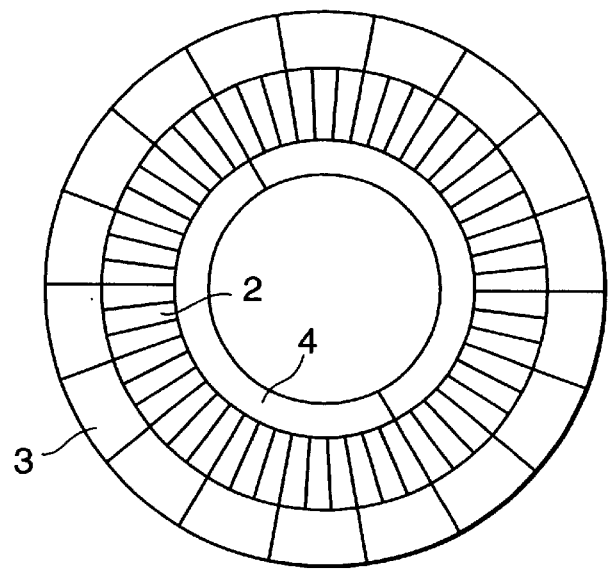
FIG. 21 is similar to FIG. 18, but showing a seventh embodiment of this invention.

In the seventh embodiment shown in FIG. 21, the magnetic pole number ratio is set at 9:1.

Figure 22:
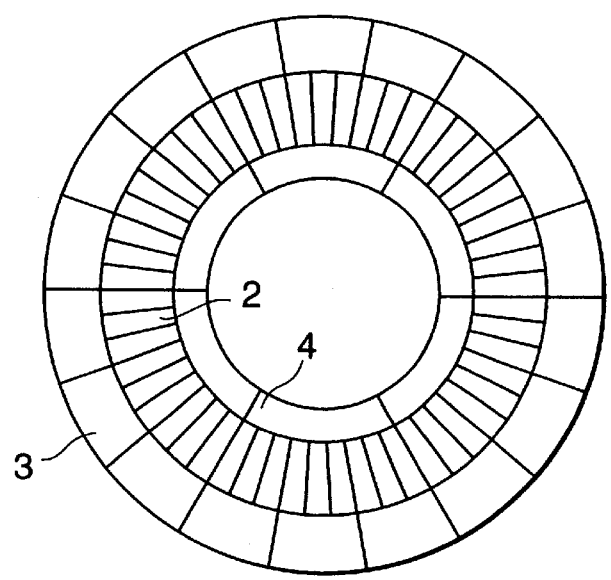
FIG. 22 is similar to FIG. 18, but showing an eighth embodiment of this invention.

In the eighth embodiment shown in FIG. 22, the magnetic pole number ratio is set at 3:1.

Hence, this invention may be applied when the magnetic pole number of the outer rotor 3 is less than or greater than the magnetic pole number of the inner rotor 4.

In FIGS. 18–22, several salient poles are not shown, but the ratio of outer salient pole number to inner salient pole number is set to be the same as the magnetic pole number ratio of the outer rotor 3 and inner rotor 4. Specifically, it is set at 2:1 in the fourth embodiment shown in FIG. 18 and fifth embodiment shown in FIG. 19. It is set at 3:1 in the sixth embodiment shown in FIG. 20 and eighth embodiment shown in FIG. 22. In the seventh embodiment shown in FIG. 21, it is set at 9:1.

In the description of the above embodiments, the case was described where the rotors were driven as a motor, however they may of course also be used as generators, or one rotor may be used as a motor and the other one may be used as a generator to generate power.

The contents of Tokugan Hei 10-77465, with a filing date of Mar. 25, 1998 in Japan, are hereby incorporated by reference. Although the invention has been described above by reference to certain embodiments of the invention, the invention is not limited to the embodiments described above. Modifications and variations of the embodiments described above will occur to those skilled in the art, in light of the above teachings.

For example, in the above embodiments, the rotors 3 and 4 were arranged outside and inside the stator 2, but both rotors may be arranged outside the stator 2 or inside the stator 2.

Also, the signal output by the control circuit 15 to the inverter is not limited to a PWM signal, and a pulse amplitude modulation (PAM) signal or other signals may be used.

This invention is not limited to a radial gap type motor/generator wherein the gap between the rotor and the stator is set in a radial direction, and may be applied to a motor/generator wherein the gap between the rotor and stator is in an axial direction.

The embodiments of this invention in which an exclusive property or privilege is claimed are defined as follows:

What is claimed is:

1. A motor/generator, comprising:

a first rotor comprising plural magnetic poles and supported free to rotate;

a second rotor comprising plural magnetic poles less than the magnetic poles of the first rotor and supported free to rotate relative to the first rotor;

a stator having cores having plural first salient poles facing the first rotor and plural second salient poles facing the second rotor, and coils wound onto the first salient poles, the ratio of the first salient poles and the second salient poles being equal to the ratio of the magnetic poles of the first rotor and the magnetic poles of the second rotor; and an electrical circuit for supplying a composite electrical current to the coils, the composite current comprising a first alternating current which produces a first rotating magnetic field which synchronously drives the first rotor and a second alternating current which produces a second rotating magnetic field which synchronously drives the second rotor.

2. The motor/generator as defined in claim 1, wherein the second salient poles are divided by gaps which divide the cores, and the first salient poles are divided by the gaps, and slits formed on a surface of the cores facing the first rotor.

3. The motor/generator as defined in claim 1, wherein the cores are integrated into one core unit, the second salient poles are divided by large resistors provided in the core unit, and the first salient poles are divided by the resistors, and slits formed on a surface of the core unit facing the first rotor.

4. The motor/generator as defined in claim 3, wherein the core unit is formed in a cylindrical shape comprising an inner circumference and outer circumference, and each of the large resistors comprises two slits formed on the inner circumference and the outer circumference.

5. A motor/generator, comprising:

a first rotor comprising plural magnetic poles, the rotor being supported so as to be freely rotatable about an axis;

a second rotor comprising plural magnetic poles, the second rotor being supported so as to be freely rotatable about the axis;

a stationary stator which is co-axial with the first rotor;

a coil unit which comprises plural coils disposed at equal angular intervals about the stator and which forms a plurality of first rotating magnetic fields equal in number to the number of magnetic poles of the first rotor in response to the supply of a first alternating current and a plurality of second rotating magnetic fields of equal number to the number of magnetic poles of the second rotor in response to the supply of a second alternating current, the coil unit generating first salient poles facing the first rotor and second salient poles facing the second rotor, wherein the ratio of the first salient poles and second salient poles is set equal to the ratio of a magnetic pole number of the first rotor and a magnetic pole number of the second rotor; and an electrical circuit for supplying a composite electrical current comprising the first alternating current and the second alternating current to the coil unit, wherein the number of the first salient poles is larger than the number of the second salient poles, wherein the second salient poles are divided by a large resistor provided in the stator, and wherein the first salient poles are divided by the resistor, and slits formed in the stator.

6. The motor/generator as defined in claim 5, wherein the stator has a cylindrical shape comprising an inner circumference and outer circumference, and wherein the large resistor comprises two slits formed on the inner circumference and the outer circumference.

* * * * *